US007050752B2

(12) United States Patent
Sato et al.

(10) Patent No.: US 7,050,752 B2
(45) Date of Patent: May 23, 2006

(54) SHEET TREATING APPARATUS, METHOD OF MOUNTING SHEET TREATING APPARATUS, AND IMAGE FORMING APPARATUS

(75) Inventors: Akihiro Sato, Kanagawa (JP); Hiroaki Takagishi, Tokyo (JP); Katsuhito Kato, Ibaraki (JP); Daisaku Kamiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/260,195

(22) Filed: Oct. 28, 2005

(65) Prior Publication Data
US 2006/0051147 A1 Mar. 9, 2006

Related U.S. Application Data

(62) Division of application No. 10/614,223, filed on Jul. 8, 2003, which is a division of application No. 09/973,839, filed on Oct. 11, 2001, now Pat. No. 6,647,243.

(30) Foreign Application Priority Data

| Oct. 16, 2000 | (JP) | 2000/315645 |
| Oct. 17, 2000 | (JP) | 2000/316287 |
| Oct. 24, 2000 | (JP) | 2000/323635 |
| Oct. 27, 2000 | (JP) | 2000/329572 |

(51) Int. Cl.
*G03G 15/00* (2006.01)

(52) U.S. Cl. .............. 399/405; 399/401; 399/407
(58) Field of Classification Search ............. 399/405, 399/407, 401, 402
See application file for complete search history.

(56) References Cited

U.S. PATENT DOCUMENTS

| 4,990,966 | A | 2/1991 | Sindo |
| 5,280,331 | A | 1/1994 | Namiki |
| 5,282,611 | A | 2/1994 | Ueda et al. .................... 270/53 |
| 5,722,030 | A | 2/1998 | Kato ........................... 399/403 |
| 5,839,032 | A | 11/1998 | Yasui et al. ................. 399/124 |
| 5,897,250 | A | 4/1999 | Hirai et al. ................. 399/404 |
| 5,911,414 | A | 6/1999 | Kato et al. ............... 270/58.07 |
| 6,134,418 | A | 10/2000 | Kato et al. .................. 399/405 |
| 6,473,579 | B1 | 10/2002 | Suzuki et al. ............... 399/124 |
| 6,671,491 | B1 * | 12/2003 | Yamanaka et al. .......... 399/407 |
| 6,690,901 | B1 * | 2/2004 | Katsuyama et al. ......... 399/405 |
| 6,714,747 | B1 * | 3/2004 | Asai ........................... 399/405 |
| 6,725,011 | B1 * | 4/2004 | Sato ........................... 399/405 |

* cited by examiner

*Primary Examiner*—Susan Lee
(74) *Attorney, Agent, or Firm*—Fitzpatrick, Cella, Harper & Scinto

(57) ABSTRACT

A sheet treating apparatus is mountable in a space portion of an image forming apparatus including an image-forming portion for forming an image on a sheet and an image-reading portion for reading an image of an original. The image-reading portion is disposed above the image-forming portion. The sheet is delivered in the space portion formed between the image-forming portion and the image-reading portion. The sheet treating apparatus includes a connection path unit to be connected with a sheet delivery path for delivering the sheet from the image-forming portion, which connection path unit is mounted in the space portion from the outside of a side surface of the main body of the image forming apparatus, and a sheet-treating unit for performing a treatment of the sheet transported from the connection path unit, which sheet-treating unit is mounted in the space portion from the front side of the main body of the image forming apparatus.

9 Claims, 38 Drawing Sheets

SHEET TREATING APPARATUS, METHOD OF MOUNTING SHEET TREATING APPARATUS, AND IMAGE FORMING APPARATUS

This application is a divisional of U.S. patent application Ser. No. 10/614,223, filed Jul. 8, 2003, now pending, which is a divisional of U.S. patent application Ser. No. 09/973,839, filed on Oct. 11, 2001, now U.S. Pat. No. 6,647,243.

BACKGROUND OF THE INVENTION

1. Field of the Invention

The present invention relates to an image forming apparatus such as a copying machine and a facsimile machine, and more particularly to a sheet treating apparatus capable of being mounted on an in-body delivery type image forming apparatus delivering a sheet in a space formed between an image-forming portion and an image-reading portion.

2. Description of the Related Art

For example, like a copying machine, a facsimile machine and the like, many image forming apparatus equipped with image-reading portions for reading originals (hereinafter referred to as "scanners") set the scanners at their upper portions. In particular, almost all of the machines that are used popularly in offices and form images by an electrophotographic process employ the setting.

Moreover, the number of the so-called multiple function processing machines that combine the functions of printers and of copying machines or the functions of printers and of facsimile machines is recently increasing for the purpose of reducing the cost and setting spaces of respective machines.

Moreover, the so-called in-body delivery type image forming apparatus that has decreased installation-space-requirements has been realized. The in-body delivery type image forming apparatus disposes its scanner and its image-forming portion separately to form a space between them, and thereby the apparatus can dispose its delivery tray in a state of not protruding to the outside of the apparatus, which makes the installation space requirements of the apparatus small.

As a concrete example of the in-body delivery type image forming apparatus, a copying machine shown in FIG. 40A was invented. The copying machine includes an image-reading portion 100, an image-forming portion 101 and a delivery space portion 102 for the delivery of sheets. The delivery space portion 102 is disposed between the image-reading portion 100 and the image-forming portion 101. The copying machine disposes its delivery tray or the like, which conventionally protrudes to the outside of the machine, between the image-reading portion 100 and the image-forming portion 101, which makes it possible to decrease the installation space requirements of the copying machine by leaps and bounds.

Even for the space saving image forming apparatus as described above, the following structure is desired. That is, the space saving property thereof is kept by the structure. And, the so-called sheet treating apparatus, which is a sorter performing the sort and alignment of sheets, a finisher performing the processing such as stapling or the like, can be added to the structure as an option. In response to such a demand, an image forming apparatus of a type has already been proposed. The type is one such that a sheet treating apparatus is set in a sheet delivery space in the machine.

However, in the related art, the mounting method of the sheet treating apparatus and the operation efficiency of the mounting are not especially considered. When the sheet treating apparatus is connected with the sheet path (sheet transporting path) of the image forming apparatus, the precision of positioning is needed to be high for the prevention of sheet jamming. However, it was very difficult to perform the operation of the positioning and the like in the narrow sheet delivery space.

Moreover, because the related art structure is structured such that, for example, the sheet treating apparatus is mounted in the delivery space portion of the image forming apparatus and the image forming apparatus forming the space is disposed at an immediately upper part of the sheet treating apparatus, the space for stacking sheets on which images have been formed on a stacking tray of the sheet treating apparatus is narrow. Consequently, the related art structure has a problem. The problem is that the number of stackable sheets is limited.

Moreover, the related art structure makes it possible to reverse the surfaces of sheets by utilizing the delivery space portion in the case where images are formed on both the sides of the sheets. To put it concretely, as shown in FIG. 40B, the related art structure begins to deliver a sheet, on which an image has been formed by image forming means 103, with a delivery roller 104 for the time being. Next, the structure reverses the delivery roller 104 at a predetermined position to draw the sheet into the structure. Then, the structure transports the drawn sheet to the image forming means 103 again through a re-feed path 105 to form an image on the opposite side of the sheet. After that, the structure executes the operation of the delivery of the sheet to be stacked in the delivery space portion 102 with the delivery roller 104 again.

By employing the aforesaid structure, the related art can omit the structure of a surface reversing portion and the like that are needed in conventional structures, and thereby the related art can realize further miniaturization and the reducing of the cost.

However, it has recently been invented to dispose a treating apparatus 106 for executing stapling processing, sorting processing and the like in the delivery space portion 102 as shown in FIG. 41 for the coexistence of the space saving property thereof and the high productivity thereof. In the case where the treating apparatus 106 is set in the delivery space portion 102 in the copying machine that is possible to reverse the surfaces of sheets and was described with respect to the related art, it becomes necessary for the machine to be equipped with transportation rollers 106b, which receive a sheet delivered from the delivery roller 104 on the side of the main body of the machine and transport the received sheet to a treating portion 106a such as a stapler, a guide 106c and so forth.

When it is tried to reverse a sheet by reversing the delivery roller 104 conventionally in a copying machine mounting the treating apparatus 106, as described above, because the related art image forming apparatus operates such that the trailing end of a sheet on one side of which an image is recorded protrudes from a delivery port and is transported into the image forming apparatus at the time of reversing in case of duplex recording, the guaranteed stackable height, or the regulated value of the fully stacked height, of the related art image forming apparatus should be set at a lower value with a margin lest a surface-reversed sheet should push out an already stacked sheet. Moreover, the related art image forming apparatus has inconvenience. The inconvenience is that the apparatus will give a user an uneasy impression at the sight of the manner such that a sheet has-once gone out and enters into the main body again. apparatus 106 is set in the delivery space portion 102 in the copying machine that is possible to reverse the surfaces of sheets and was described with respect to the related art, it becomes necessary for the machine to be equipped with transportation rollers 106b, which receive a sheet delivered from the delivery roller 104 on the side of the main body of the machine and transport the received sheet to a treating portion 106a such as a stapler, a guide 106c and so forth.

When it is tried to reverse a sheet by reversing the delivery roller 104 conventionally in a copying machine mounting the treating apparatus 106, as described above, because the related art image forming apparatus operates such that the trailing end of a sheet on one side of which an image is recorded protrudes from a delivery port and is transported into the image forming apparatus at the time of reversing in case of duplex recording, the guaranteed stackable height, or the regulated value of the fully stacked height, of the related art image forming apparatus should be set at a lower value with a margin lest a surface-reversed sheet should push out an already stacked sheet. Moreover, the related art image forming apparatus has inconvenience. The inconvenience is that the apparatus will give a user an uneasy impression at the sight of the manner such that a sheet has once gone out and enters into the main body again.

Moreover, the surface reversing operation of the related art image forming apparatus in the state of setting the treating apparatus 106 is performed as follows. That is, an end portion of a long sheet enters into the reception portion, and then the long sheet passes through a nip by the transportation rollers 106b of the treating apparatus 106. After that, the long sheet is reversed.

When a stepping motor is used for the control of the transportation rollers 106b, the related art image forming apparatus consequently has a possibility of bringing about buckling, step-out and the like because suitable synchronization cannot be realized owing to the fact that different controllers are used for the delivery roller 104 of the main body of the image forming apparatus and the stepping motor. For the prevention of this possibility, it becomes necessary to add a new mechanism for releasing the nip of the transportation rollers 106b of the treating apparatus 106.

For the prevention of these problems, it becomes necessary to take the following measures. That is, the distance between the delivery roller 104 on the main body and the transportation rollers 106b is set to be large. In other words, the distance between the delivery roller 104 in the delivery space portion 102 and the treating apparatus 106. However, when the treating apparatus 106 is kept at a distance from the delivery roller 104, the treating apparatus 106 protrude from the main body of the copying machine, which impedes the achievement of the object of space saving.

Also the problems of increase in size and cost are produced because the mechanism for releasing the nip of the transportation roller 106b and other mechanisms are added.

Next, there is an image forming apparatus in a structure with a stack tray that can lift/lower and is disposed on the side of the image forming apparatus as an image forming apparatus capable of stacking a great many sheets on which images have been formed and stacks of sheets that have been subjected to an aftertreatment such as stitching after the formation of images. The height position of the uppermost sheet stacked on the stack tray is detected and adjusted by, for example, a sheet surface detection lever and a sheet surface detection sensor.

However, the related art image forming apparatus is worried about the following thing.

Because the stack tray is situated on the outside adjoining the image forming apparatus, then even if a sheet-aftertreatment apparatus is disposed between an image-reading portion and an image-forming portion, it is difficult to form the image forming apparatus in a small size. Accordingly, it is considerable to dispose the stack tray, too, between the image-reading portion and the operation portion of the main body of the image forming apparatus, and the image-forming portion. However, only by the employment of such a disposition, the stack tray is disposed immediately under the image-reading portion and the operation portion. Consequently, when a user looks the image-reading portion and the operation portion down from an upper position for taking out sheets or stacks of sheets that have been delivered on the stack tray, the stack tray is overlapped with the image-reading portion and the operation portion at a position immediately under them and the user cannot look at the sheets or the stacks of sheets that are stacked on the stack tray. Accordingly, the user is obliged to take out the sheets or the stacks of sheets by groping for them to grasp them. Consequently, the image forming apparatus is inferior in visibility and taking out property.

It is considerable that the space between the image-reading portion and the operation portion, and the tray portion is widened as a structure for resolving the problem. Such a structure improves the visibility and the taking out property. However, the structure brings about the increase of the heights of the image-reading portion and the operation portion, and the whole height of the image forming apparatus is consequently heightened by the degrees. Consequently, it is considerable that the increase of the heights brings about the difficulty of the users setting of originals on the image-reading portion, and that the increase of the heights brings about the increase in size of the image forming apparatus.

Moreover, because the stack tray rises and falls, the stack tray sometimes vibrate when it begins to rise or to fall, or during it is lifting or lowering, or when it is stopping. It is the possibility that the vibrations cause the following problems.

At first, there is a case where the stackability is impaired because the positions of the sheets, which have already been stacked on the tray, are shifted owing to the vibrations. Or, when the sheet surface detection lever receives the vibrations and vibrates synchronously with the vibrations, the vibrations of the sheet surface detection lever causes the chattering of a sensor for detecting the operation of the sheet surface detection lever to make it impossible to detect the position of the stack tray. Consequently, there sometimes happen the following cases. That is, the sheets and the stacks of sheets are not stacked at a predetermined position on the stack tray, or even if they are stacked at the predetermined position, they are not stacked in good order. This state makes it difficult for a user to grasp them.

For a method for preventing the chattering of the sensor, it can be considered not to make the sheet surface detection lever vibrate even if the stack tray vibrates by increasing the lowering amount of the stack tray and by making the stack tray descend up to a position where the upper most sheet of the sheets or the stacks of sheet that are stacked on the stack tray is not contact with the sheet surface detection lever. However, the method enlarges the space in the vertical direction of the apparatus by the lowering amount of the stack tray. Consequently, the method causes a problem that the height of the image forming apparatus becomes high.

SUMMARY OF THE INVENTION

The present invention was made in view of the aforesaid actual circumstances. A first object of the invention is to provide a sheet treating apparatus capable of being easily mounted in a sheet delivery space in an image forming apparatus with precision and a method of mounting the sheet treating apparatus.

Another object of the invention accompanying the first object is to provide an image forming apparatus equipped with the sheet treating apparatus.

Moreover, the present invention was made in view of the aforesaid problem. A second object of the invention is to increase the number of stackable sheets in an apparatus for delivering sheets to stack the delivered sheets in a space formed in the frame of the apparatus.

According to the present invention, the foregoing and other objects and advantages are attained by a sheet treating apparatus mountable in a space of an image forming apparatus, the image forming apparatus including an image-forming portion for forming an image on a sheet, an image-reading portion for reading an image of an original, the image-reading portion being disposed above the image-forming portion, and the space into which the sheet is delivered, the space being formed between the image-forming portion and the image-reading portion, the sheet treating apparatus comprising: a connection path unit connected with a sheet delivery path for delivering the sheet from the image-forming portion, the connection path unit being mounted in the space from an outside of a side surface of a main body of the image forming apparatus; and a sheet-treating unit for performing a treatment of the sheet transported from the connection path unit, the sheet-treating unit being mounted in the space from a front side of the main body of the image forming apparatus.

Moreover, the connection path unit preferably comprises a sheet path including: a rotation guide rotatable to the outside of the main body of the image forming apparatus; and a fixed guide fixed to the main body of the image forming apparatus.

Moreover, in a method for mounting a sheet treating apparatus of the invention, the sheet treating apparatus is mounted in a space of an image forming apparatus, the image forming apparatus including an image-forming portion for forming an image on a sheet, an image-reading portion for reading an image of an original, the image-reading portion being disposed above the image-forming portion, and the space into which the sheet is delivered, the space being formed between the image-forming portion and the image-reading portion, the sheet treating apparatus comprising in the space: a connection path unit connected with a sheet delivery path for delivering the sheet from the image-forming portion; and a sheet-treating unit for performing a treatment of the sheet transported from the connection path unit, the method comprising the steps of: mounting the connection path unit in the space from an outside of a side surface of a main body of the image forming apparatus; and mounting the sheet-treating unit in the space from a front side of the main body of the image forming apparatus.

Moreover, the sheet-treating unit is preferably mounted after the connection path unit has been mounted.

Moreover, in an image forming apparatus of the invention, the apparatus includes an image-forming portion for forming an image on a sheet, an image-reading portion for reading an image of an original, the image-reading portion being disposed above the image-forming portion, and a space into which the sheet is delivered, the space being formed between the image-forming portion and the image-reading portion, the image forming apparatus comprising: a sheet treating apparatus including a connection path unit connected with a sheet delivery path for delivering the sheet from the image-forming portion, and a sheet-treating unit for performing a treatment of the sheet transported from the connection path unit, wherein the connection path unit is mounted in the space from an outside of a side surface of a main body of the image forming apparatus and the sheet-treating unit is mounted in the space from a front side of the main body of the image forming apparatus.

Moreover, the connection path unit preferably comprises a sheet path including: a rotation guide rotatable to the outside of the main body of the image forming apparatus; and a fixed guide fixed to the main body of the image forming apparatus.

A typical structure of the present invention for achieving the aforesaid second object is an image forming apparatus including an image-reading portion for reading an image of an original, the image-reading portion being disposed an upper part of the apparatus, and image-forming portion for forming an image on a sheet, the image-forming portion being disposed below the image-reading portion with a space, and a sheet delivery portion in the space formed between the image-reading portion and the image-forming portion in a frame of the apparatus, the sheet treating apparatus comprising: a taper formed on an edge portion of a bottom of the image-reading portion forming the space in the frame of the apparatus.

Moreover, the taper is formed at a position of the edge portion of the bottom of the image-reading portion, the position being opposed to a sheet stacking surface of the sheet delivery portion.

Moreover, the taper formed at the edge portion of the bottom of the image-reading portion forms an inclined surface at an angle within a range of about 20 degrees to 30 degrees to a surface on which the apparatus is established.

A still further object of the invention is to provide an image forming apparatus capable of resolving a problem in the case where a treating apparatus is mounted in a delivery space portion in an in-body delivery type image forming apparatus, and the image forming apparatus being capable of achieving the space saving thereof and the high convenience thereof for a user.

A typical structure of the invention for achieving the aforesaid object is an image forming apparatus including a space portion, in which a sheet is delivered, between an image-reading portion and an image-forming portion, the image forming apparatus comprising: a treating apparatus for performing a predetermined treatment of the sheet, the treating apparatus being set in the space portion; and a reverse path for reversing the sheet, the reverse path being disposed above the treating apparatus.

Furthermore, the present invention aims at providing an image forming apparatus having a structure such that sheets and stacks of sheets are delivered in an opened portion at an intermediate position of the main body of the apparatus in a vertical direction, in which apparatus the delivered sheets are easy to look at from an upper position. The invention further aims at providing a sheet stacking apparatus and a sheet aftertreatment apparatus that are used for the image forming apparatus.

For achieving the aforesaid objects, an image forming apparatus of the invention comprises: image reading means for reading an image of an original; image forming means for forming the image on a sheet on a basis of image reading information of the image reading means; delivery sheet stacking means for stacking the sheet on which the image has been formed by the image forming means, the delivery sheet stacking means being disposed below the image reading means; operation means for inputting information necessary for forming the image, the operation means being disposed at a part around the image reading means; and an exposed part through which the delivery sheet stacking means is exposed to be seen from the image reading means and the operation means when the image reading means and the operation means are seen in plan.

A part around the image forming apparatus of the invention is a part on a front side of the image reading means.

The exposed part of the image forming apparatus of the invention is situated at a front side of the delivery sheet stacking means.

The image forming apparatus of the invention further comprises: treatment sheet stacking means for stacking the sheet delivered from the image forming means; and sheet delivery means for delivering the sheet stacked on the treatment sheet stacking means, wherein the sheet delivery means can delivery the sheet to the exposed part.

The image forming apparatus of the invention further comprises: treatment sheet stacking means for stacking the sheet delivered from the image forming means; sheet treating means for treating the sheet stacked on the treatment sheet stacking means; and sheet delivery means for delivering the sheet treated by the sheet treating means to the delivery sheet stacking means, wherein the sheet delivery means can deliver the sheet to the exposed part.

The image forming apparatus of the invention further comprises sheet aligning means for aligning at least either of an end portion of the sheet stacked on the treatment sheet stacking means, the end portion being parallel to a delivery direction of the sheet, and another end potion of the sheet in the delivery direction.

The image forming apparatus of the invention further comprises: lift/lower means for lifting and lowering the delivery sheet stacking means; and a vibration-preventing member being elastic, the vibration-preventing member being disposed between a fixed member opposed to the delivery sheet stacking means and the delivery sheet stacking means.

The image forming apparatus of the invention further comprises: lift/lower means for lifting and lowering the delivery sheet stacking means; lift/lower guide means for guiding lift/lower of the delivery sheet stacking means; supporting means for supporting the delivery sheet stacking means in a state of being capable of lifting and lowering; and a vibration-preventing member being elastic, the vibration-preventing member being disposed between a fixed member opposed to the delivery sheet stacking means and the delivery sheet stacking means, wherein the supporting means and the lift/lower guide means are disposed at an inner rear side of a main body of the image forming apparatus.

The vibration-preventing member of an image forming apparatus of the invention is set on either of the fixed member or the delivery sheet stacking means, and the image forming apparatus further comprises a sliding auxiliary member having a coefficient of friction smaller than that of the vibration-preventing member, the sliding auxiliary member being set on a surface opposed to another of the fixed member and the delivery sheet stacking means.

The vibration-preventing member of an image forming apparatus of the invention is a sponge.

An image forming apparatus of the invention further comprises lift/lower position detecting means for detecting a position of the sheet stacked on the delivery sheet stacking means.

For achieving the aforesaid objects, an sheet stacking apparatus of the present invention comprises: delivery sheet stacking means for stacking a sheet on which an image has been formed by image forming means of an image forming apparatus, the image forming means being for forming the image on the sheet; lift/lower means for lifting and lowering the delivery sheet stacking means; and a vibration-preventing member set between a fixed member opposed to the delivery sheet stacking means and the delivery sheet stacking means.

Lift/lower guide means for guiding lift/lower of the delivery sheet stacking means of the sheet stacking apparatus of the invention and supporting means for supporting the delivery sheet stacking means in a state of being capable of lifting and lowering are disposed on inner rear side of the main body of the sheet stacking apparatus.

The vibration-preventing member of the sheet stacking apparatus of the invention is set on either of the fixed member or the delivery sheet stacking means, and the sheet stacking apparatus further comprises a sliding auxiliary member having a coefficient of friction smaller than that of the vibration-preventing member, the sliding auxiliary member being set on a surface opposed to another of the fixed member and the delivery sheet stacking means.

The vibration-preventing member of the sheet stacking apparatus of the invention is a sponge.

The sheet stacking apparatus further comprises lift/lower position detecting means for detecting a position of the sheet stacked on the delivery sheet stacking means.

For achieving the aforesaid objects, a sheet aftertreatment apparatus of the present invention comprises: treatment sheet stacking means for stacking a sheet on which an image has been formed by image forming means of any one of aforesaid image forming apparatus; sheet treating means for treating the sheet stacked on the sheet stacking means; and sheet delivery means for delivering the sheet stacked on the treatment sheet stacking means.

For achieving the aforesaid objects, a sheet aftertreatment apparatus of the present invention is structured to perform a treatment of a sheet delivered from image forming means of an image forming apparatus, which image forming means forms an image on the sheet, and to deliver the sheet after the treatment to delivery sheet stacking means of any one of the aforesaid sheet stacking apparatus. The sheet after treatment apparatus comprises: treatment sheet stacking means for stacking the sheet delivered from delivered from the image forming means of the image forming apparatus, the image forming means forming an image on the sheet; sheet treating means for treating the sheet stacked on the sheet stacking means; and sheet delivery means for delivering the sheet treated by the sheet treating means.

The sheet aftertreatment apparatus of the invention further comprises sheet aligning means for aligning at least either of an end portion of a stack of sheets stacked on the treatment sheet stacking means, the end portion being parallel to a delivery direction of the sheets, and another end potion of the stack in the delivery direction.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION OF THE PREFERRED EMBODIMENTS

First Embodiment

Hereinafter, the attached drawings are referred while preferable embodiments of the present invention are exemplarily described in detail. Incidentally, the scope of the invention is not intended to be limited only to the sizes, the materials, the shapes, the relative dispositions of them, and the like of the components, which are described in the following embodiments unless an especially specifying mention is made.

Figure 3:
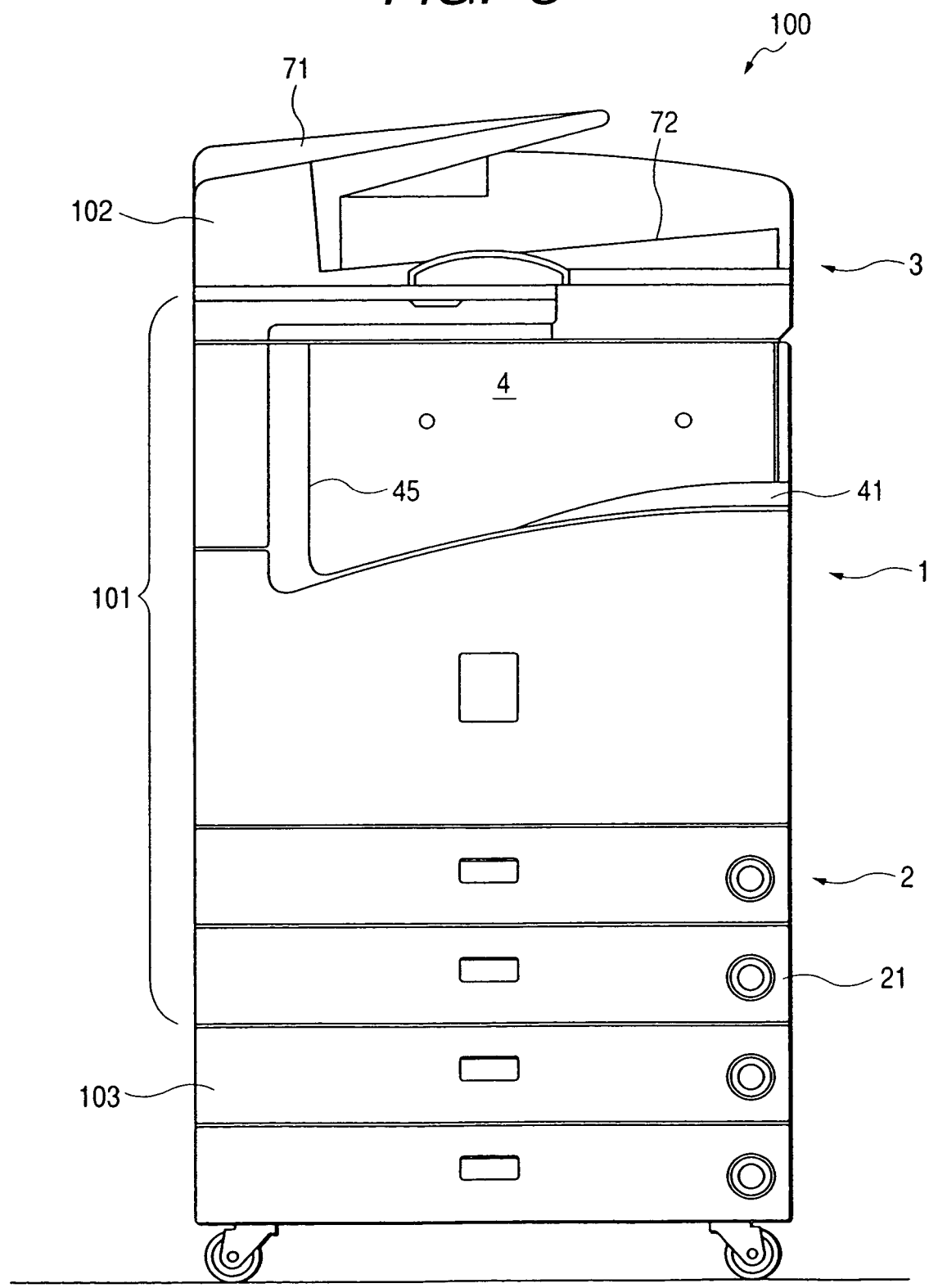
FIG. 3 is a front elevation of the image forming apparatus before the mount of the sheet treating apparatus.
Figure 4:
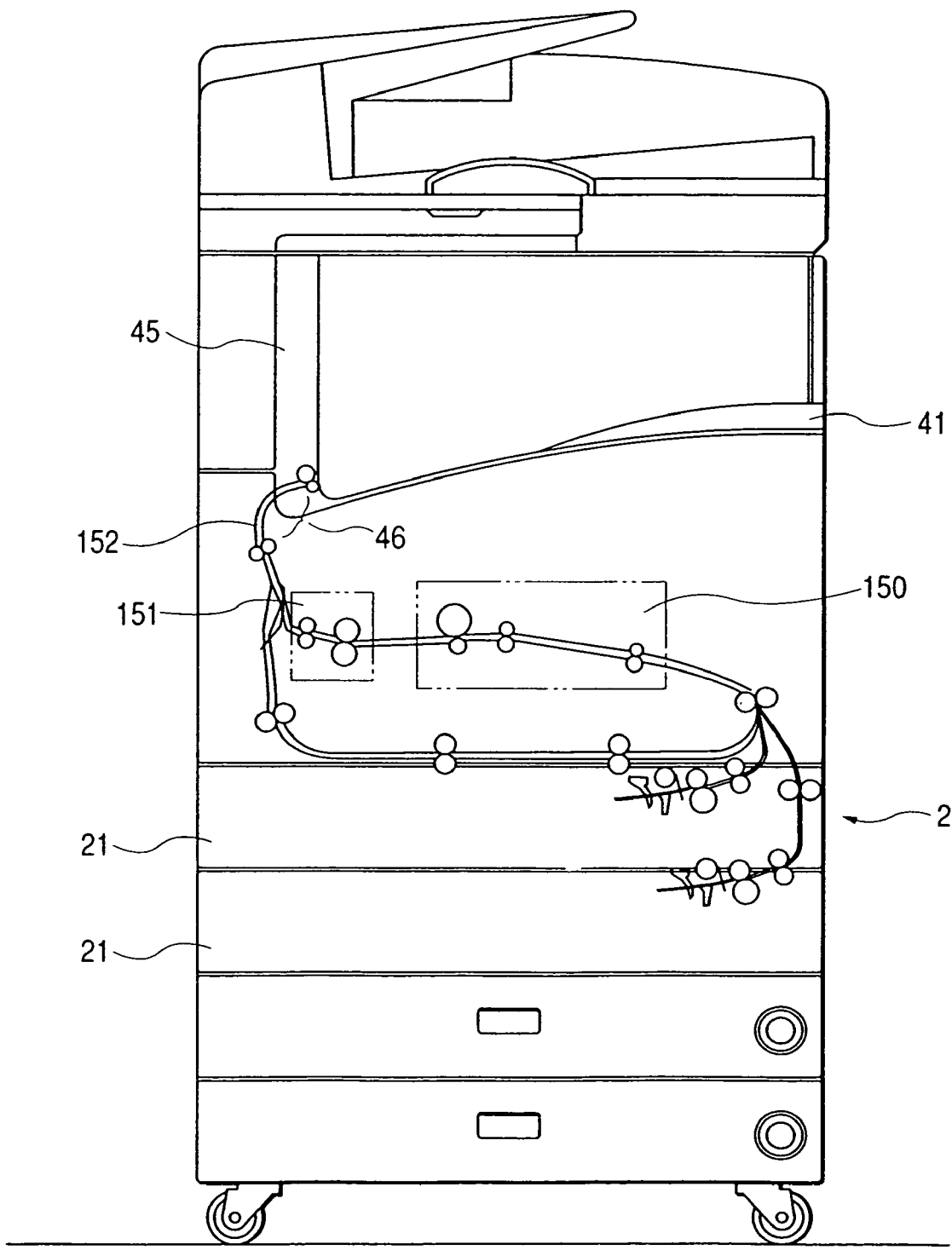
FIG. 4 is a cross section showing the structure of the image-forming portion of the image forming apparatus.

At first, a description is given to the structure of an image forming apparatus before the mount of a sheet treating apparatus according to the embodiment of the invention with reference to FIG. 3 and FIG. 4.

FIG. 3 is a front elevation of the image forming apparatus before the mount of the sheet treating apparatus, and FIG. 4 is a view showing the structure of the image-forming portion.

The image forming apparatus 100 shown in FIG. 3 consists of the main body thereof 101, a sheet feed table 103 mounted on the main body 101 at the lower part thereof as an option, and an automatic original-feeding apparatus (hereinafter referred to as an ADF) 102 mounted on the main body 101 on the top surface thereof as an option likewise.

The image forming apparatus 100 has both the functions of a copying machine and a facsimile machine. The apparatus 100 is the so-called digital copying machine that forms an image by converting the image information (optical signals) of an original that have been read into electric signals.

The image-forming portion 1 of the main body 101 is disposed at about the central part thereof, and a feed portion 2 is disposed below the image-forming portion 1. Moreover, a scanner portion 3 being an image-reading portion is disposed at the uppermost part of the main body 101. Then, a space is formed between the scanner portion 3 and the image-forming portion 1 as a delivery-space portion 4. The main body 101 of the present embodiment is designed to be wingless by utilizing the characteristic of a digital machine to separate the image-forming portion 1 and the scanner portion 3 for making the intermediated portion between them the delivery-space portion 4. Thereby, a space saving image forming apparatus without any projections on both sides of the apparatus is realized.

In the main body 101, the image-forming portion 1 is structured as a print engine by an electrophotographic process that has conventionally been known well. The image-forming portion 1 has the following apparatus built-in (FIG. 4). That is, a not shown laser writing apparatus, electrophotographic processing means 150, a fixing apparatus 151, a delivery transporting path 152, and the like are built in. The feed portion 2 includes two tiered feed cassettes 21, and the feed portion 2 feeds sheets to the image-forming portion 1. Each feed cassette 21 is a front-loading type such as each cassette 21 is pulled out to the front side of the apparatus for the supply of sheets. A grip for the pulling out is fixed at the central part on the front surface of the cassette 21.

In the scanner portion 3, a contact glass plate (not shown) is disposed on the top surface thereof, and a not shown scanner unit is disposed below the contact glass plate.

The delivery-space portion 4 is enclosed by the surfaces of walls on the side faces in two directions except for the front surface, that is, on the left side and the inside of the apparatus. The delivery-space portion 4 is further enclosed on the upper side and the lower side thereof by the scanner portion 3 and the image-forming portion 1, respectively.

A delivery tray 41, which is set at the lowermost part of the delivery-space portion 4 is disposed on the upper surface of the image-forming portion 1. A sheet delivery path 46 is formed in a delivery cover 45 in the machine, which forms the left-side wall of the machine in FIG. 4. Sheets on which recording has executed at the image-forming portion 1 are delivered on the delivery tray 41 from the under position of the delivery cover 41 in the machine in the height direction thereof.

The ADF 102 is mounted on the upper part of the main body 101 by a hinge (not shown) set on the inner part side of the apparatus. The ADF 102 is set to cover the contact glass plate at the top surface of the scanner portion 3 in a state such that the ADF 102 can be opened, shut and closed. Because the structure and the operation of the ADF 102 is the same as those that have conventionally been known, their detailed descriptions are omitted. Sheet constituting a stack of originals (not shown) set on the original stand 71 of the ADF 102 are transported on the contact glass plate one by one from the lowermost one of them. The originals the reading scanning of the scanner portion 3 of which has been completed are delivered on an original delivery stand 72.

In case of a copy without using automatic original feeding or a copy of a book or a note, the ADF 102 can be used as a pressure plate. Incidentally, in the case where the ADF 102, which is an optional, is not mounted, a pressure plate for pressing the originals on the contact glass plate is mounted on the top surface of the scanner portion.

The sheet feed table 103 includes two tiered feed cassettes like the feed portion 2 of the main body 101. Consequently, in the image forming apparatus 100 of the present embodiment, four tiered feed cassettes in total constitute the feed portion. Incidentally, the upper side cassette of the feed portion 2 of the main body 101 may be changed to an automatic duplex unit (duplex tray), which makes it possible to execute duplex copying.

Figure 5:
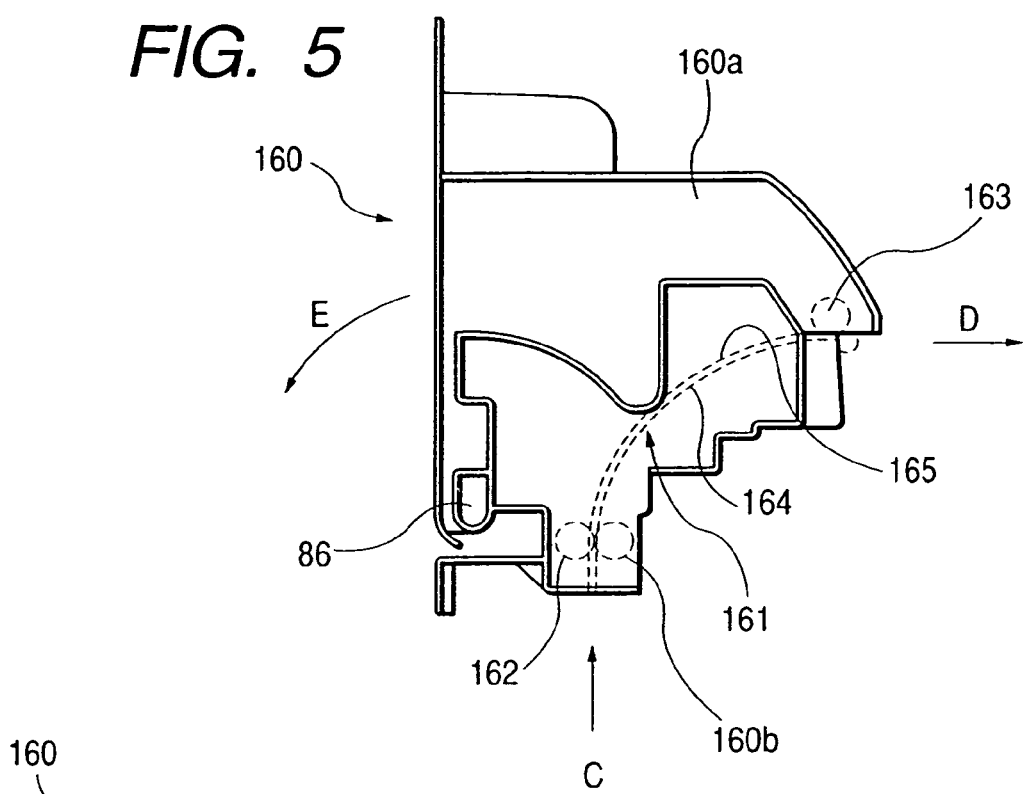
FIG. 5 is a side elevation of an optional sheet delivery unit for the sheet treating apparatus according to the present embodiment of the invention.
Figure 6:
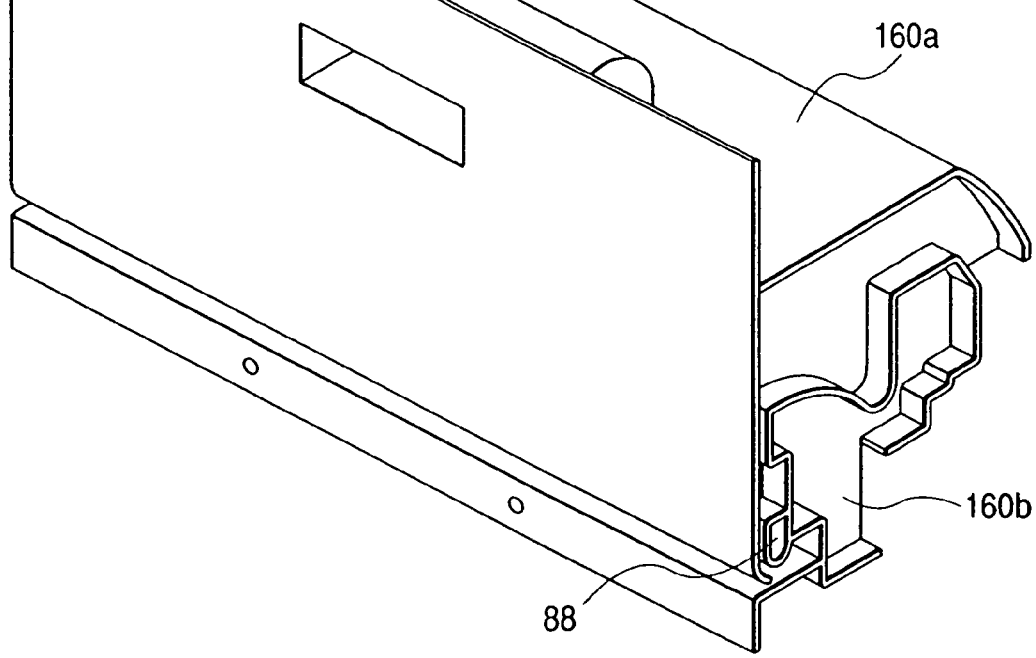
FIG. 6 is a perspective view of the optional sheet delivery unit for the sheet treating apparatus according to the present embodiment of the invention.
Figure 7:
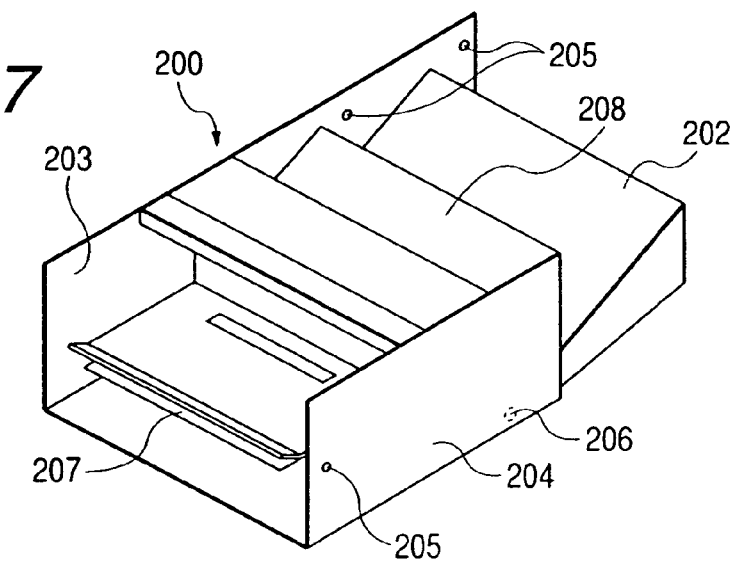
FIG. 7 is a perspective view of the main body of a finisher of the sheet treating apparatus according to the present embodiment of the invention.

Next, while the structure of a sheet treating apparatus according to an embodiment of the present invention is described, FIGS. 5 to 7 are referred.

A finisher as the sheet treating apparatus, as shown in FIG. 7, is composed of the main body 200 of the finisher and an optional sheet delivery unit 160 shown in FIG. 5.

The optional sheet delivery unit 160 is a connection path unit including a connection delivery path 161 to be connected with the sheet delivery path 152 set on the top surface of the image-forming portion 1 of the image forming apparatus 100. The optional sheet delivery unit 160 receives a sheet from the image-forming portion in the direction indicated by an arrow C, and delivers the sheet in the direction indicated by an arrow D to hand over the sheet to the main body 200 of the finisher. FIG. 6 is a perspective view of the optional sheet delivery unit 160.

The connection delivery path 161 includes a pair of transportation rollers 162 and a pair of delivery rollers 163. The connection delivery path 161 further includes sheet delivery path guides 164 and 165 for guiding a sheet.

The main body 200 of the finisher is a sheet-treating unit which performs a series of sheet stapling treatment: aligning a plurality of sheets forwarded from the optional sheet delivery unit 160, stapling the sheets with stapling means 209, and delivering the stapled stack of the sheets to a stack tray 202. Incidentally, the structure of the finisher is described in detail in the U.S. patent application Ser. No. 610376, which is incorporated herein by reference.

Although the finisher for performing the staple treatment is exemplified as a sheet treating apparatus in the present embodiment, there are also punching (hole-cutting), stamping, and the like besides alignment of sheets and stapling as the functions of the finisher. Moreover, the finisher may be a sorter for performing the sorting of sheets. Because these structures of the finisher are the same as those that are well known, their detailed descriptions are omitted.

The main body 200 of the finisher is chiefly composed of a front side plate 204, a rear side plate 203, a sheet receiving portion 207, a treating tray 208, and a stack tray 202 capable of expanding and contracting correspondingly to a large size sheet.

The optional sheet delivery unit 160 is composed of a rotation guide portion 160a and a fixed guide portion 160b. Both the guides 160a and 160b form a sheet path. The rotation guide portion 160a is rotatably fitted into a fitting portion 88 of the fixed guide portion 160b. At the time of jam clearance, the sheet path can be opened by the rotation of the rotation guide portion 160a in the direction indicated by an arrow E in FIG. 5.

Such a finisher is the optional equipment of the in-body delivery type image forming apparatus 100 mentioned above, and the finisher is mountable in the delivery-space portion 4.

Figure 1:
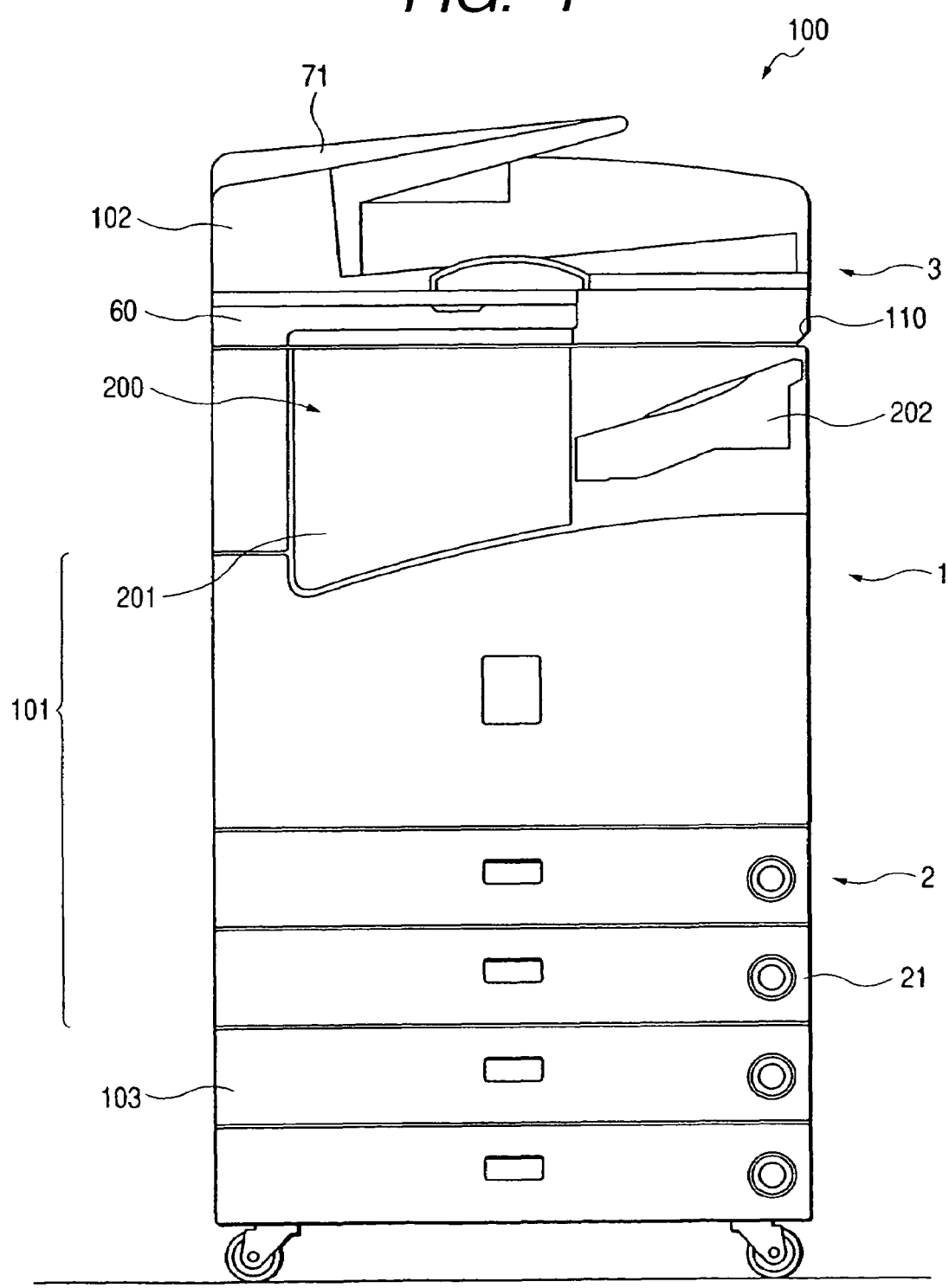
FIG. 1 is a front elevation showing an image forming apparatus mounting a sheet treating apparatus according to an embodiment of the present invention.

FIG. 1 is a front elevation of the image forming apparatus mounting the sheet treating apparatus according to the embodiment. Moreover, FIG. 2 is a cross section showing the structure of a sheet path in case of mounting the sheet treating apparatus.

Figure 2:
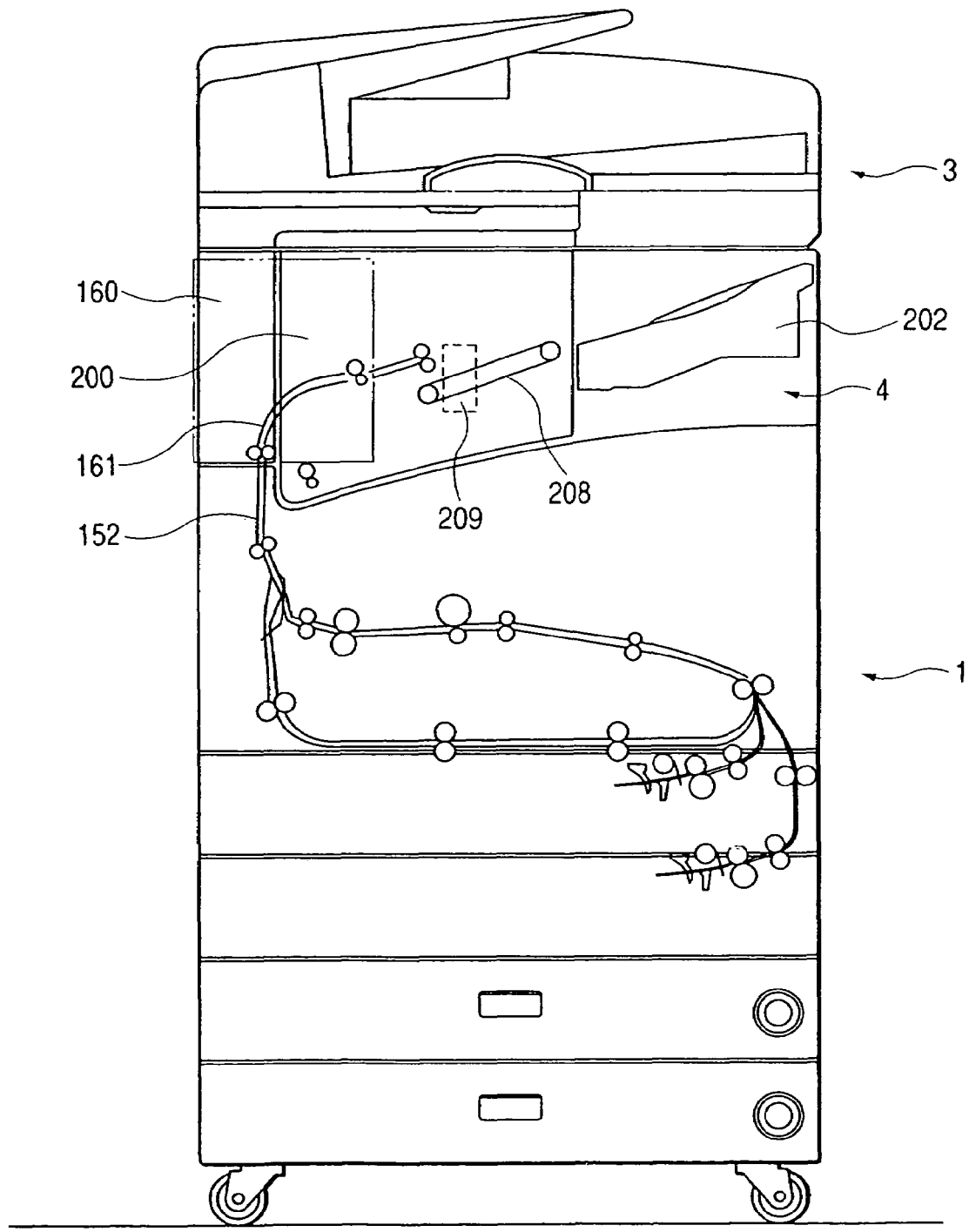
FIG. 2 is a cross section showing the structure of a sheet path in case of mounting the sheet treating apparatus according to the embodiment of the invention.

While the copying operation of the image forming apparatus 100 mounting the finisher in the case where the ADF 102 is used as a pressure plate is described as an example, FIGS. 1 and 2 are referred.

At first, an original is put on the contact glass plate at the top surface of the scanner portion 3. After the closing of the ADF 102, the number of sheets to be copied is designated with an operation portion 60, and then a start button is pushed. Then, the scanner unit starts the reading of the original, and the read image information of the original is digitalized by the photoelectric transformation to be treated as an image.

A laser writing apparatus of the image-forming portion 1 is driven on the basis of the treated signals to form an electrostatic latent image on a photosensitive drum. The latent image is visualized as a toner image and transferred on a sheet fed from the feed cassettes 21 of the sheet feed table 103. The toner image transferred on the sheet is fixed by the fixing apparatus 151, and is transported to the optional sheet delivery unit 160.

The sheet on which the image has already been formed is transported to the treating tray 208 of the main body 200 of the finisher through the sheet path of the optional sheet delivery unit 160. After the prescribed treatment such as alignment and sapling, the sheet is delivered on the stack tray 202.

Next, a finisher mounting method into the in-body delivery type image forming apparatus is described in due order.

Figure 8:
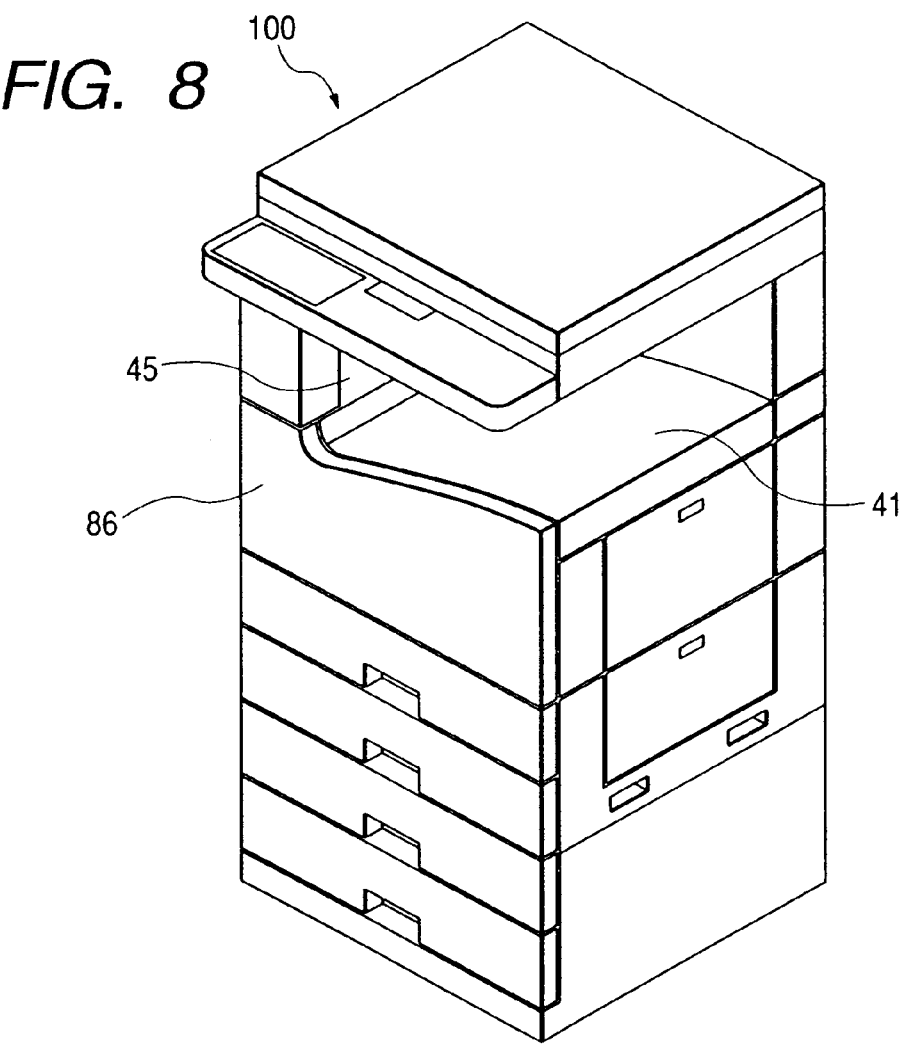
FIG. 8 is a perspective view of the image forming apparatus before the mount of the sheet treating apparatus.
Figure 9:
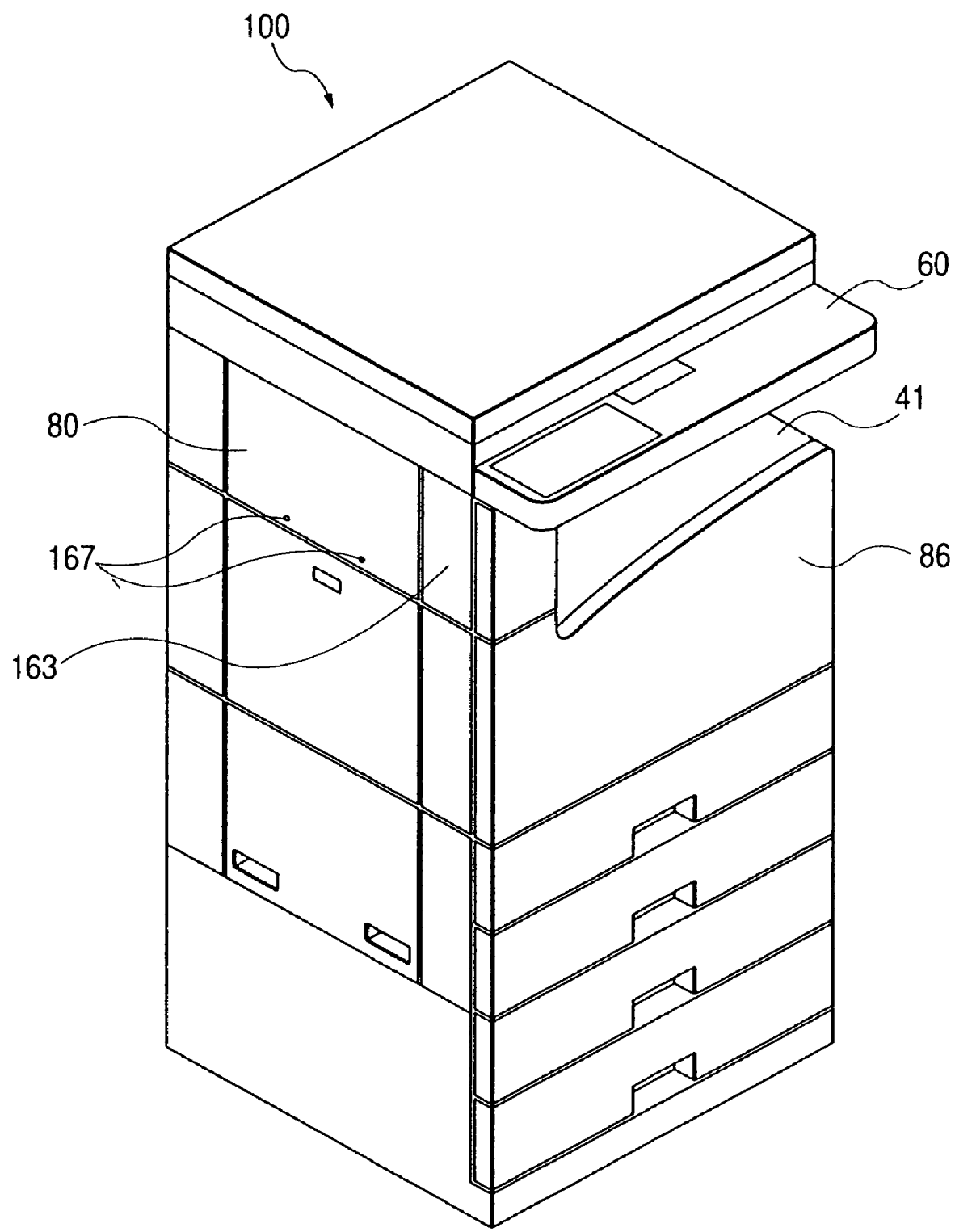
FIG. 9 is another perspective view of the image forming apparatus before the mount of the sheet treating apparatus.

FIG. 8 and FIG. 9 are perspective views of the in-body delivery type image forming apparatus before the mount of the finisher.

At first, the preparation operation of the in-body delivery type image forming apparatus for mounting the finisher is described.

Figure 10:
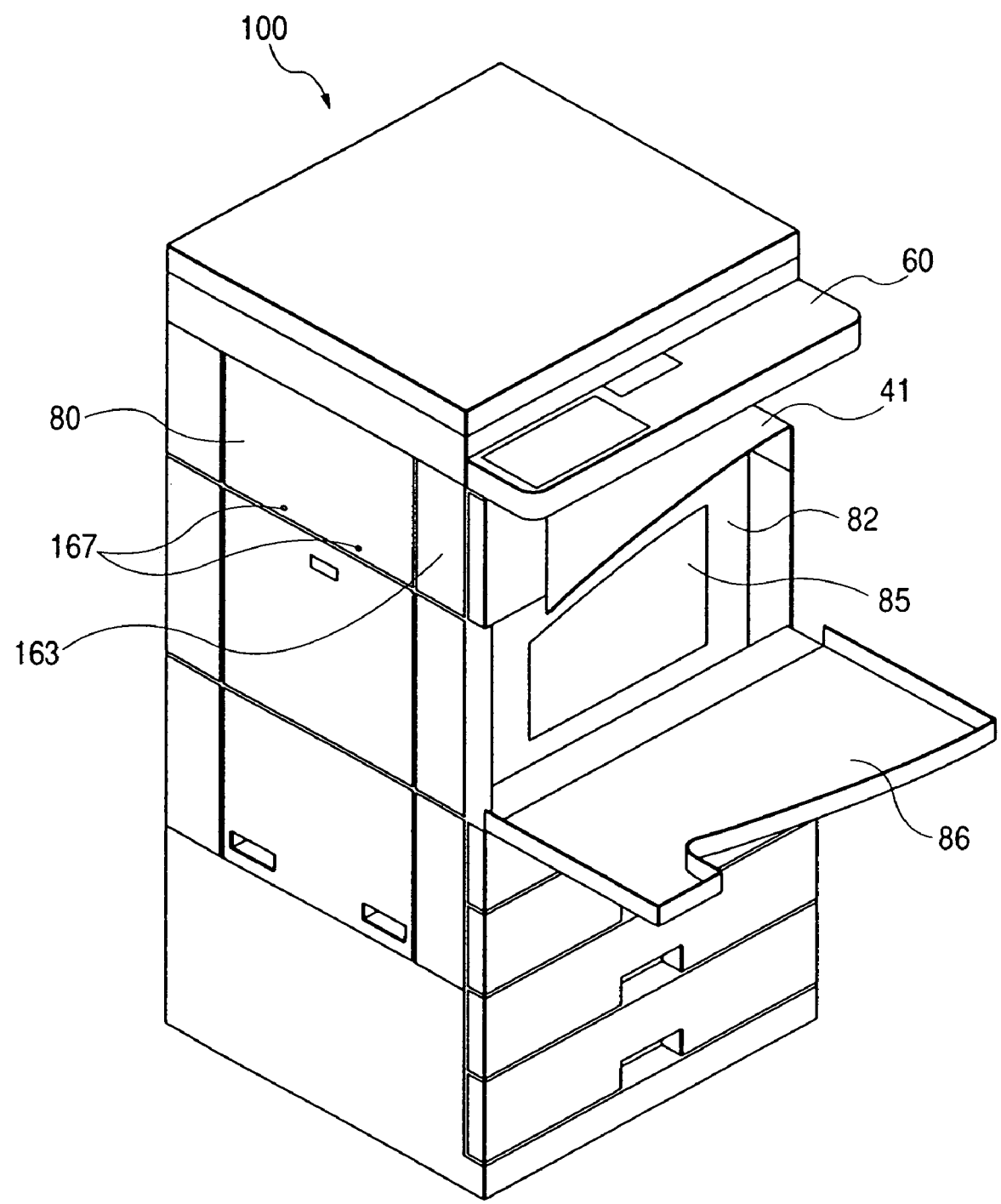
FIG. 10 is a perspective view of the image forming apparatus showing a state such that the front door thereof is opened for the preparation of the mount of the sheet treating apparatus.
Figure 11:
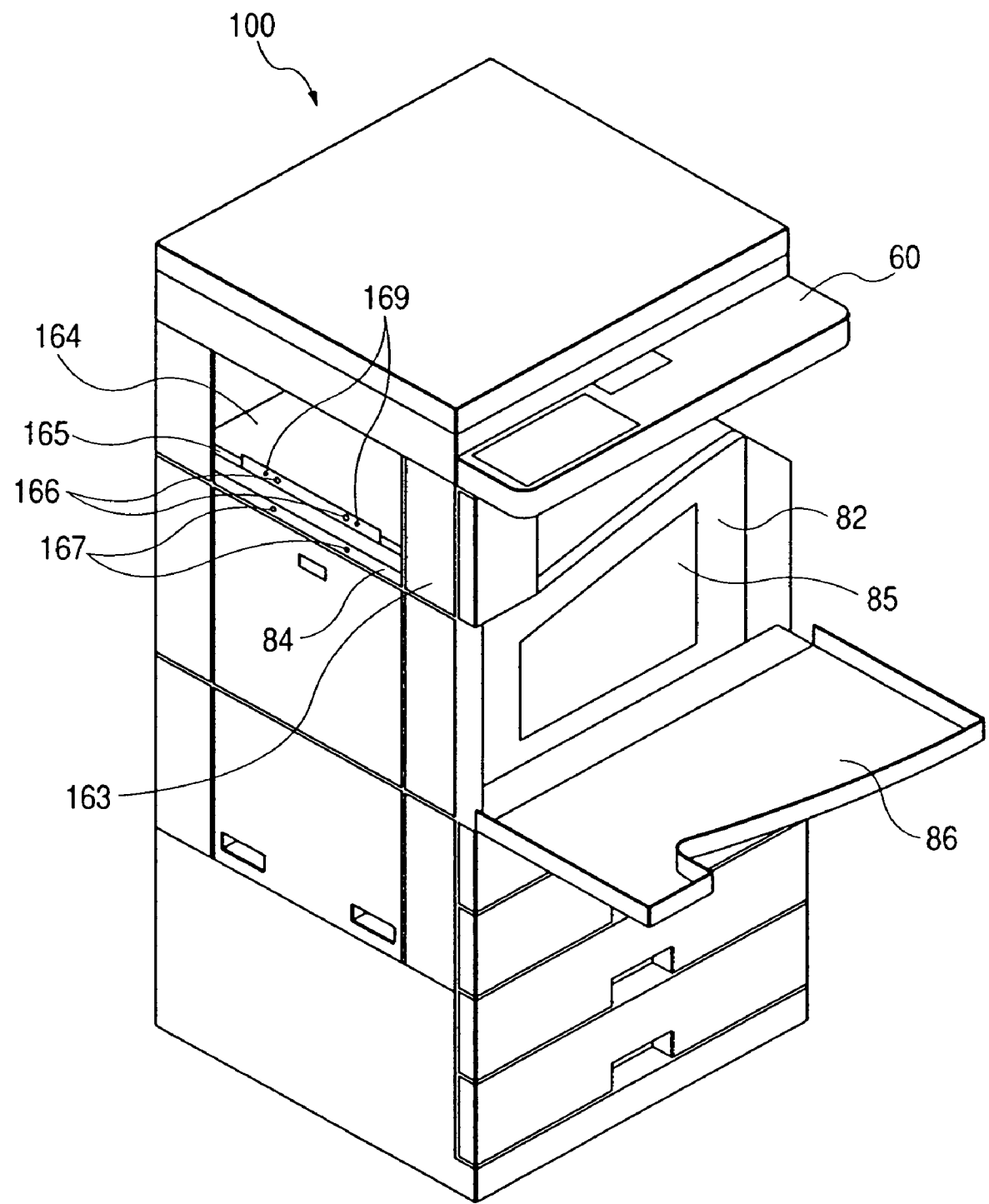
FIG. 11 is a perspective view of the image forming apparatus showing a state such that the tray and the cover thereof are removed for the preparation of the mount of the sheet treating apparatus.

A front door 86 is opened to the front side of the main body of the apparatus at first (FIG. 10). Next, the delivery cover 45 in the machine and the delivery tray 41 fixed to a front side plate 82 with not shown screws are removed. At the same time, a cover 80 fixed on a stay of the main body with screws 167 on the upper left side of the main body is removed from the main body. FIG. 11 is a perspective view of the image forming apparatus showing a state such that all of them are removed from the main body. The state is the state such that the preparation of the mount of the finisher has been completed.

Next, the operation of the mount of the finisher is described.

The finisher is composed of the main body 200 thereof and the optional sheet delivery unit 160. Each of them is divided to be separately mounted on the image forming apparatus 100. Moreover, the optional sheet delivery is composed of the rotation guide portion 160a and the fixed guide portion 160b.

Figure 12:
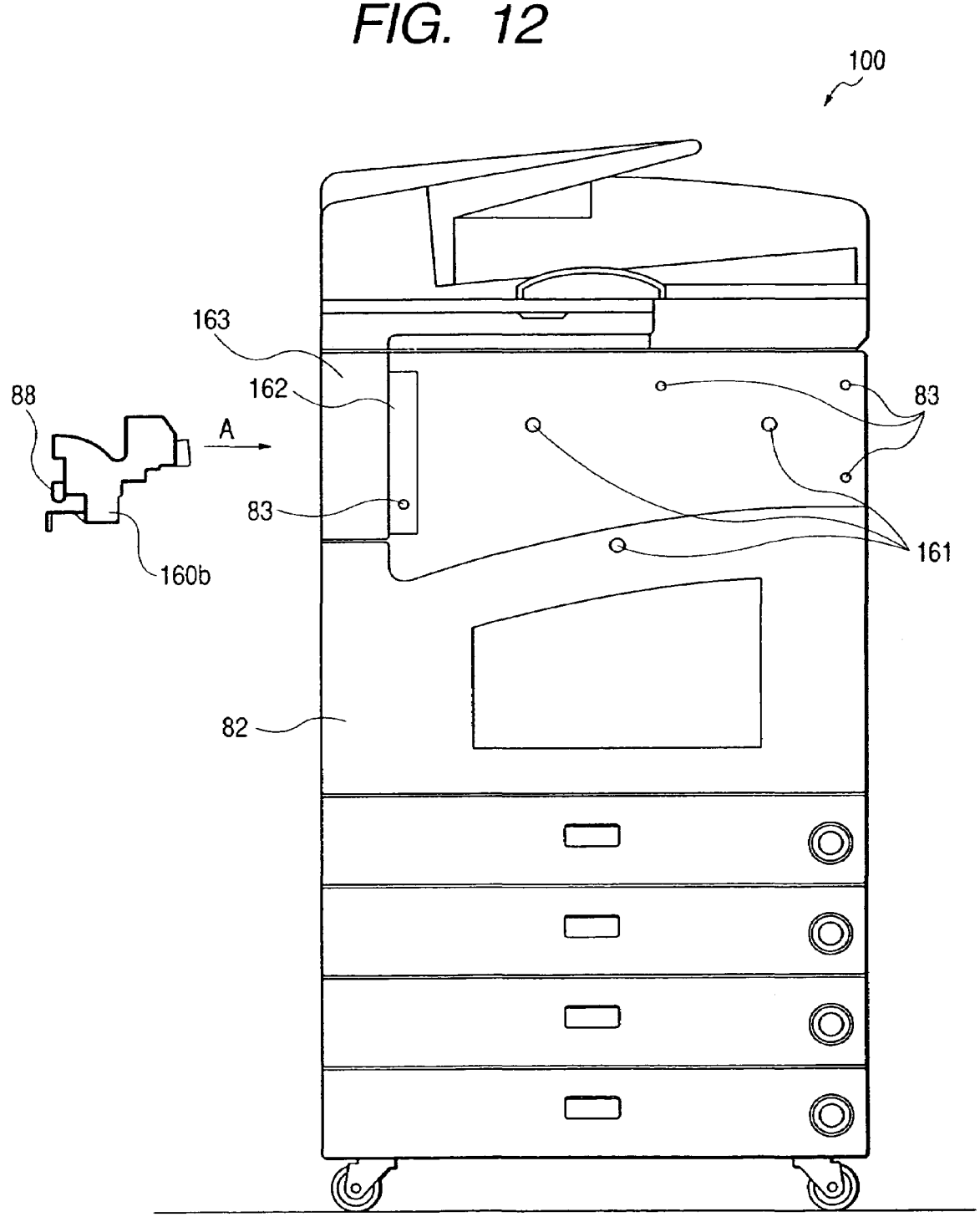
FIG. 12 is a front elevation showing the installing direction of a fixed guide portion.

As the mounting operation, at first, the fixed guide portion 160b is furnished to the in-body delivery type image forming apparatus 100 from the direction indicated by an arrow A (FIG. 12). Then, two holes 169 formed in the mounting stay 165 shown in FIG. 11 and the two holes of a main body stay 84 are fixed with the screws 167 from the outside of the side surface of the main body.

Figure 13:
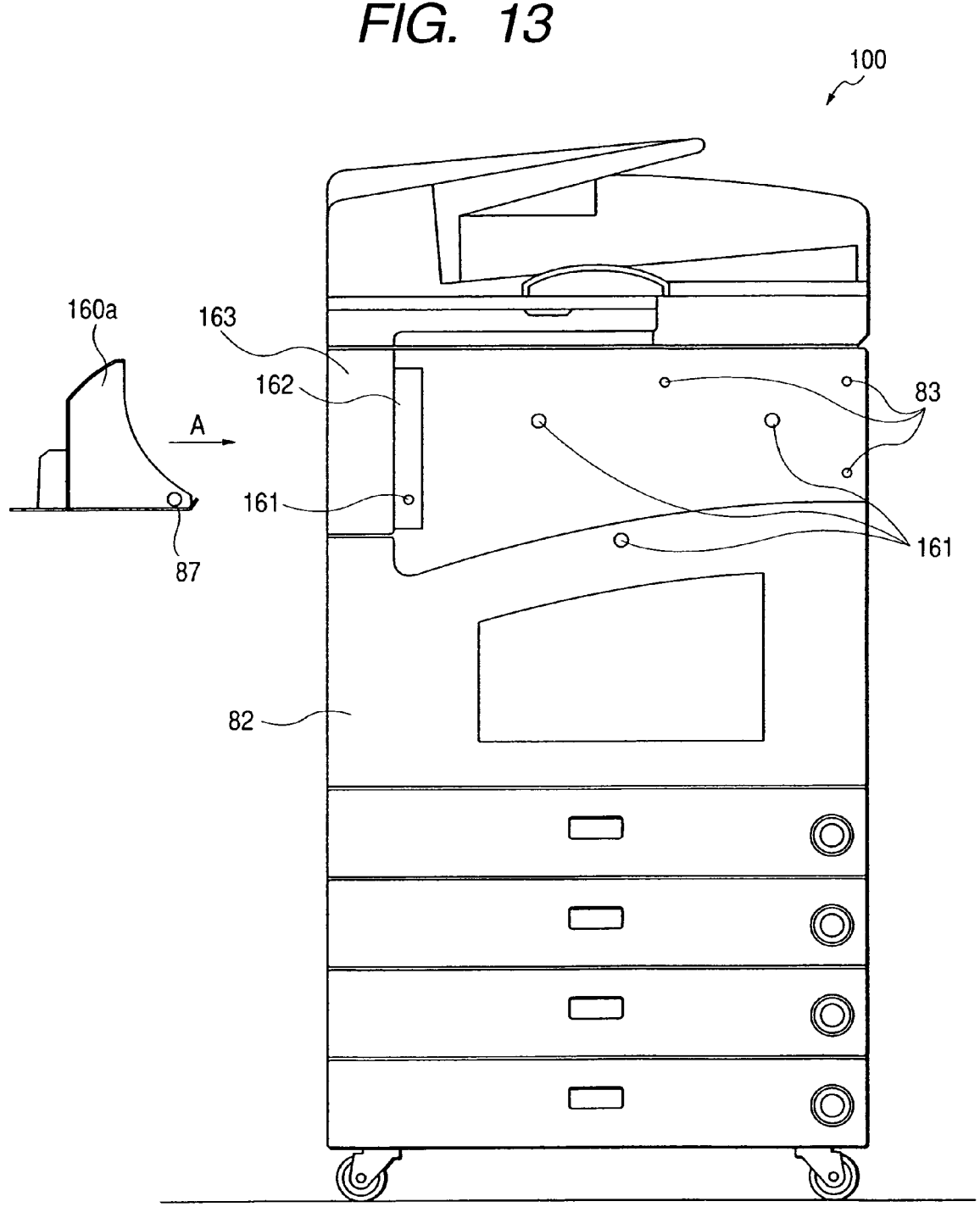
FIG. 13 is a front elevation showing the installing direction of a rotation guide portion.

Next, the rotation guide portion 160a is fixed from the direction indicated by the arrow A (FIG. 13). At this time, a boss 87 formed on the rotation guide portion 160a is rotatably fitted in the fitting portion 88 of the fixed guide portion 160b.

Next, the main body 200 of the finisher is mounted in the in-body delivery type image forming apparatus 100.

Figure 14:
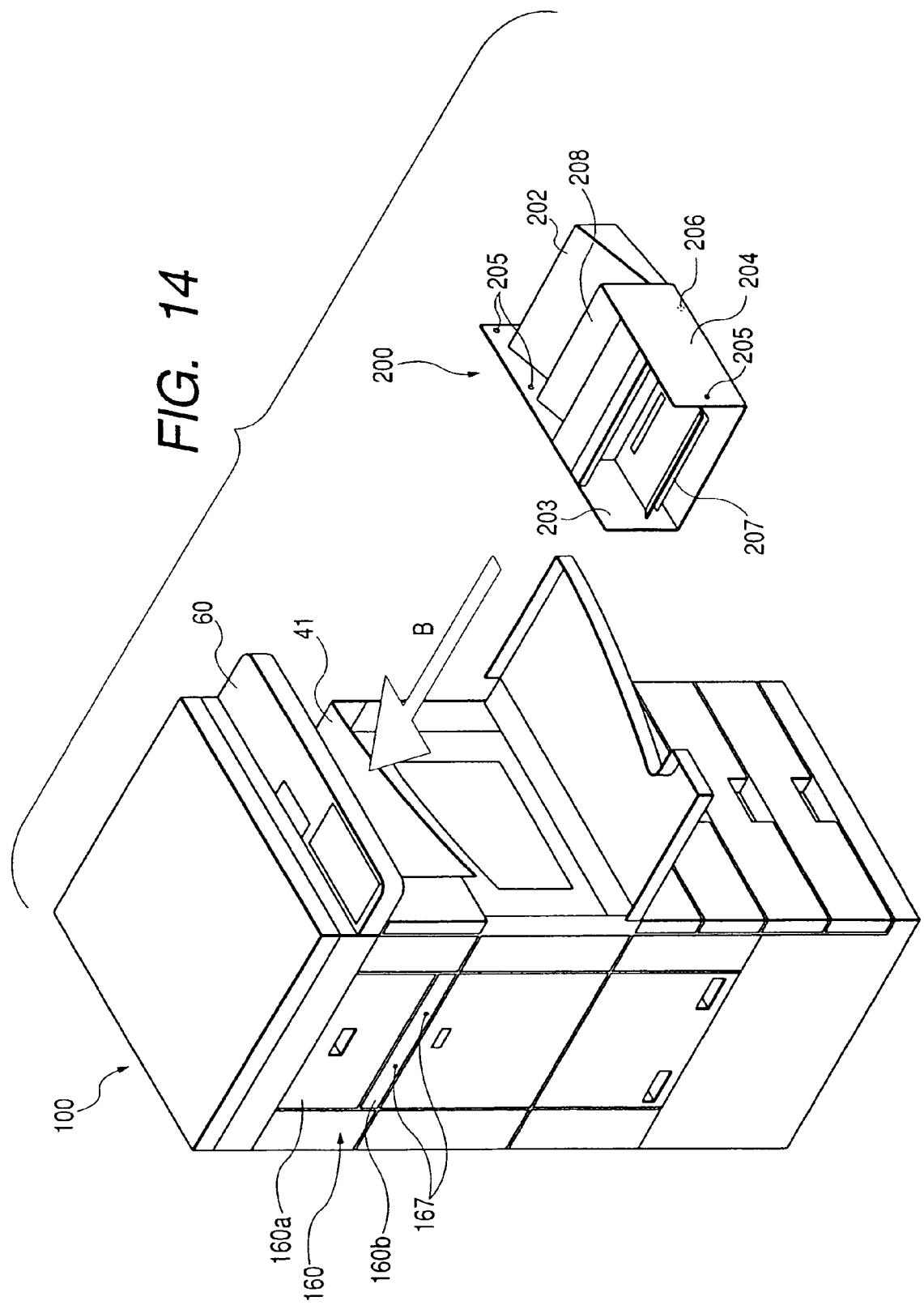
FIG. 14 is a perspective view of the installing direction of the main body of the finisher.

The main body 200 is straightly inserted into the delivery-space portion 4 in the mounting direction indicated by an arrow B from the front side of the apparatus 100 as shown in FIG. 14.

Figure 15:
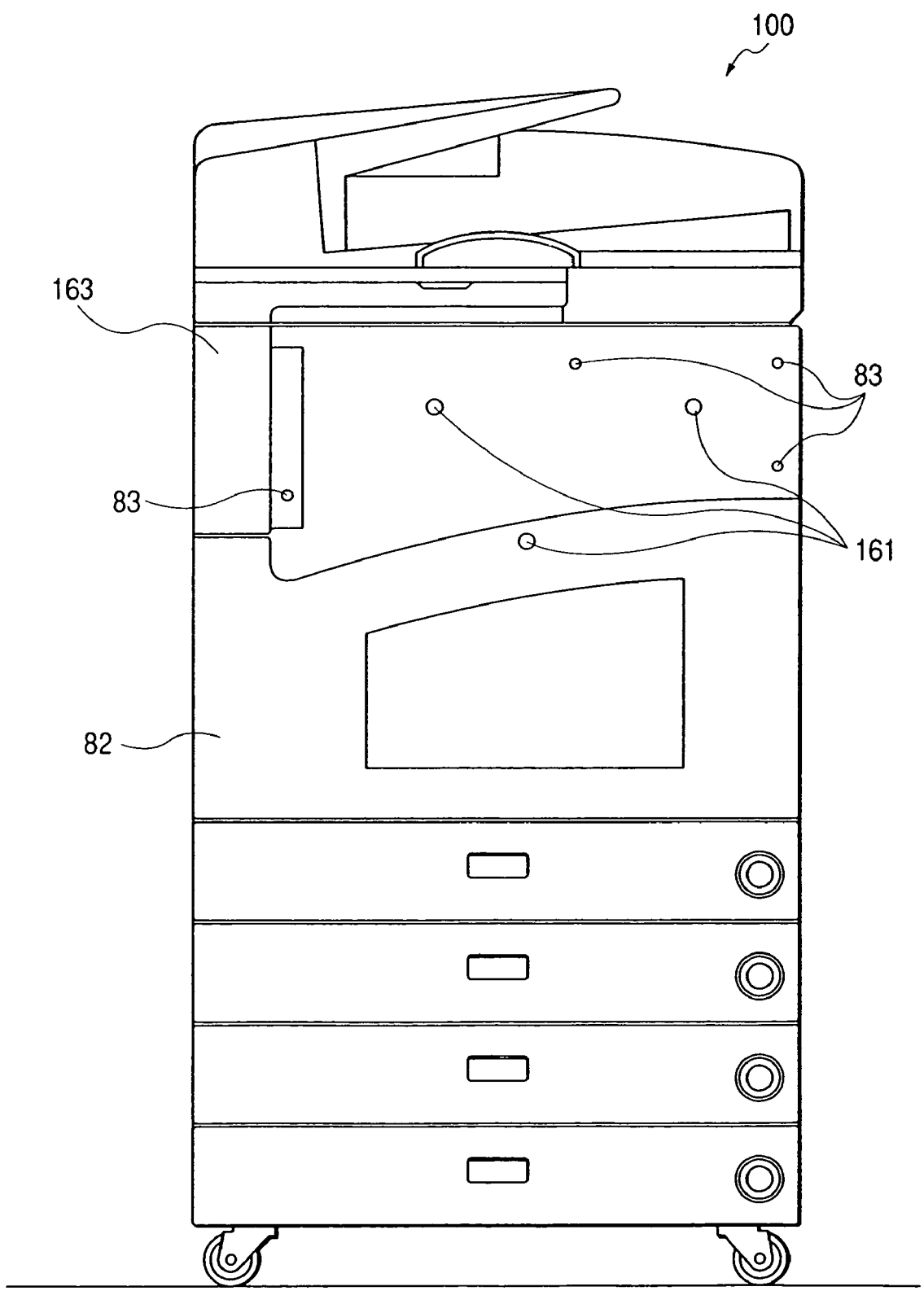
FIG. 15 is a front elevation showing the fixing holes of the main body of the finisher.

FIG. 15 is a front elevation of the in-body delivery type image forming apparatus 100 before the insertion of the main body 200 of the finisher. Three holes 161 for positioning the main body 200 of the finisher are formed on the inner portion of the apparatus 100 and the front side plate 82 of the apparatus 100. A positioning pin 206 is provided on the main body 200 of the finisher. Not shown two positioning pins are formed on the rear side plate 203. The main body 200 of the finisher is inserted such that the positioning pin 206 fit into the positioning holes 161. Then, the main body 200 of the finisher is fixed with screws from the front side to four screw holes in total of the screw holes 83 formed on the inner side of the apparatus and screw holes 83 formed on the left front side stay 163.

The finisher is furnished in the in-body delivery space of the in-body delivery type image forming apparatus in such a way.

As described above, in the present embodiment, a portion of the finisher the positioning of which portion is necessary to be accurate is separated as an optional sheet delivery unit 160. Moreover, the optional sheet delivery unit 160 is structured to be possible to be mounted from the outside on the side surface of the main body of the apparatus. It does not become necessary to perform the furnishing operation of the portion the positioning of which portion is necessary to be accurate in the narrow delivery-space portion 4, and consequently the workability is improved.

Figure 16:
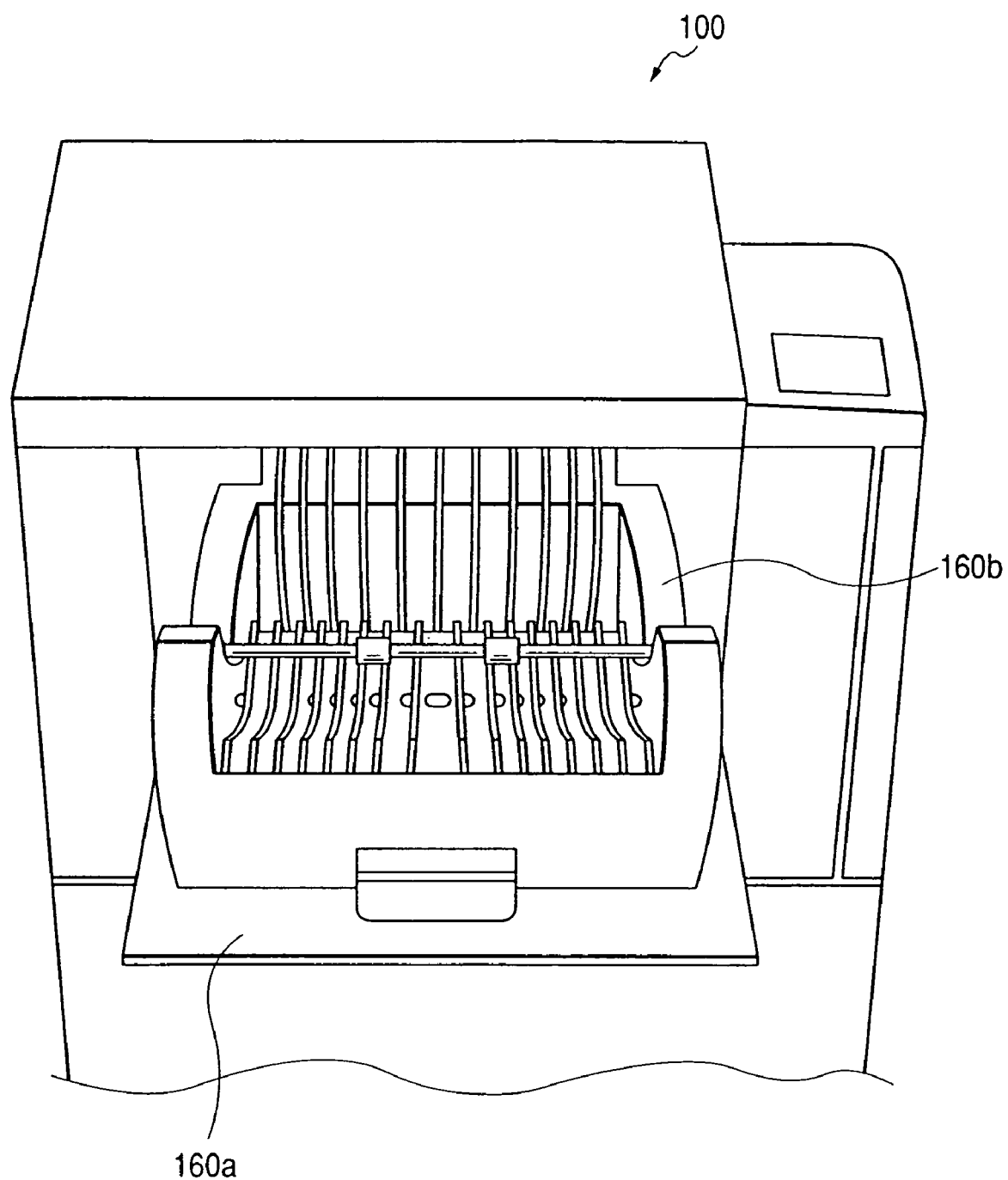
FIG. 16 is a view showing the image forming apparatus the rotation guide portion of which is opened.

Moreover, because the rotation guide portion 160a is formed in a state of being freely opened and closed, when a sheet jam is generated in the optional sheet delivery unit 160, jam clearance can easily be performed only by the rotation of the rotation guide portion 160a to the side direction of the apparatus (FIG. 16).

Incidentally, the order of mounting is preferable to be in the order of mounting the optional sheet delivery unit 160 and mounting the main body 200 of the finisher after that. The reason is the following. That is, suppose that the unit 160 and the main body 200 is mounted in the reverse order, when the fixed guide portion 160b is positioned, the positioning to the sheet receiving portion 207 of the main body 200 of the finisher as well as the positioning to the sheet path of the image forming apparatus 100 should be considered.

As described above, the aforesaid problems can be resolved by the structure of the present embodiment. Moreover, the following problems also can be resolved by the employment of the present structure.

In the in-body delivery type image forming apparatus, it is necessary to support the scanner portion with a delivery space put between the image forming apparatus and the scanner portion. For the maintaining of the precision of scanner reading, it is desirable to support at least three points among four corners of the scanner portion. In the present embodiment, the scanner portion 3 is supported by the left front side stay 163 and the supporting wall on the inner part of the apparatus. The reason why a stay is not provided on the right front side of the delivery-space portion 4 is that the convenience for the taking out of sheets is considered.

Moreover, at the request of space saving, the sheet delivery path from the image-forming portion is frequently formed at the side direction of the delivery-space portion in the scanner-supporting portion.

When it is considered that a sheet treating apparatus that is integrally structured with the connection portion with the sheet delivery path of the image-forming portion is mounted on the image forming apparatus like this, if it is tried to insert the sheet treating apparatus simply from the front side of the main body of the image forming apparatus, the sheet path connecting portion on the sheet treating apparatus interferes with the scanner supporting portion to make it physically impossible to insert the sheet treating apparatus.

Otherwise, it is also considerable to insert the sheet-treating portion from the side direction on the other side of the side where the sheet delivery path is formed for avoiding the insertion of the sheet treating apparatus from the direction in which the sheet path connecting portion interferes with the scanner supporting portion. However, in this case, sheet paths are connected with each other on the sheet delivery path side being the inner side in the insertion direction. Consequently, it is obliged to perform the mounting work in the narrow delivery-space portion, which makes it difficult to position the sheet path.

Moreover, in an apparatus in which the scanner supporting portions are on both the sides of the delivery-space portion and the sheet delivery path is in any one of the scanner supporting portions, it is almost impossible to mount the sheet treating apparatus unless the scanner supporting portions are removed.

In the sheet treating apparatus (finisher) of the present embodiment, the optional sheet delivery unit 160 being the sheet-path connecting portion is divided from the main body 200 of the finisher, and each of them can be inserted into the image forming apparatus in a direction easy to insert the divided respectively. Consequently, it becomes easy to position the sheet path, and the workability thereof can be improved.

As described above, the present embodiment is structured such that a sheet treating apparatus is divided into a connection path unit and a sheet-treating unit, and that the connection path unit is mounted in an image forming apparatus from the outside of the side surfaces of the main body of the apparatus, and further that the sheet-treating unit is mounted from the front side of the apparatus. Consequently, it becomes not necessary to perform the furnishing work of the portions where positioning accuracy is needed in a narrow space, which improves the workability thereof.

Next, the stack tray 202 is described in detail.

On the stack tray 202 sheets are being stacked one after another. Then, the stack tray 202 descends on the basis of a detection signal from a not shown sheet surface detecting sensor to keep the stack space constant. By repeating the operation, the stack tray 202 reaches the lowermost position, and only sheets are being stacked on the stack tray 202 after that. A corner portion 111 of the bottom of the scanner portion 3 as shown in FIG. 18, regulates the number of the stacked sheets capable of being stacked on the stack tray 202.

Figure 17:
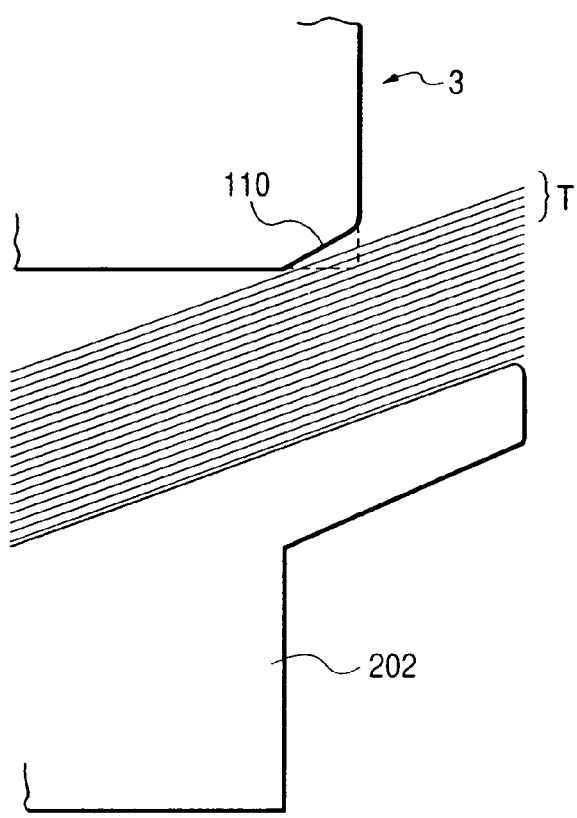
FIG. 17 is an enlarged view of a principal part of an image forming apparatus with stacked sheets according to another embodiment.
Figure 18:
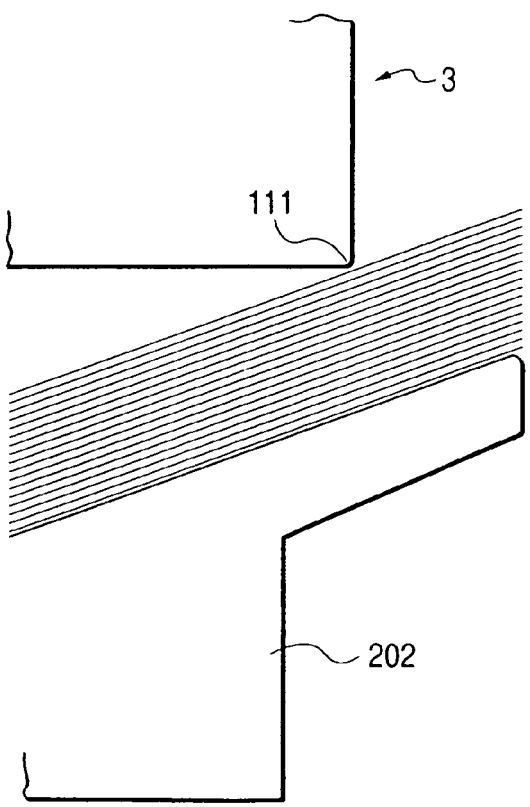
FIG. 18 is an enlarged view of a principal part of a conventional image forming apparatus with stacked sheets.

However, in the present embodiment, as shown in FIG. 17, because a taper 110 is formed at the edge portion of the bottom of the scanner portion 3, the number of the stackable sheets can be increased by the amount of the taper 110 (as much as the thickness T thereof) formed by the scraping off the corner portion in comparison with the conventional apparatus shown in FIG. 18. Consequently, according to the present embodiment, the number of the stackable sheets on the stack tray 202 (or the delivery tray 41 in the case where the finisher 200 is not mounted) can be increased.

Second Embodiment

In the aforesaid embodiment, a structure in which a sheet treating apparatus capable of being detachably mounted on an image forming apparatus includes one stack tray is exemplified. However, the present invention is not such an embodiment. For example, the structure may be one in which a plurality of stack trays are included. In this case, the effect similar to the aforesaid effect can be obtained by the formation of the taper formed at the edge portion of the bottom of the image-reading portion such that the taper is positioned at the upper part of the uppermost stack tray in the aforesaid plural stack trays.

Moreover, in the embodiment mentioned above, a multiple function machine including the functions of a copying machine and the functions of a facsimile machine as an image forming apparatus is exemplified. However, the present invention is not limited to such an embodiment. For example, the image forming apparatus of the invention may be other image forming apparatus such as a copying machine and a facsimile machine each of which has its own peculiar functions. The similar effects can be obtained by the application of the invention to such apparatus.

Moreover, in the aforesaid embodiment, an electrophotographic process is exemplified as a recording process. However, the present invention is not limited to such an embodiment. The recording process of the invention may be the other recording process such as an ink jet process.

As described above, according to the present embodiment, because a taper is formed at the edge portion of the bottom of an image-forming portion in an apparatus for delivering and stacking sheets in a space formed in the frame of the apparatus, the number of stackable sheets on, for example, a stack tray in the aforesaid space can be increased.

Third Embodiment

Figure 19:
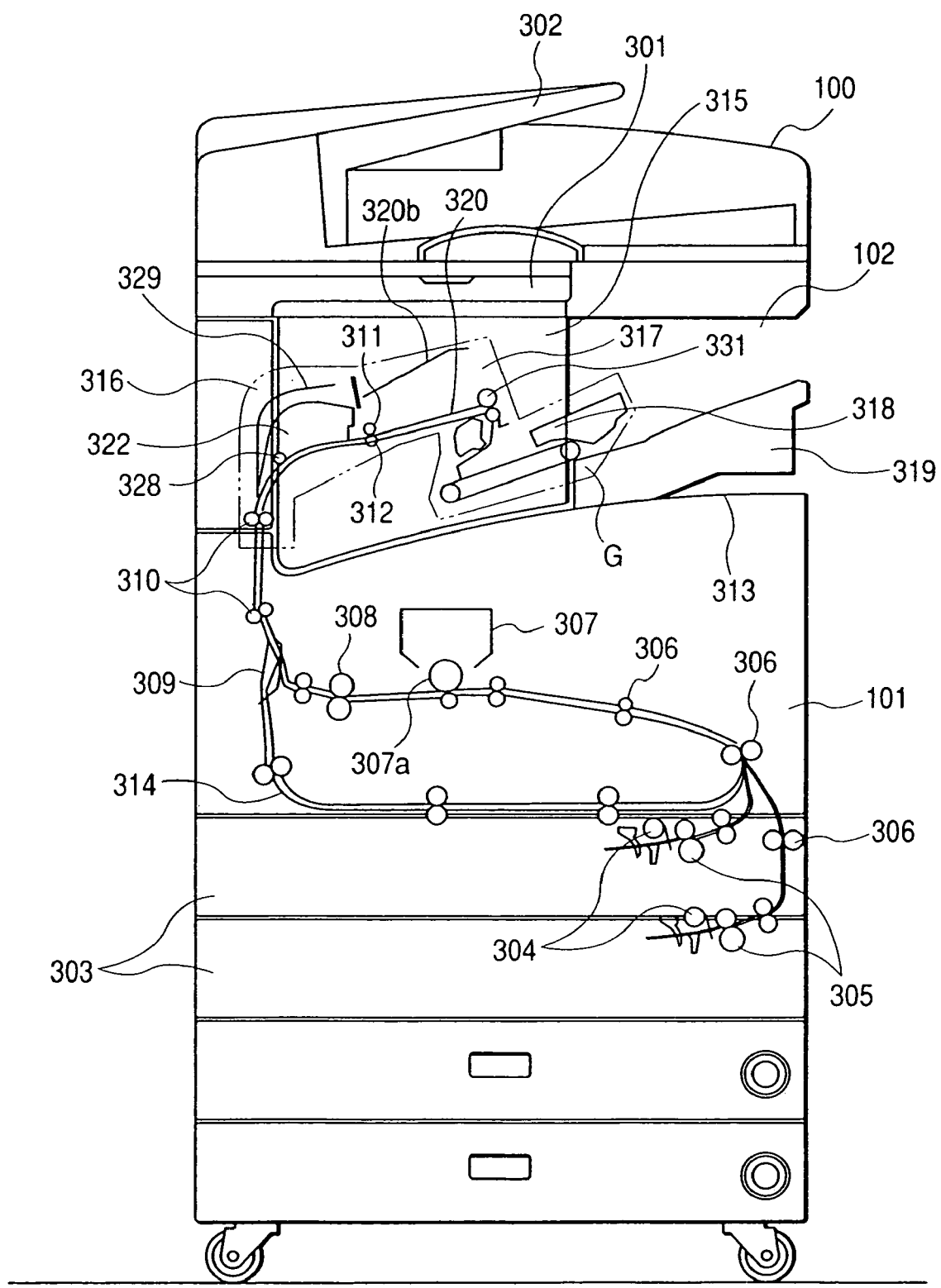
FIG. 19 is an explanation drawing of a cross section of a principal part of an image forming apparatus according to a further embodiment of the invention.
Figure 20:
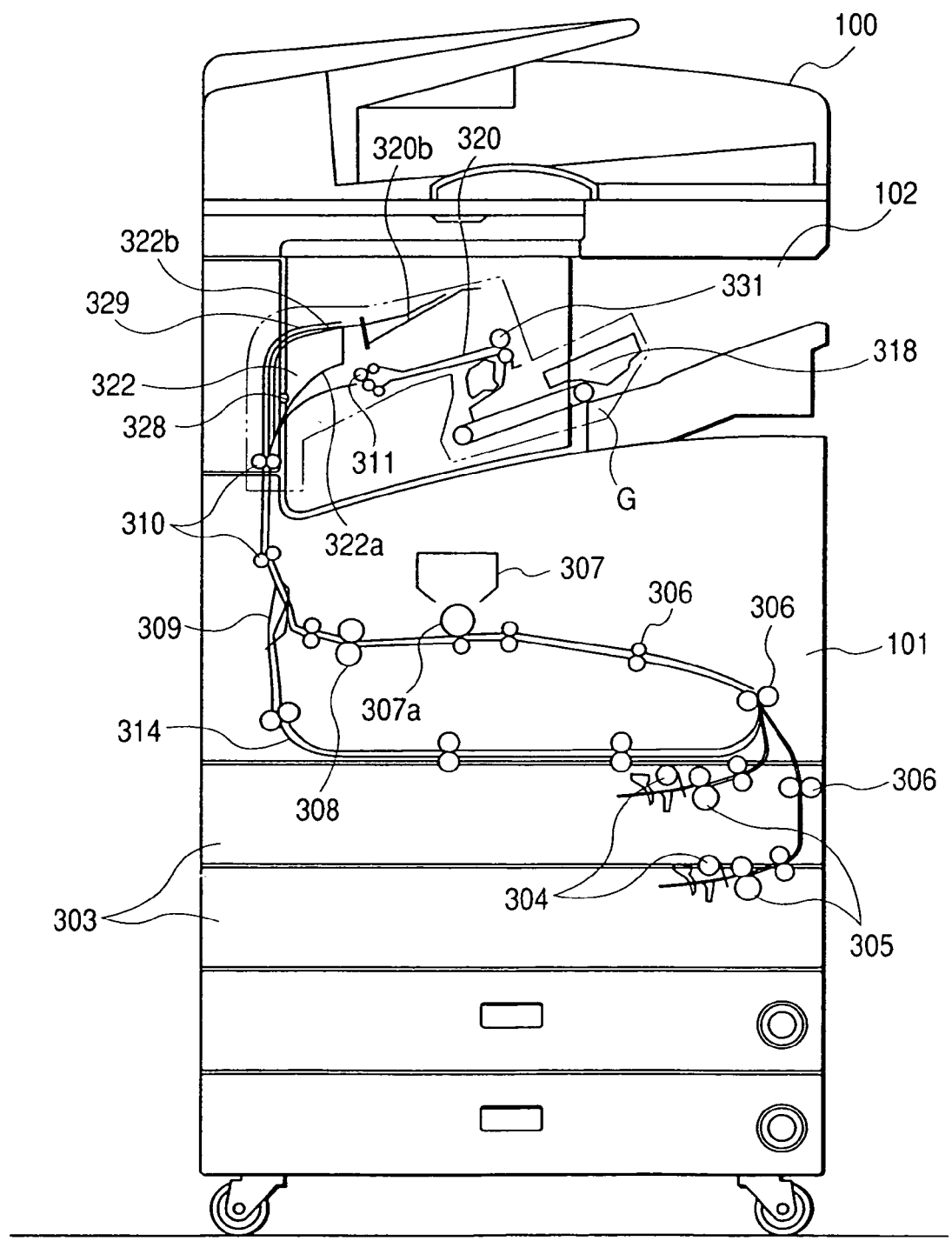
FIG. 20 is an explanation drawing of the cross section of the principal part of the image forming apparatus, which reverses the surfaces of a sheet and transports the sheet.
Figure 21:
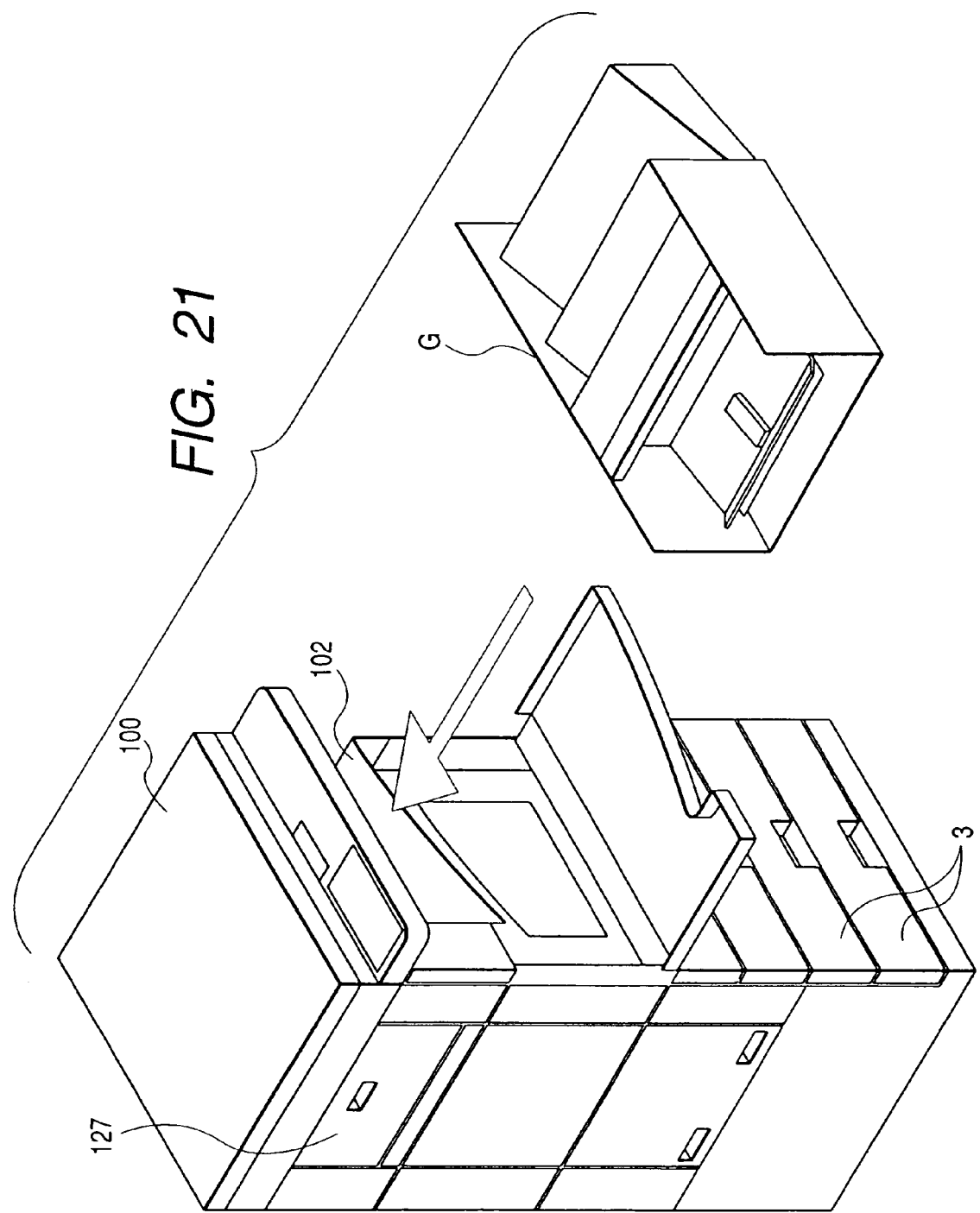
FIG. 21 is an explanation drawing of the image forming apparatus in the state of installing a sheet treating apparatus.
Figure 22:
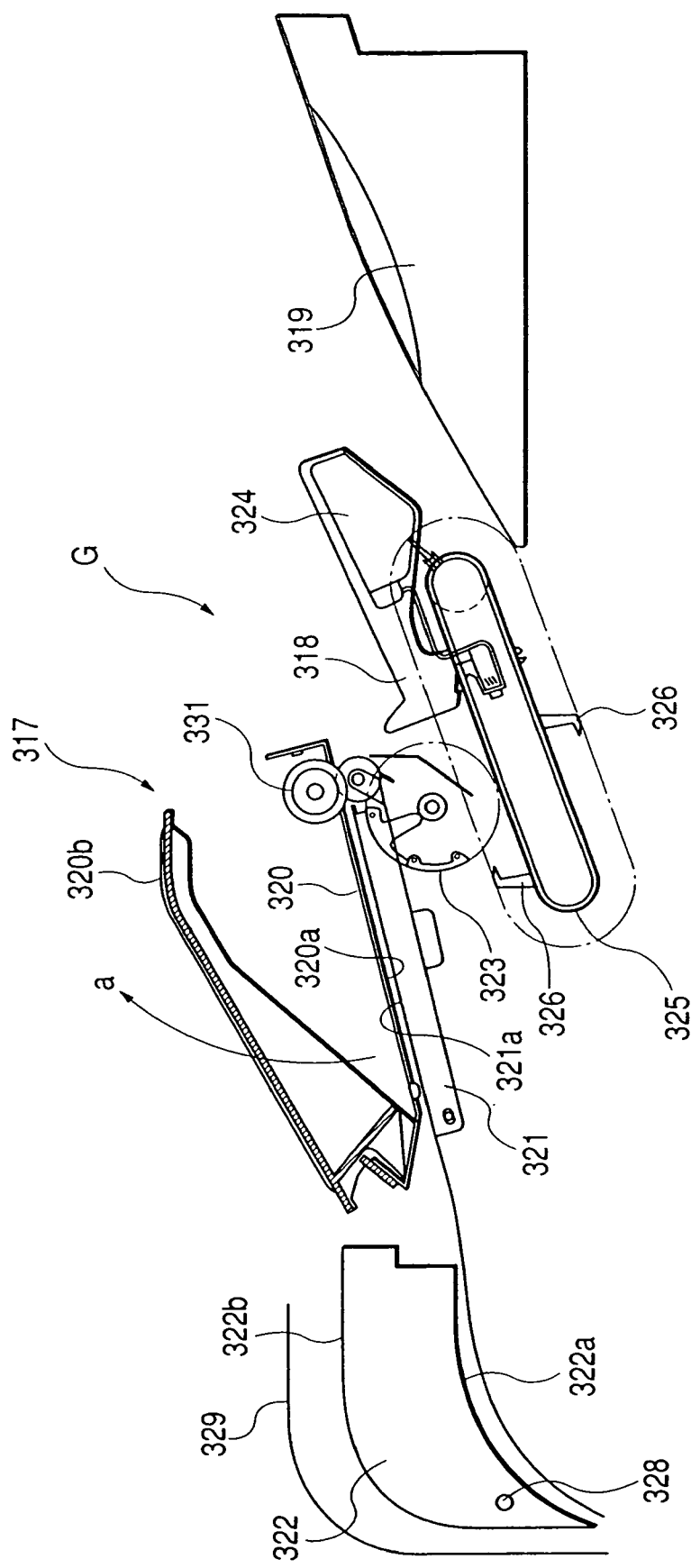
FIG. 22 is an explanation drawing of the structure of the sheet treating apparatus.
Figure 23:
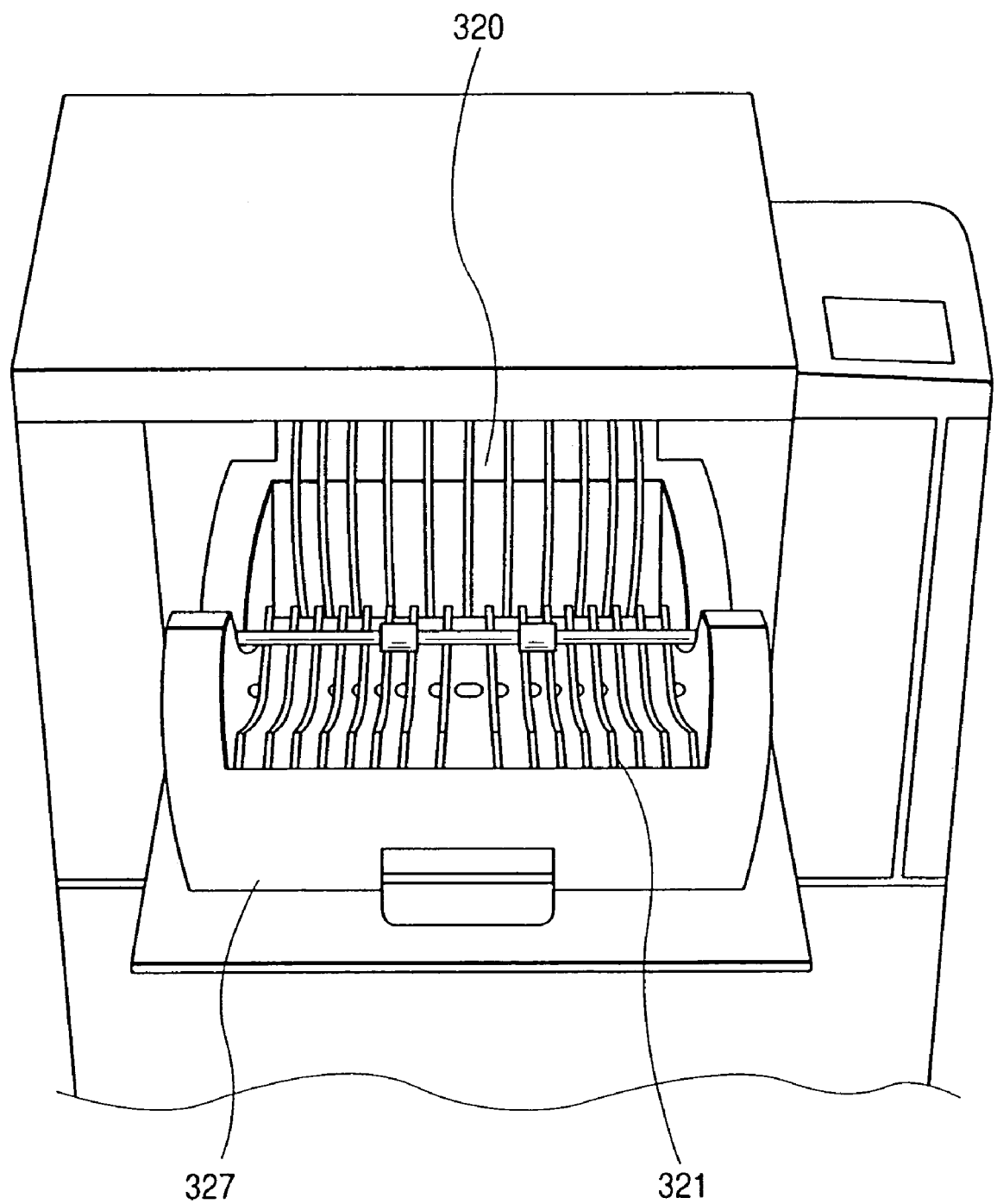
FIG. 23 is an explanation drawing of the image forming apparatus in a state of opening its side cover.

FIGS. 19 to 23 are referred while an image forming apparatus according to a third embodiment is described. Incidentally, FIGS. 19 and 20 are explanation drawings of a cross section of a principal part of the image forming apparatus; FIG. 21 is an explanatory view of the image forming apparatus in the state of installing a sheet treating apparatus; FIG. 22 is an explanatory view of the structure of the sheet treating apparatus; and FIG. 23 is an explanatory view of the image forming apparatus in a state of opening its side cover.

{General Structure}

At first, the general structure of the image forming apparatus is described. As shown in FIG. 19, in the image forming apparatus, a space portion 102 for the delivery of sheets is formed between an image-reading portion 100 and an image-forming portion 101.

The image-reading portion 100 is formed by the furnishing of original feeding means 302 in the upper part of original reading means 301. Originals fed from the original feeding means 302 one by one are read by the original reading means 301 optically, and the read optical signals are converted to digital signals by the photoelectric transformation to be transmitted to the image-forming portion 101.

The image-forming portion 101 is provided with sheet cassettes 303, and the image-forming portion 101 feeds the uppermost sheet in the sheet cassettes 303 with a pick up roller 304. The picked up sheets are separated and fed by a pair of separation rollers 305 to be separated ones. The separated sheets are transported to image forming means 307 with transportation rollers 306.

In the present embodiment, an electrophotographic recording process is employed by the image forming means 307. The electrophotographic recording process forms a toner image on a photosensitive drum 307a with a not shown developing device, and the process transfers and records the toner image on a transported sheet. The image transferred on the sheet at this time is formed as follows: the emission timing of laser beams on the basis of image signals from by the reading of an image with the image-reading portion 100 and by the processing of the digital conversion of the read image, or image signals transmitted from outside personal computers and the like; then, a not shown laser scanner unit irradiates a laser beam on the surface of the photosensitive drum 307a to form a latent image; and the developing device performs the reversal development of the latent image.

The sheet on which an image has been form is transported to a fixing portion 308. The fixing portion 308 impresses heat and pressure on the sheet to fix the image. Then, the sheet is lead to the upper portion by a switching flapper 309, and is delivered on a delivery tray portion 313 formed in the space portion 102 from a delivery port 312 with transportation rollers 310 and delivery rollers 311. Incidentally, the delivery tray portion 313 serves also an upper cover of the image-forming portion 101.

The image forming apparatus according to the present embodiment can record on both sides of sheets. In case of performing duplex recording, as described above, one-side recorded sheets are transported to a duplex transporting portion 314 by switching back on the way. Then, the one-side recorded sheets are again transported to the image forming means 307 like in the case of one-side recording. Then, images are recorded on the second sides (the sides of the one-sided recorded sheets where images are not recorded yet), and the recorded sheets are delivered to the delivery tray portion 313. Accordingly, the transportation rollers 310 and the delivery rollers 311 are capable of being switched between forward rotation and reverse rotation.

{Sheet Treating Apparatus}

A treating apparatus G for performing the staple treatment of delivered stacks of sheets is provided in the space portion 102 of the image forming apparatus of the embodiment. The treating apparatus G is set from the front portion (the side on which a user operates the image forming apparatus) of the image forming apparatus in the direction indicated by an arrow shown in FIG. 21.

The treating apparatus G is provided with a front cover 315 in the front portion of the treating apparatus G for covering a not shown exchange hole of staples for stapling, and the like as shown in FIG. 19. At the time of aftertreatment, sheets delivered from a delivery portion 316 including the delivery rollers 311 of the image-forming portion 101 are received by a sheet receiving portion 317 including transportation rollers 331. Then, the received sheets are subjected to the aftertreatment such as stapling in an aftertreatment portion 318. After that, the sheets are delivered on a stack tray 319 of the treating apparatus G. The aftertreatment portion 318 includes a stapler for stapling stacks of sheets and a punching apparatus for performing punching.

The structure of the treating apparatus G is described further in detail. As shown in FIG. 22, a sheet transportation guide 320 for guiding sheets to be delivered to the transportation rollers 331 is formed in the sheet receiving portion 317. The undersurface of the sheet transportation guide 320 is an upper guide portion 320a for guiding the upper surface side of the sheets to be delivered. Moreover, a supporting member 321 forming a lower guide portion 321a for guiding the lower surface side of the sheets to be delivered is set below the sheet transportation guide 320. A delivery path is formed by the upper guide portion 320a and the lower guide portion 321a. Incidentally, the sheet transportation guide 320 can rotate in the direction of an arrow a in FIG. 22 for jam clearance (sheet jam clearance). A grip 320b is formed at the sheet transportation guide 320 in order that a user brings up the sheet transportation guide 320 for the jam clearance.

Now, FIG. 23 shows the jam clearance state. It is known that, when a user opens a side door 327 (see FIG. 21) formed on the left side surface of the apparatus, the user can easily access the grip 320b for opining the sheet transportation guide 320 in the sheet receiving portion 317 of the treating apparatus G.

A sheet delivered on stack-pushing belt portion 325 by the transportation rollers 331 is pressed to a not shown stopper portion by a returning member 323 rotating as a locus indicated by an alternate long and short dash line in FIG. 22, and the transportation direction of a stack of sheets is aligned. On the other hand, the alignment of the stack of sheets in the width direction (a direction perpendicular to the transportation direction) thereof is performed by side guides 324. That is, a pair of the side guides 324 is disposed on both sides in the sheet width direction such that the side guides 324 put the stack of sheets between them. One of the side guides 324 is moved along the direction of the width of the sheets by a not shown driving mechanism. The moving side guide puts the delivered sheets between the other side guide and the moving side guide to align the stack of sheets in the width direction.

The aftertreatment portion 318 performs the aftertreatment of the aligned stack of sheets such as shifting and stapling. Then the treated stacks of sheets are transported on the stack tray 319 in order by the stack-pushing belt portion 325. The stack-pushing belt portion 325 is provided with a pushing claw 326 for pushing out the stack of sheets to the stack tray 319.

Now, the driving control of the sheet treating apparatus G is performed by a peculiar controller CPU built in the treating apparatus G because of the degree of freedom of designing, costs, general-purpose properties, and the like. Consequently, the driving control only related to the receiving of signal outputs for taking timing for the main body of the apparatus.

{Surface Reverse Path}

Next, FIG. 19, FIG. 20 and FIG. 22 are referred while a surface reverse path when duplex recording of a sheet is performed is described.

A sheet guide member 322 for guiding a transported sheet is set on the upstream side in the sheet transportation direction from the sheet transportation guide 320 of the treating apparatus G. The sheet guide member 322 also functions as a flapper for switching the sheet transportation direction between the sheet delivery direction and surface reverse transportation direction. The sheet guide member 322 can be rotated around a shaft 328 by a not shown driving mechanism such as a solenoid.

In case of one-side recording, as shown in FIG. 22, the lower surface of the sheet guide member 322 functions as a upper guide portion 322a for guiding the upper surface of the sheet to be delivered, and a delivery path is formed by the lower surface of the sheet guide member 322 and the supporting member 321 for guiding the lower surface side of the sheet. A sheet that has passed through the delivery path is guided by the sheet transportation guide 320 and the supporting member 321 to be transported by the transportation rollers 331.

On the other hand, when duplex recording is performed, as shown in FIG. 20, the sheet guide member 322 is rotated in the counter-clockwise rotation direction by a predetermined amount. At this time, the upper surface of the sheet guide member 322 functions as a lower guide portion 322b for guiding the lower surface side of the sheet, and a surface reverse path is formed by the sheet guide member 322 and an upper guide member 329. When a one-side recorded sheet is transported by the transportation rollers 310 in this state, the lower surface side of the sheet is guided by the lower guide portion 322b of the sheet guide member 322 and the upper surface side of the sheet is guided by the upper guide member 329, and the sheet enters into the surface reverse path. Then the lower surface of the sheet is guided by the grip 320b of the sheet transportation guide 320 to the upper part of the treating apparatus G. Consequently, the grip 320b also functions as the lower guide portion of the sheet in the surface reverse path.

The surface reverse path is formed on the upper part of the treating apparatus G by the rotation of the sheet guide member 322. Because the surface reverse path is covered by the front cover 315, even if a sheet protrudes from the delivery rollers 311 by a predetermined amount, the sheet is not exposed to the outside of the apparatus.

Then, the sheet that has been transported by a predetermined amount (until the trailing end of the sheet has passed through the switching flapper 309) through the surface reverse path is reversed and transported to the duplex transporting portion 314.

As described above, by the formation of the surface reverse path in the treating apparatus, more concretely, at the upper part of the transportation rollers 331, a mechanism for driving the transportation rollers 331 reversely or for releasing the sheet nip by the transportation rollers 331 becomes unnecessary to be equipped, and the distance between the delivery rollers 311 and the transportation rollers 331 of the treating apparatus G is also unnecessary to be large. Consequently, the space saving of the apparatus and high convenience for a user can be achieved.

Moreover, because the present embodiment guides a sheet to be reversed not to protrude to the outside when the sheet is reversed and transported, the inconvenience such that a user touches or pulls the protruded sheet by mistake can be prevented.

Fourth Embodiment

Figure 24:
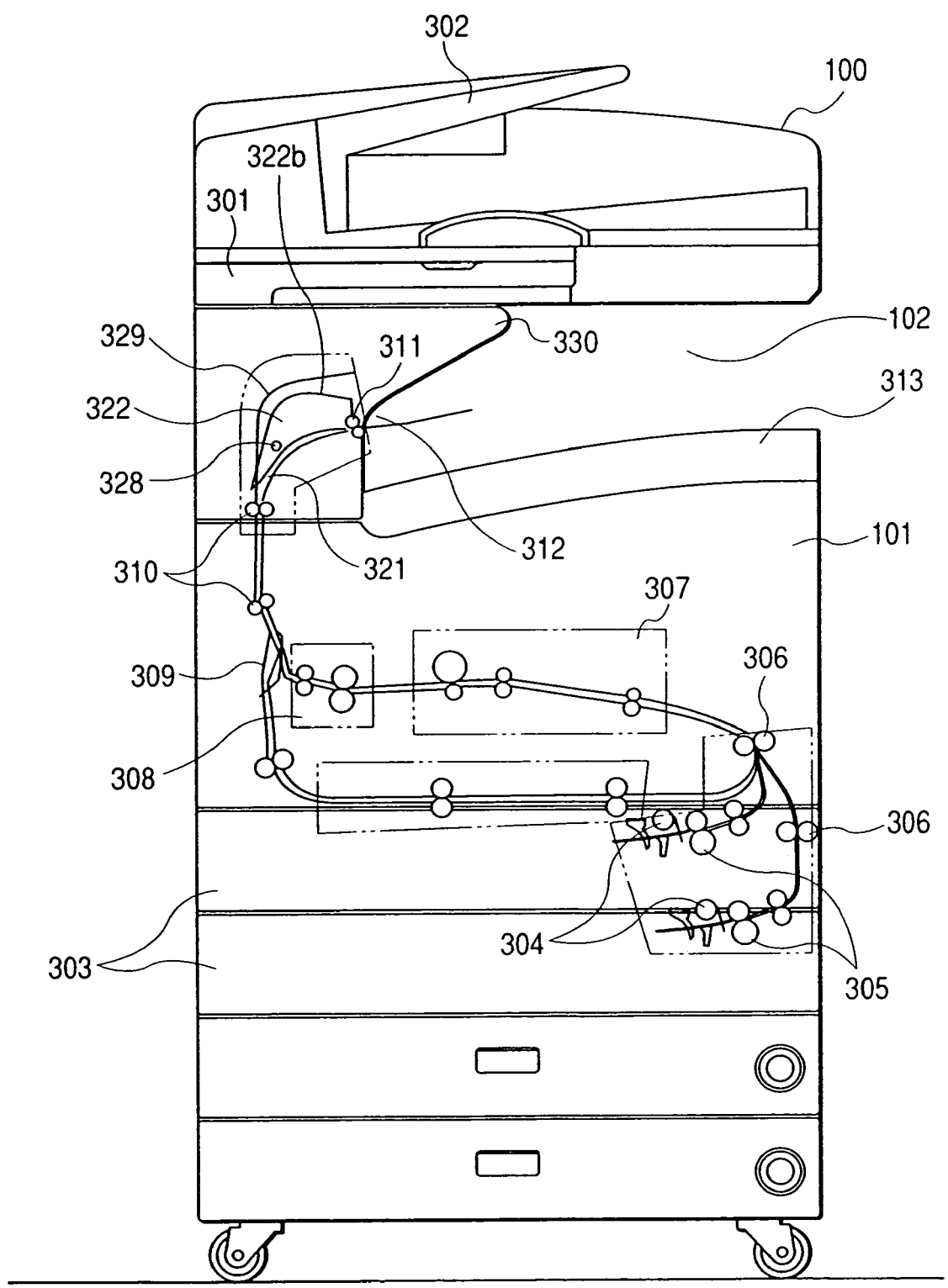
FIG. 24 is an explanation drawing of a cross section of a principal part of an image forming apparatus according to a still further embodiment without a sheet treating apparatus.
Figure 25:
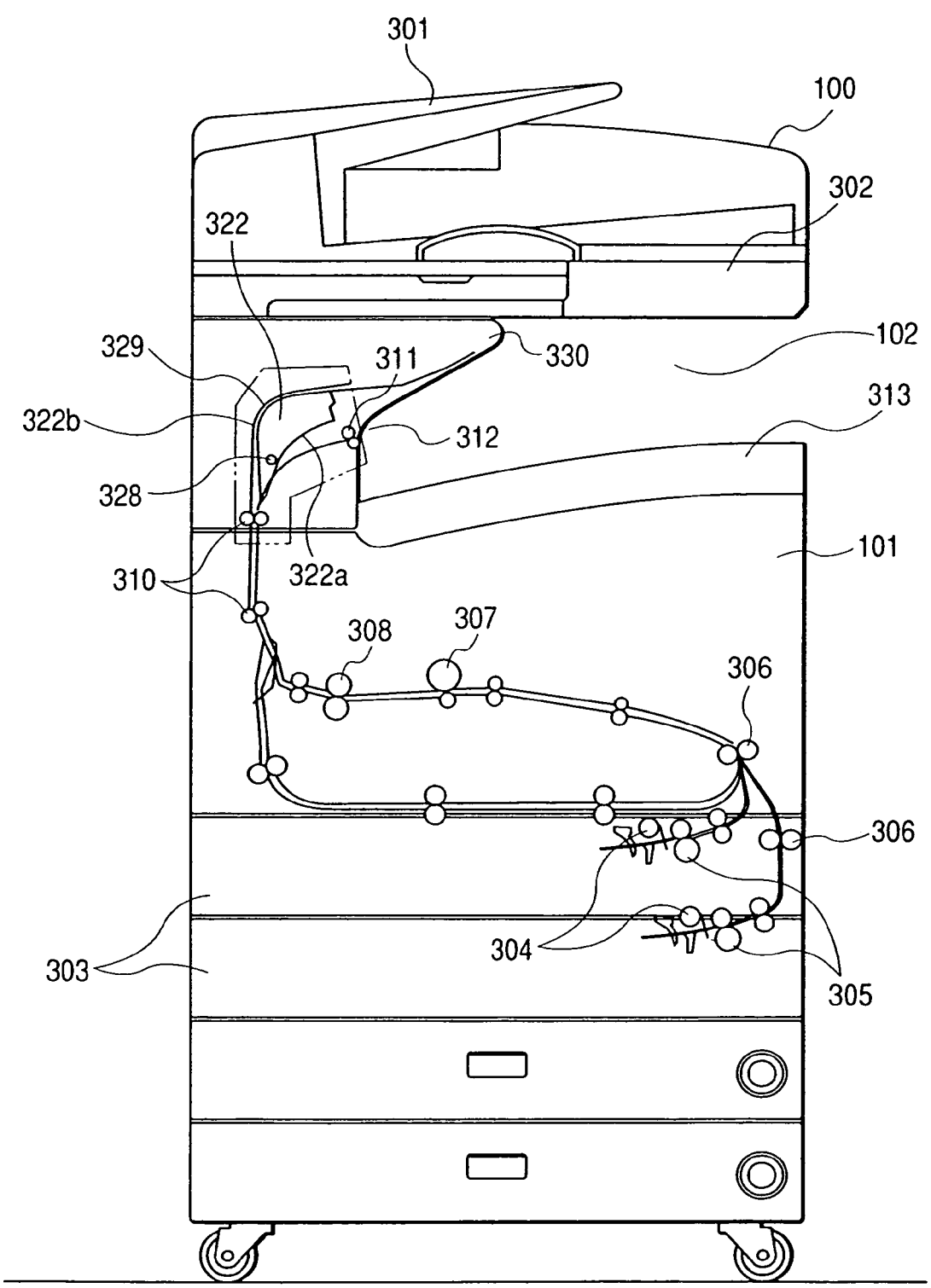
FIG. 25 is an explanation drawing of the cross section of the principal part of the image forming apparatus in a state of reversing the surfaces of a sheet and transporting the sheet according to the still further embodiment without a sheet treating apparatus.

Although in the aforesaid embodiment an image forming apparatus in which the sheet treating apparatus G is mounted in the space portion 102 is exemplified, as shown in FIG. 24 and FIG. 25, the present invention can similarly be applied to an image forming apparatus without any sheet treating apparatus. Incidentally, in FIG. 24 and FIG. 25, components having the similar functions as those of the first embodiment are designated by the same reference marks as those of the first embodiment.

In the present embodiment, as shown in FIG. 25, a surface reverse path is formed by the rotation of a sheet-transporting guide 322 in the counter-clockwise rotation direction. A piece of armoring 330 is provided in the upper part of the space portion 102 lest a leading end of a sheet sent into the surface reverse path should be exposed to the outside of the apparatus when the sheet is sent into the surface reverse path.

In the image forming apparatus, too, similarly in the aforesaid embodiments, it is unnecessary to drive the transportation rollers 311 reversely, and sheets do not protrude to the outside of the apparatus when the sheets are reversed and transported. Consequently, the image forming apparatus does not give a user of a sense of discomfort.

Incidentally, in the aforesaid image forming apparatus of the third and the fourth embodiments, the image-reading portion is set at the uppermost part of the apparatus. However, the present invention is not limited to such embodiments. It is apparent that, even in an image forming apparatus of a printer type one that has no image-reading portions, the image forming apparatus can obtain similar effects to those of the image forming apparatus of the aforesaid embodiments by employing a structure such that sheets are reversed at the upper part of the treating apparatus thereof. In this case, the image forming apparatus may have a structure such that the sheets to be reversed are not exposed to the outside. Moreover, the present invention can effectively applied to a printer equipped with a table-shaped plate member (top plate) in place of the image-reading portion.

Because the present embodiment is structured as described above, the embodiment can transport sheets reversely without making the apparatus large in size and complex in structure, and because the leading ends of sheets do not protrude to the outside of the apparatus, the apparatus does not give a user a feeling of wrongness.

Fifth Embodiment

Hereinafter, a fifth embodiment of the present invention will be described with reference to FIGS. 26 to 39 of the attaching drawings.

Figure 26:
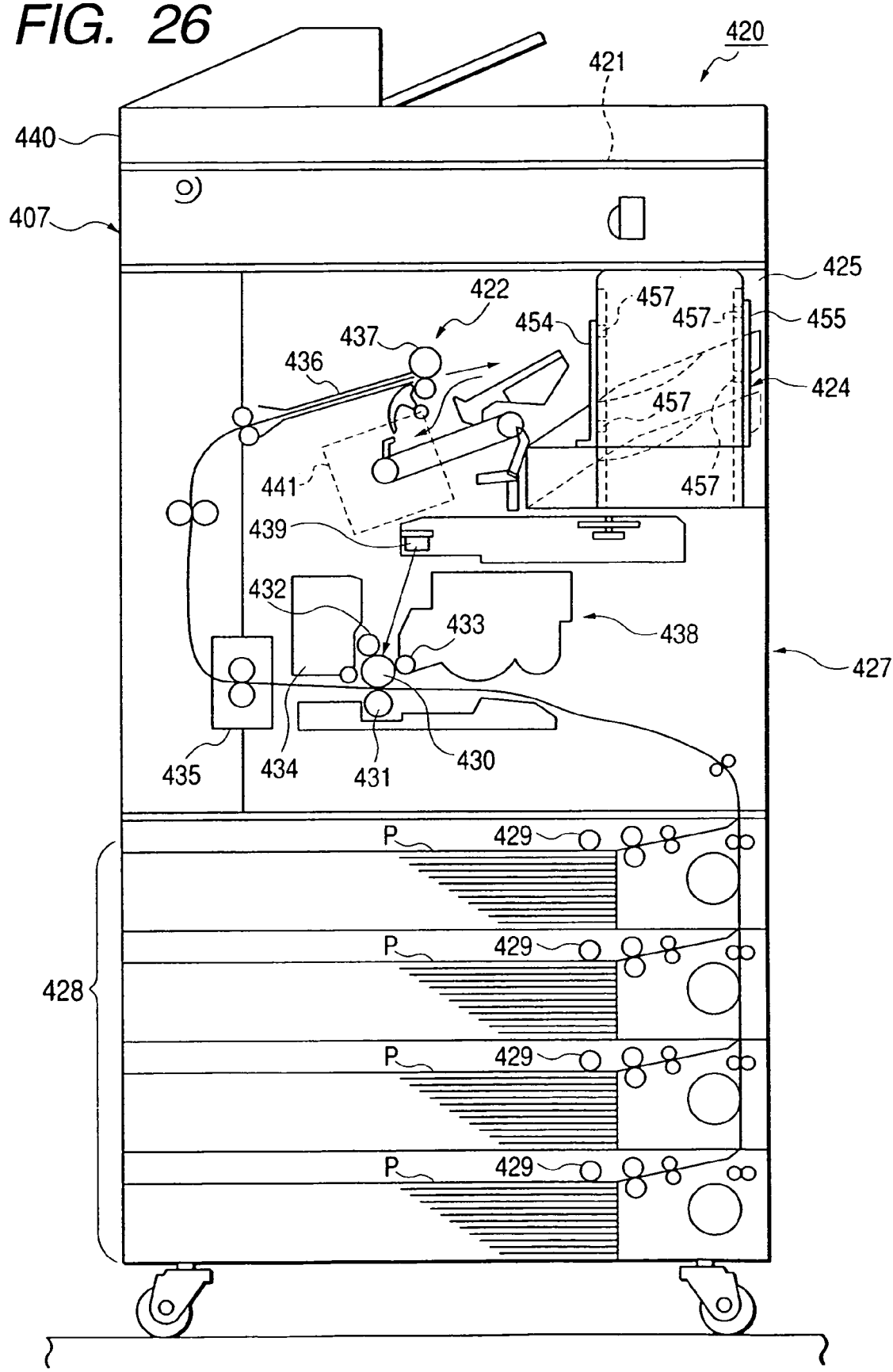
FIG. 26 is a schematic cross section viewed from the front of a printer being an image forming apparatus according to a still further embodiment of the invention.

FIG. 26 is a schematic cross section viewed from the front of a printer being an image forming apparatus in which the main body of the apparatus is provided with a sheet aftertreatment apparatus 422 and a sheet stacking apparatus 424.

(Printer)

The printer 420 is composed of an automatic original feeding apparatus 440, an original reading portion (original reading means) 407 for reading an original fed on a glass stand 421 automatically by the automatic original feeding apparatus 440, an image-forming portion (image forming means) 438 for forming an image on a sheet on the basis of image information of the original read by the original reading portion 407, a sheet aftertreatment apparatus 422 for treating a sheet on which an image has been formed by a treatment such as width alignment, a sheet stacking apparatus 424 including a stack tray (delivery sheet stacking means) on which sheets delivered from the sheet aftertreatment apparatus 422 are stacked and is opened to the outside, an operation portion (operation means) 406 into which information necessary for a user to form an image is input, and a sheet containing portion 438 for containing sheet before image forming.

The detailed descriptions of the sheet aftertreatment apparatus 422 and the sheet stacking apparatus 424 are given later. Moreover, the sheet aftertreatment apparatus 422 is not always necessary. That is, the printer 420 may be structured in such a way that sheets on which images have been formed by the image-forming portion 438 are delivered on a stack tray 401 as they are.

In FIG. 26, the automatic original feeding apparatus 440 that automatically feeds an original onto the glass stand 421 and automatically delivers the fed original from the glass stand 421 is set at a part upper than the glass stand 421. The automatic original feeding apparatus 440 is structured such that the apparatus 440 can be opened and closed to the glass stand 421. The sheet aftertreatment apparatus 422 and the sheet stacking apparatus 424 are disposed immediately below the original reading portion 407 and the operation portion 406. The space 425 in which sheet on which images have been formed are delivered and stacked on the stack tray 401 is defined between the original reading portion 407 and the sheet stacking apparatus 424.

Figure 27:
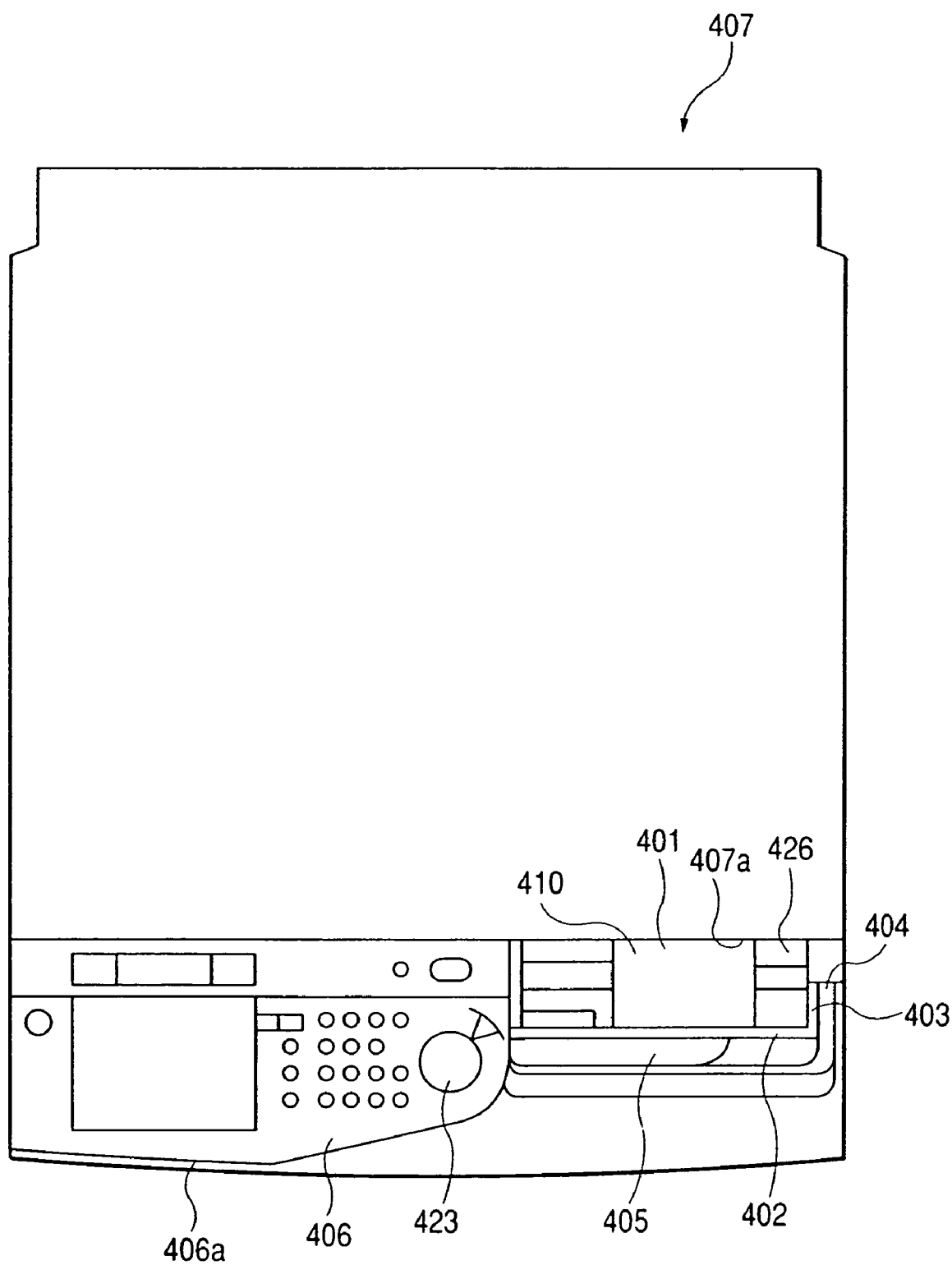
FIG. 27 is a plan view of the printer of FIG. 26.
Figure 28:
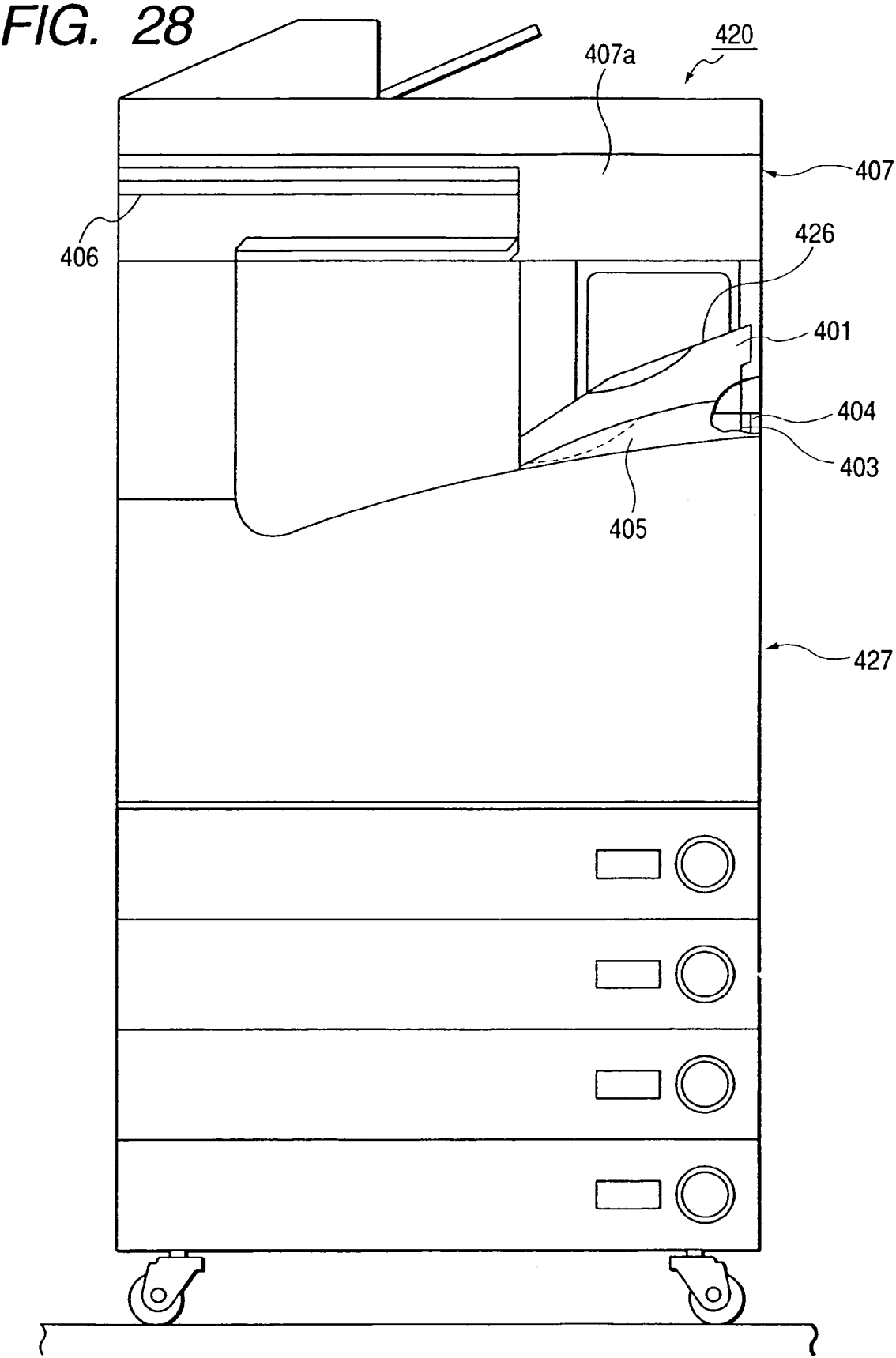
FIG. 28 is a front elevation of the printer of FIG. 26.
Figure 29:
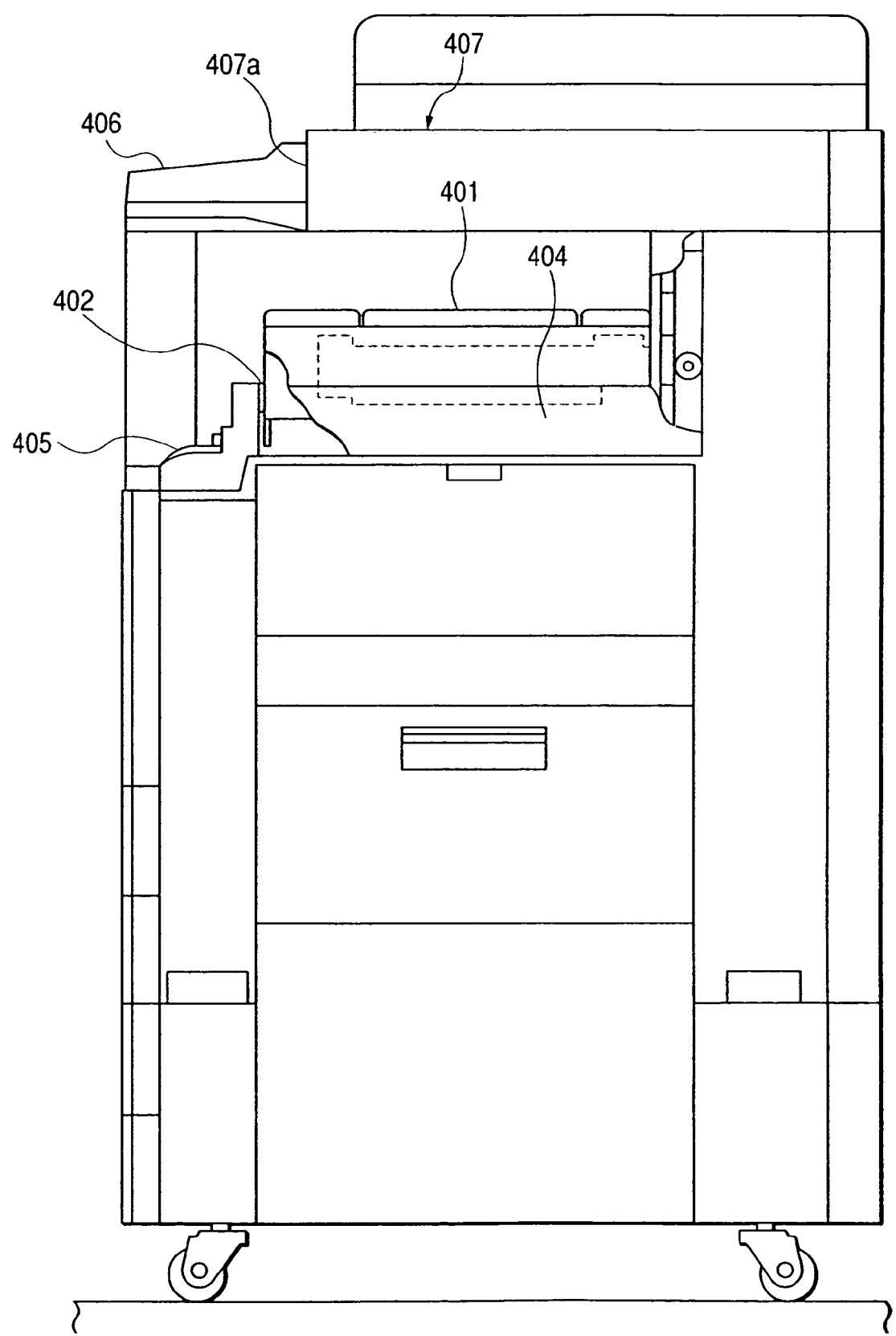
FIG. 29 is a partially broken right side elevation of the printer of FIG. 26.

In FIG. 27 which is a plan view of the printer 420, the operation portion 406 by which information necessary for the formation of an image is input by a user is disposed at the left half of the original reading portion 407 in the front part 407a. When the original reading portion 407 is looked down (looked as a plan), the right side of the operation portion 406 and a part of the front part 407a cover a part of the front part of the stack tray 401. An opened portion 410 through which the covered part can be sighted is formed.

That is, when the original reading portion 407 is viewed in plan, the part (hereinafter referred to as exposed part) of the stack tray 401 is exposed from the original reading portion 407 through the opened portion 410. The exposed part 426 is situated on the right side of the operation portion 406.

When the printer 420 is viewed in plan, a front portion 406a of the operation portion 406 is located at a position where does not protrude to the front side from the main body (apparatus main body) 427 of the printer 420. The printer 420 is structured such that portions other than the original reading portion 407, the operation portion 406 and the exposed part 426 cannot be sighted when the printer 420 is viewed in plan. According to the structure mentioned above, the area of the original reading portion 407, the operation portion 426 and the exposed part 426 when they are viewed in plan is almost the same as the area of the installation space requirements of the printer 420.

When a user depresses a start button 423 formed in the operation portion 406, the feed of a sheet P is begun from a sheet-containing portion 428 by a pick up roller 429. The sheet P is sent between a photosensitive drum 430 and a transfer roller 431. On the photosensitive drum 430, a toner image has already been formed. The toner image is formed by the toner development of a latent image by a developing device 433, which latent image is formed by the exposure of the photosensitive drum 430 charged by a charger 432 by an exposure device 439 on the basis of a read signal from the original reading portion 407.

A toner image is transferred on a sheet that has been sent between the photosensitive drum 430 and the transfer roller 431. When the toner image is transferred on the sheet, a cleaner 434 removes residual toner remaining on the photosensitive drum 430. Thereby the photosensitive drum 430 becomes clean state in which the next toner image is easily formed.

The sheet on which the toner image on the photosensitive drum 430 has been transferred is transported to a fixing device 435. The sheet transferred to the fixing device 435 is heated and pressed by the fixing device 435, and the toner image on the sheet is fixed. Then, the sheet is sent to the sheet aftertreatment apparatus 422 by a pair of sheet feeding-out rollers 437 through a guide 436. The sheet aftertreatment apparatus 422 makes the sheets to be a stack. At last, the sheets are delivered on the stack tray 401 of the sheet stacking apparatus 424 in a stacked state by the sheet aftertreatment apparatus 422. Incidentally, when there is no need to make the sheets stacked, the sheet aftertreatment apparatus 422 delivers the sheets one by one on the stack tray 401.

Because a part (exposed part 426) of the stacked tray 401 is exposed to be able to be sighted through the opened portion 410 of the image-reading portion 407 in the printer 420 of the present embodiment, there is no case where it becomes difficult to sight sheets because sheets or stacks of sheets that have been delivered on the stack tray 401 are overlapped on the operation portion 406 or the image-reading portion 407 when they are viewed in plan. Consequently, the printer 420 makes it easy to sight sheets when the sheets are viewed in plan and makes it easy to take out the sheets.

(Sheet Aftertreatment Apparatus)

Figure 30:
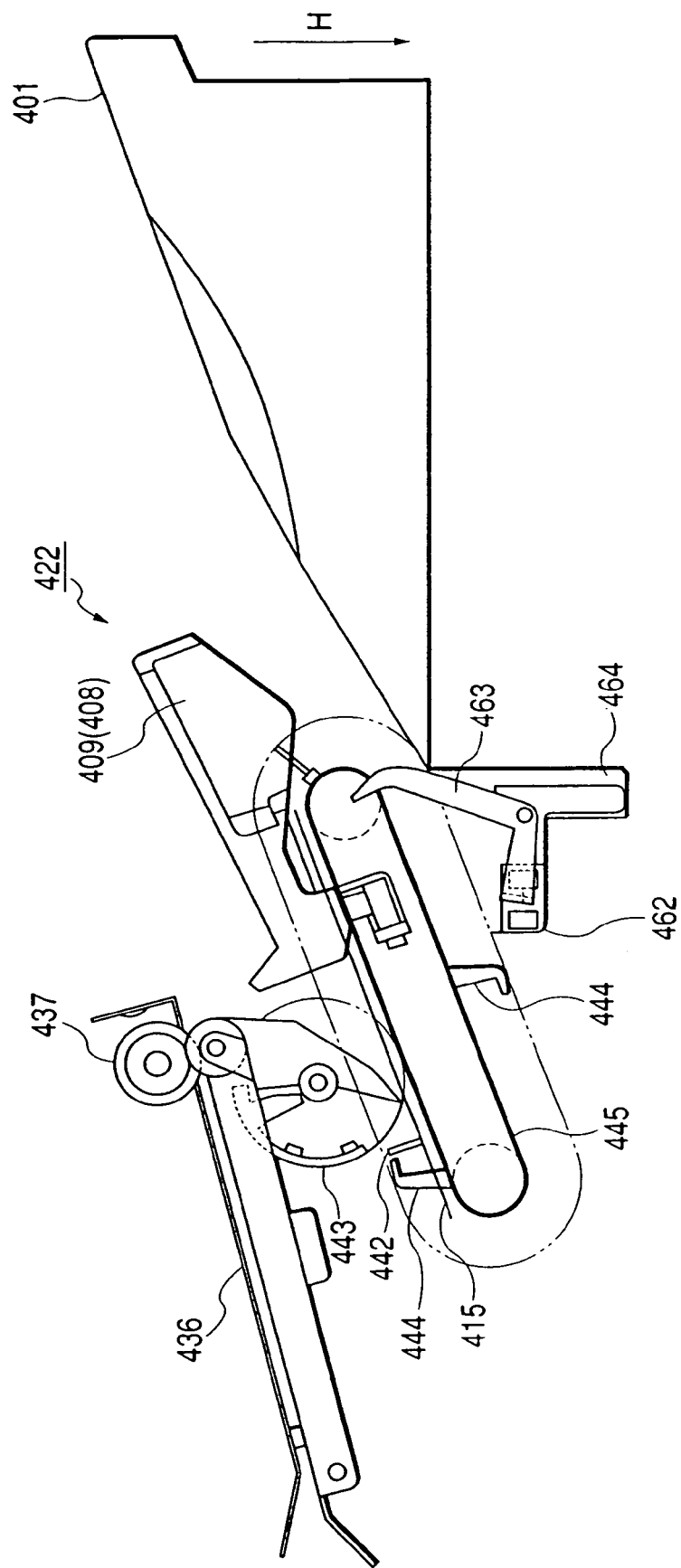
FIG. 30 is a schematic front elevation of a sheet aftertreatment apparatus incorporated into the printer of the embodiment of the invention and the stack tray of a sheet stacking apparatus.
Figure 31:
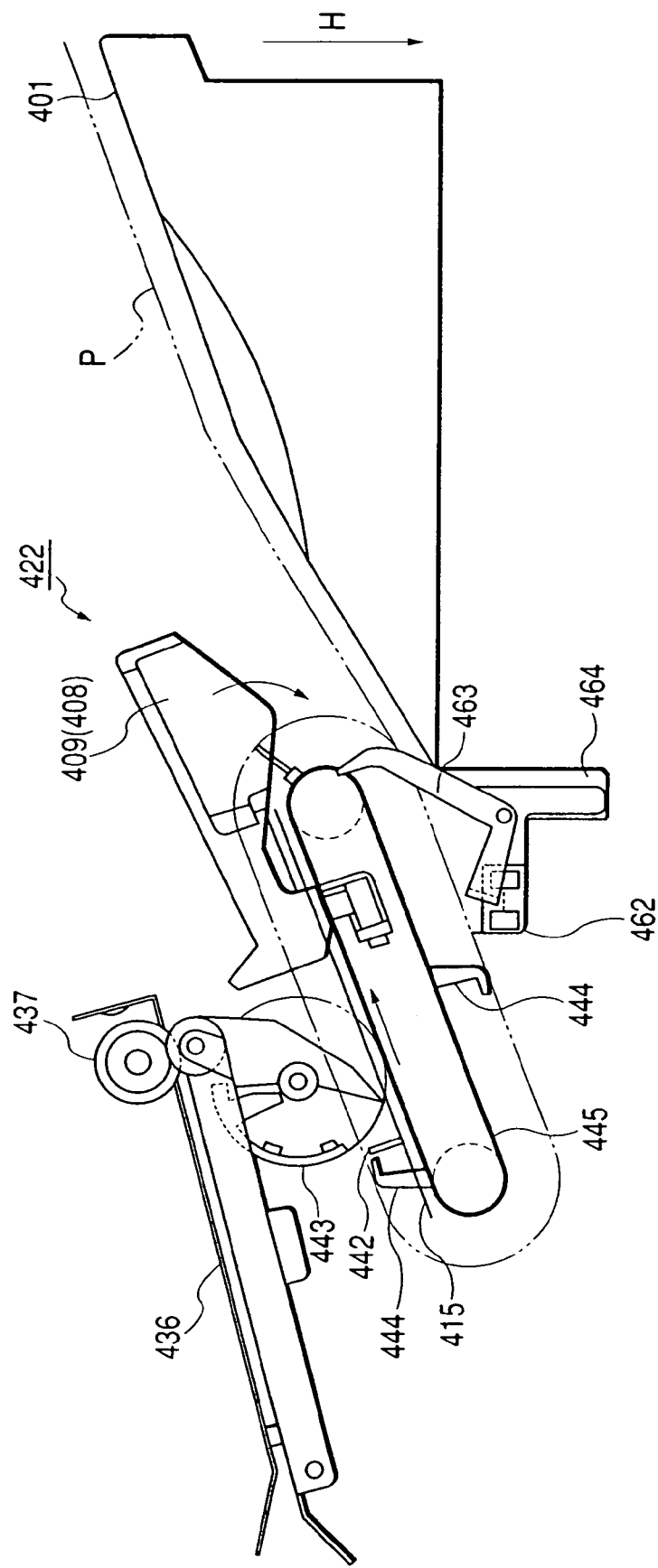
FIG. 31 is a drawing showing a state such that the stack tray of FIG. 30 has descended.
Figure 32:
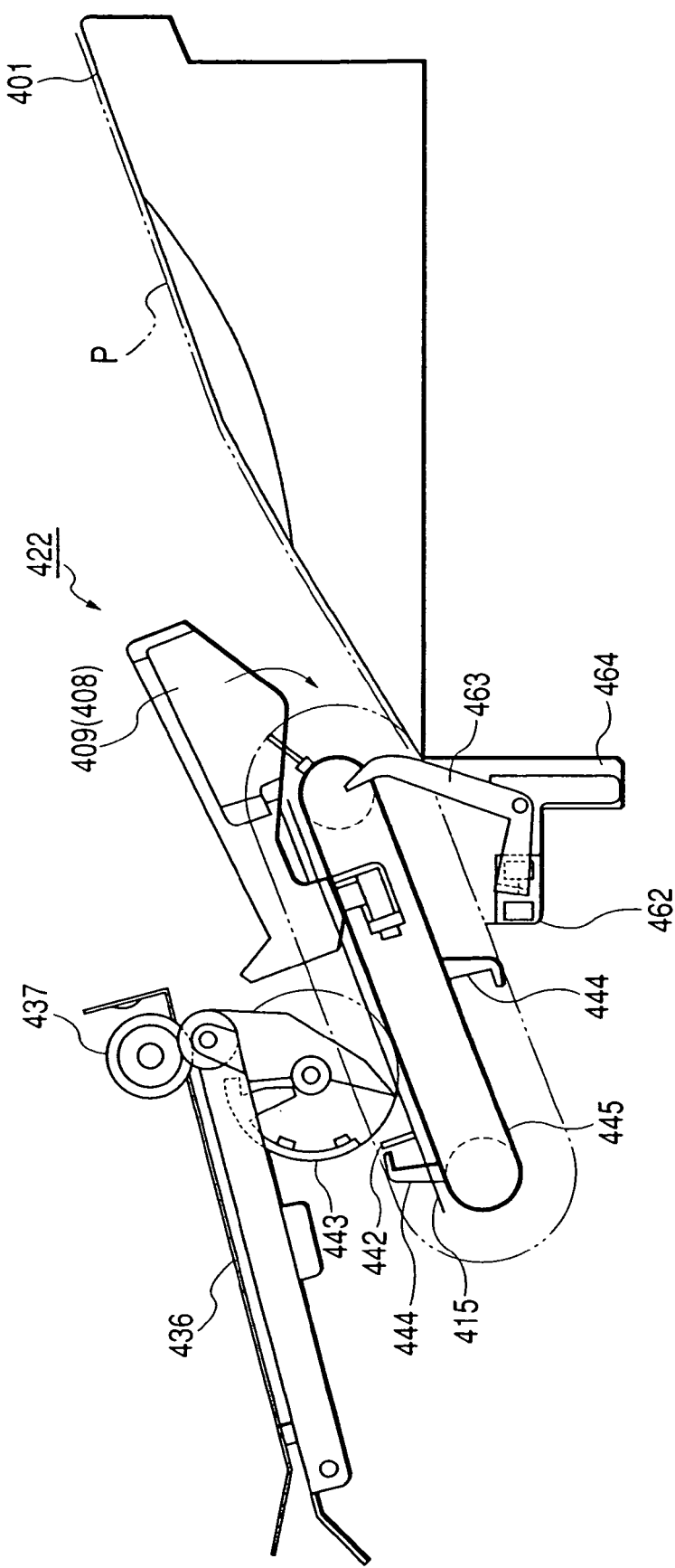
FIG. 32 is a drawing showing a state such that sheets are stacked in the state of FIG. 31.

The sheet aftertreatment apparatus 422 is disposed between the original reading portion 407 and the image-forming portion 438. In FIG. 30 to FIG. 32, the sheet aftertreatment apparatus 422 is composed of a treatment tray (treatment sheet stacking means) 415, a pair of alignment plates 408, 409 (see FIGS. 33 to 35) for aligning (width alignment) the end portions parallel to the delivery direction (the right and left direction in FIG. 30) of the sheets stacked on the treatment tray 415, a stopper 442, a returning roller 443, a stapler unit 441 (see FIG. 26, FIGS. 33 to 35), a stack-pushing belt 445, and a pair of sheet stack pushing claws 444.

Sheets delivered from the pair of the sheet feeding-out rollers 437 being a sheet delivery portion are delivered on the treatment tray 415, and their trailing ends being their end portions in the delivery direction of the sheets are aligned one by one and their width alignments are performed at the same time. Utilizing the inclination of the treatment tray 415 performs the alignment of the end portions of the sheets in the delivery direction. The sheets delivered on the treatment tray 415 moved by making a descent on the inclined treatment tray 415 to the upstream side in the sheet delivery direction (to the left side in FIG. 30) by their own weight to be received by the stopper 442.

Figure 33:
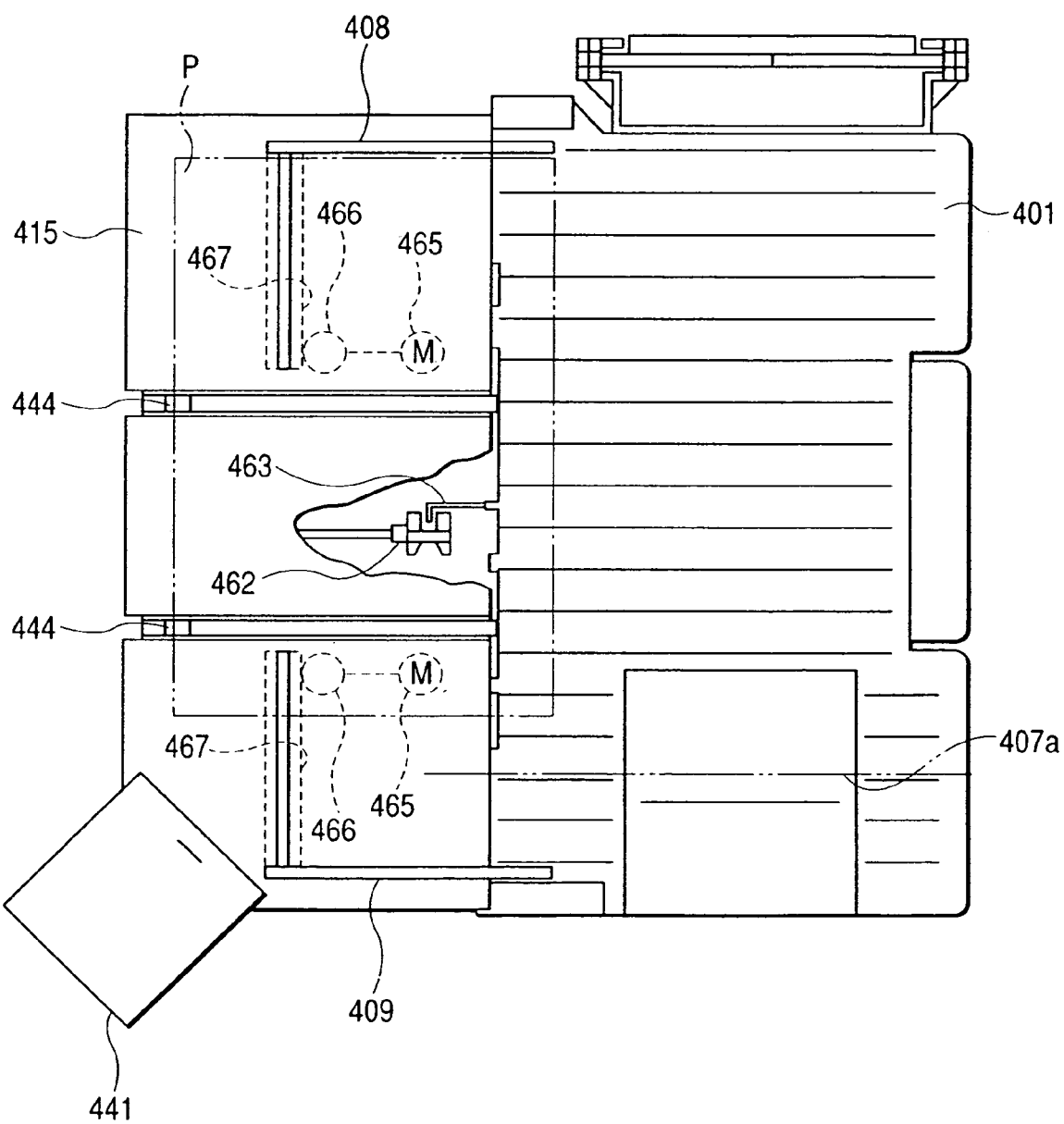
FIG. 33 is a schematic plan view of the sheet aftertreatment apparatus and the sheet stacking apparatus at the time of the start of the width alignment of sheets.
Figure 34:
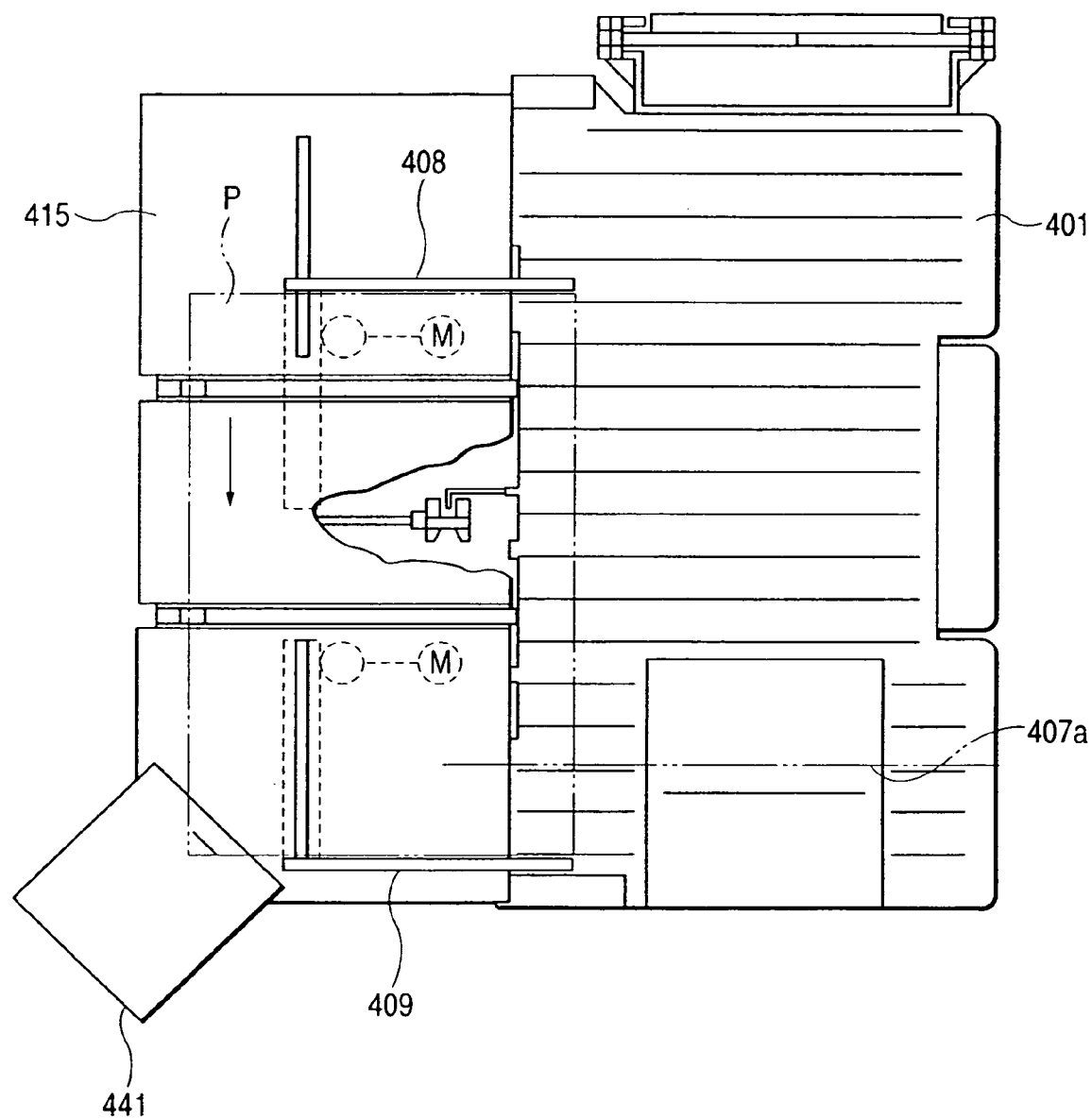
FIG. 34 is a schematic plan view of the sheet aftertreatment apparatus and the sheet stacking apparatus during the execution of the width alignment of sheets.
Figure 35:
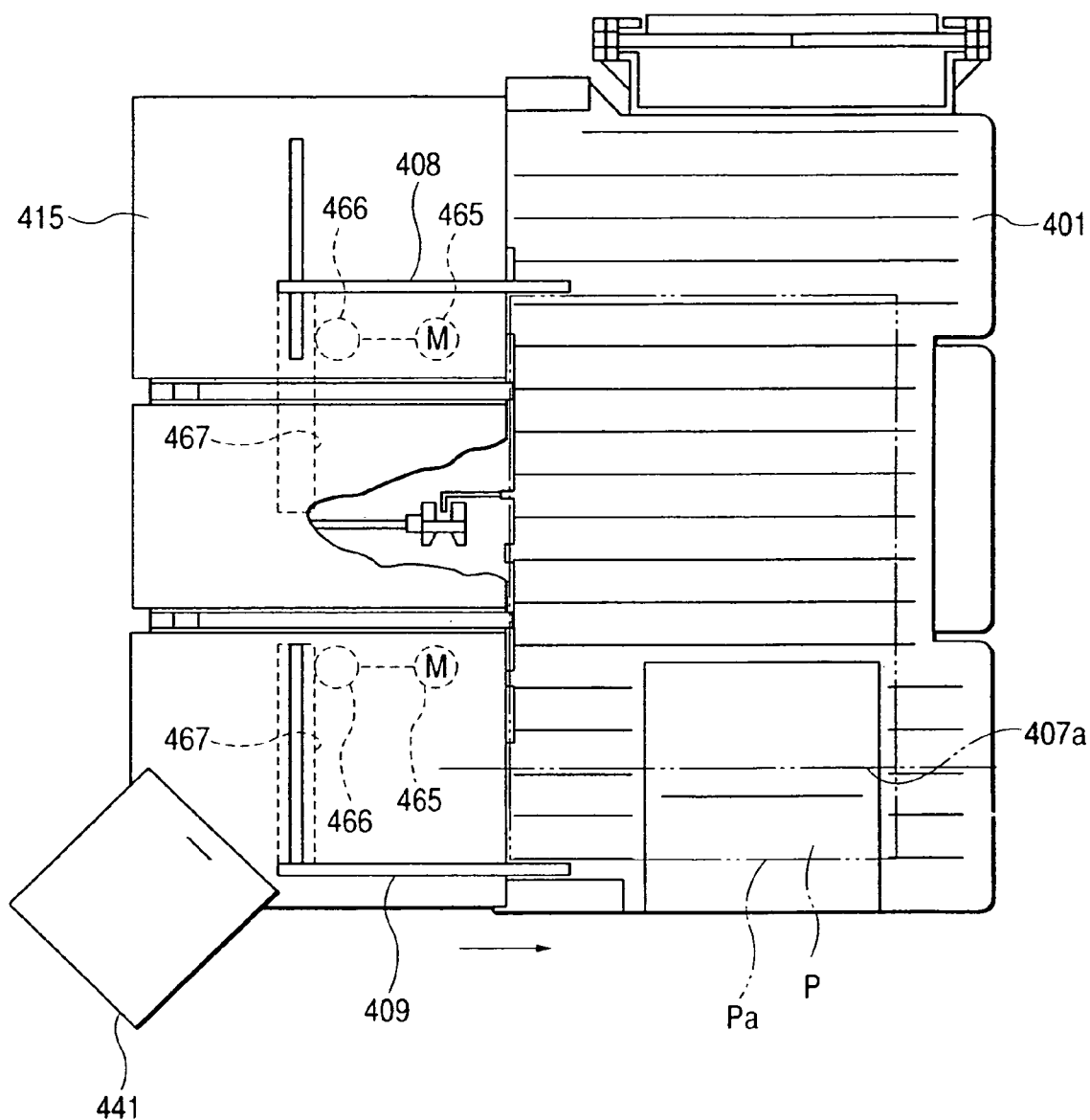
FIG. 35 is a schematic plan view of the sheet aftertreatment apparatus and the sheet stacking apparatus at the time of the end of the width alignment of sheets.
Figure 36:
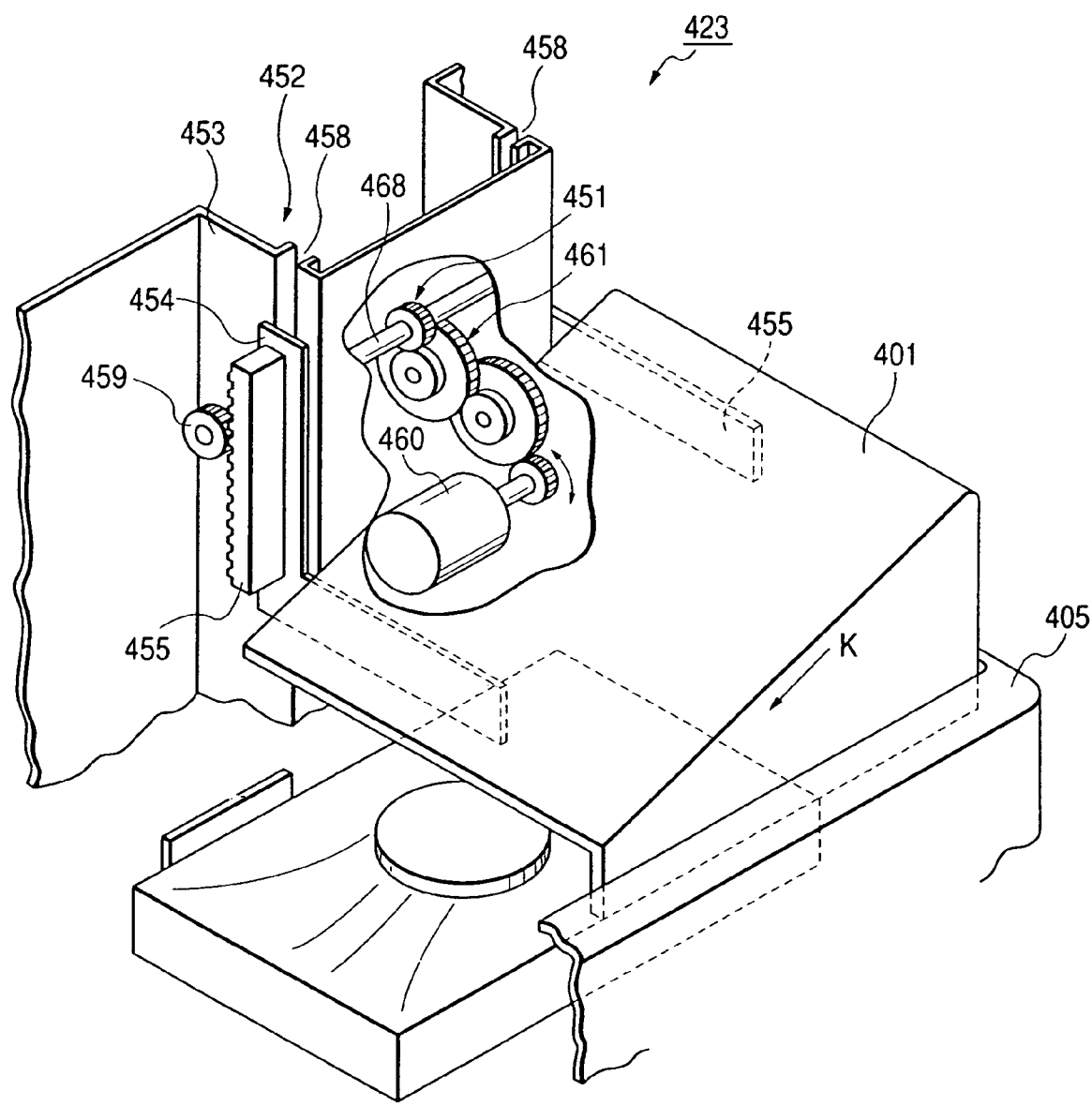
FIG. 36 is a partially broken perspective view of the sheet stacking apparatus.

In this case, the returning roller 443 rotates to touch the sheets for aiding the sheets slide-descent movement. The stopper 442 is fixed at a position somewhat nearer to the stack tray 401 side than the sheet stack pushing claw 444, which will be described later, on the upper side to be stayed in FIG. 30. The width alignment of the sheets the trailing edges of which were aligned on the treatment tray 415 is made by the pair of alignment plates 408, 409. The width alignment of the sheets, as shown in FIG. 33 to FIG. 35, is performed as follows: moving the alignment plate 408, which is disposed at the inner side, toward the front side to ram the sheets against the alignment plate 409 disposed on the front side as the reference. On the right side of the alignment plate 409 the exposed part 426 is located. That is, in the printer 420, because the operation portion 406 is put to the left side and the opened portion 410 is formed in the image-reading portion 407, the operation portion 406 itself does not protrude from the apparatus main body 427 to the front side, and the upper part on the front side of the stack tray 401 can be opened.

Incidentally, it is preferable that the delivery position of the sheets to be delivered on the treatment tray 415 from the pair of the sheet feeding-out rollers 437 is a position at the side of the front side alignment plate 409. In such a case, it is not always necessary to press the sheets against the front side alignment plate 409 with the inner side alignment plate 408 to align them.

Moreover, the sheets may be aligned only by either of the trailing edge alignment of the sheets and the width alignment of the sheets.

As shown in FIG. 34, on the front left side corner of the treatment tray 415, a stapler unit (sheet treating means) 441 (see FIG. 26, FIGS. 33 to 35) is disposed. In the case where a stapling mode is selected, stacks of sheets that have been aligned on the treatment tray 415 are pushed to the front side by the alignment plate 408 to be aligned by the alignment plate 409. Then, the stapler unit 441 staples the stack of sheets. Moreover, when a punching mode is selected, a punch unit (not shown) cuts holes in the stack of sheets. When the aftertreatment has finished in such a way, the stack-pushing belt 445 shown in FIG. 30 rotates in right-hand rotation. The pair of sheet stack pushing claws 444 projects on the stack-pushing belt 445 with an interval of about 180 degrees between each of them. At every rotation of the stack-pushing belt 445 by about 180 degrees, the sheet stack pushing claws 444 press the trailing edges of the stacks of sheets to deliver the stacks on the stack tray 401 (see FIG. 35). Incidentally, the sheet stack pushing claws 444 moves in a state of projecting upwards from a not shown slit formed in the treatment tray 415 in parallel to the sheet delivery direction. Moreover, in the case where only the alignment of sheets is performed, it is unnecessary to provide the staple treating function and the punch treating function.

Because the stacks of sheets are aligned to the front side alignment plate 409 on the treatment tray 415, a part of the stacks is piled on the exposed part 426 to be delivered, and almost all parts of the front side Pa of the stacks of sheets protrude to the front side from the opened portion 410 of the original reading portion 407. As a result, a user can sight the piled parts of the sheets on the exposed part 426 when the user is situated at a place where he or she can look down the printer 420. Thereby, it becomes unnecessary to grope for a stack of sheets, and it becomes possible to grasp and take out the stack from the printer 420 easily. When sheets are in general sizes such as A4 and LTR, the present embodiment positions almost all parts of the front portion of the sheets at a position of the exposed part 426 to enable a user to sight the sheets easily even if the embodiment takes a usual sorting mode (stack offset) and a non-sorting mode. In case of performing the stack offset, the embodiment rotates a pinion 466 with a motor 465, and moves the alignment plates 408, 409 with a rack 467. Incidentally, the alignment plates 408, 409, the motor 465, the pinion 466 and the rack 467 constitute sheet-aligning means.

Because the sheet aftertreatment apparatus 422 of the present embodiment is disposed between the original reading portion 407 and the operation portion 406 of the printer 420 and the image-forming portion 438, it becomes possible to meet a users need for miniaturizing the printer 420 for the sake of space saving.

(Sheet Stacking Apparatus)

As shown in FIG. 36 to FIG. 39, a sheet stacking apparatus 423 is composed of the stack tray (delivered sheet stacking means) 401, a lift/lower portion (lift/lower means) 451, a lift/lower guide portion (lift/lower guide means) 452, a supporting frame (supporting means) 453, a sheet surface detection sensor 462, a detection lever 463, sponges 402, 403, and the like.

The stack tray 401 is formed in an inclined shape such that the upstream end thereof in the sheet delivery direction is lower than the downstream end thereof in the same direction like the treatment tray 415. The reason why the stack tray 401 is inclined is for the sake of enhancing the aligning property of sheets or stacks of sheets by making it possible that the sheets or the stacks of sheets rapidly move by making a descent in the direction indicated by an arrow K by their own weight.

The stack tray 401 can be lifted and lowered. The stack tray 401 is structured in order to stack a predetermined number of sheets by lowering by a predetermined quantity every stacking of a stack of sheets.

The stack tray 401 is integrally provided with supporting members 454, 455 in a shape of a letter "L". Racks 455 are fixed on both the supporting members 454, 455. The rack 456 attached to the supporting member 455 is not shown. Moreover, the supporting members 454, 455 are provide with runners 457 (see FIG. 26) rotatably, two, upper ones and lower ones, of them being on each side to four in all. The runners 457 are guided by guide grooves 458 to guide the stack tray 401 to lift and lower. The runners 457, the guide grooves 458, the supporting members 454, 455 and the like constitute the lift/lower guide portion (lift/lower guide means) 452.

The racks 456 that are formed integrally with the supporting members 454, 455 engage with pinion gears 459. The pinion gears 459 are set on both sides of a driving shaft 468 supported by a not shown fixed member rotatably (one of the pinion gears 459 is not shown). The pinion gears 459 are rotated by a reduction gear train 461 that transfers the rotation of a driving motor 460 while reducing the rotation of the driving motor 460. The driving motor 460, the reduction gear train 461, the racks 455, the pinion gears 459 constitute the lift/lower portion (lift/lower means) 451.

Because the guide grooves 458, the runners 457, the supporting members 454, 455, the racks 456, the pinion gears 459 and the like are disposed on the inner side of the apparatus main body, the sheets stacked on the stack tray 401 can easily be taken out by a user.

Moreover, as shown in FIG. 30 to FIG. 32, the sheet stacking apparatus 424 includes the sheet surface detection sensor (lift/lower position detection means) 462 for keeping the uppermost sheet stacked on the stack tray 401 at a predetermined height always, and the detection lever (lift/lower position detection means) 463. The detection lever 463 is rotatably set on a fixing member 464 equipped with the sheet surface detection sensor 462.

When a stack of sheets is delivered on the stack tray 401, the driving motor 460 begins to rotate. The pinion gears 459 are rotated at a reduced speed by the reduction gear train 461. When the pinion gears 459 rotate, the stack tray 401 being one body with the racks 455 begins to lower in the direction indicated by an arrow H (see FIG. 30) by being guided by the runners 457 and the guide grooves 458. As the stack tray 401 lowers, the detection lever 463 inclines to the stack tray 401 side (see FIG. 31). When the stack tray 401 has lowered to a position where the sheet surface detection sensor 462 turns off because the detection lever 463 has inclined, the stack tray 401 further lowers by a predetermined height and then the stack tray 401 stops. The stack tray 401 stops there for a predetermined time. And then, for example, after the sheet stack pushing claws 444 have rotated to evacuate, the stack tray 401 is lifted till the detection lever 463 turns on the sheet surface detection sensor. Thereby, the height of the sheets stacked on the stack tray 401 is always kept at a predetermined height from a floor.

Although the stack tray 401 is lifted and lowered in such a way, vibrations sometimes occur every lifting and lowering. Owing to the vibrations, there is the possibility that the disturbance of the stacking of sheets on the stack tray 401 and the chattering of the sheet surface detection sensor 462 and the like occur as described with reference to the related art.

Figure 37:
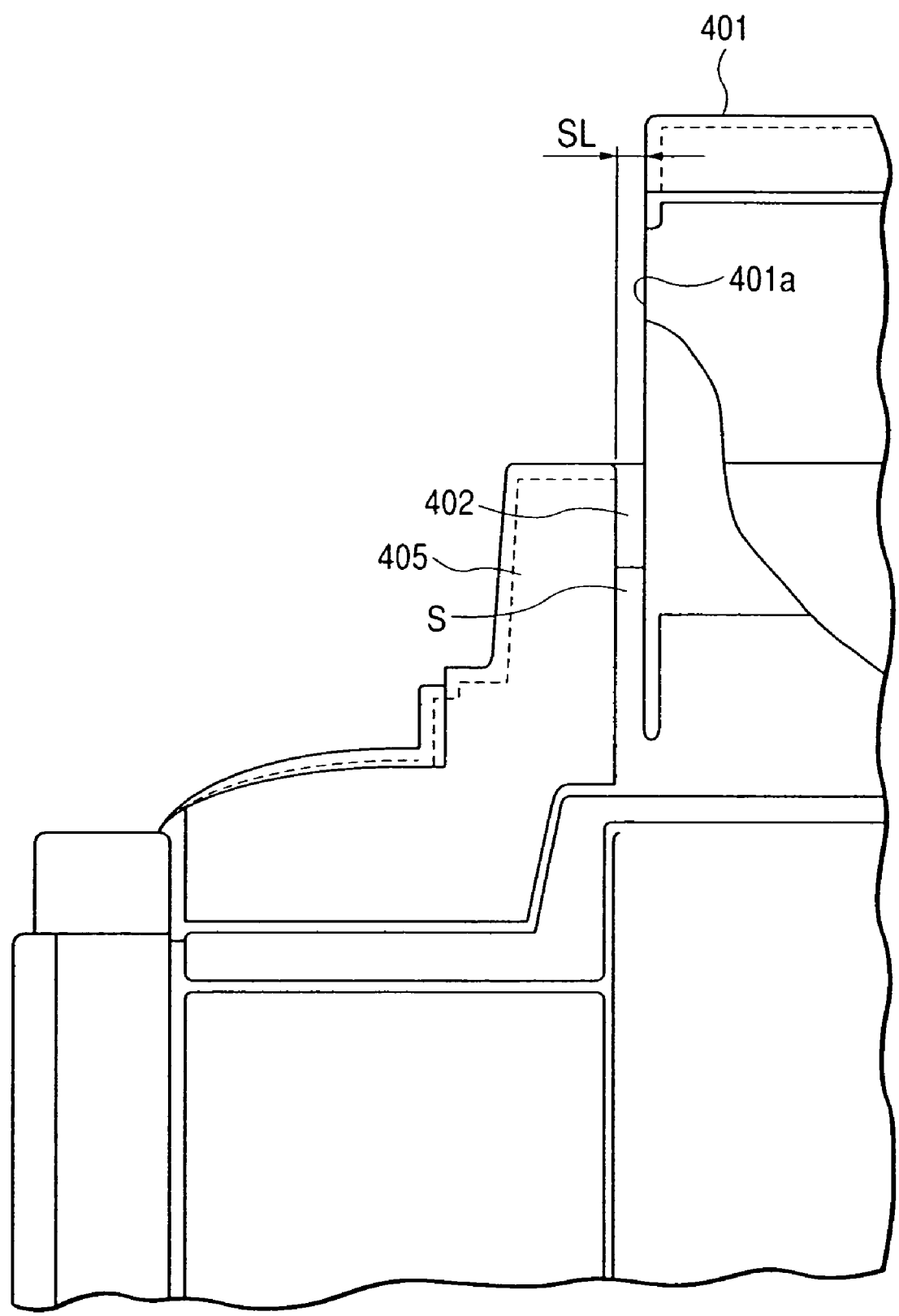
FIG. 37 is a partially broken enlarged view of the vicinity of the front cover of the printer shown in FIG. 29.
Figure 38:
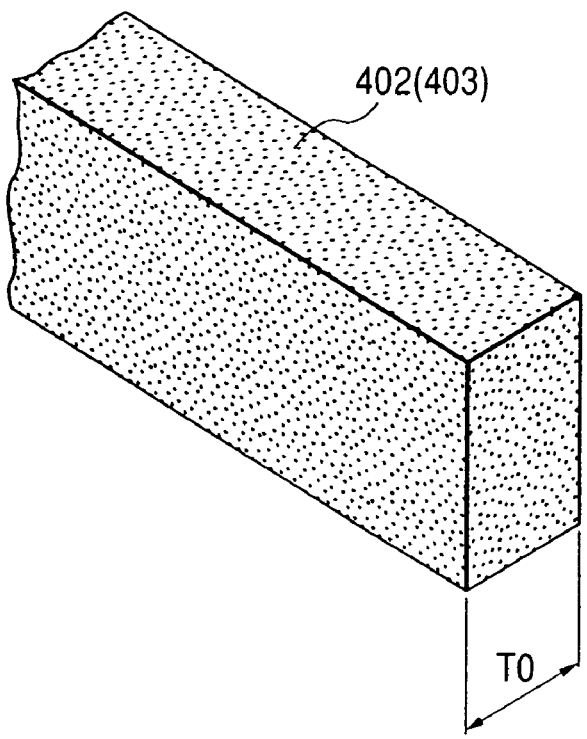
FIG. 38 is a perspective view of a sponge.

Accordingly, the sheet stacking apparatus 424 is provided with a mechanism for absorbing the vibrations of the stack tray 401. In FIGS. 27 and 37, the front surface side of the stack tray 401 is covered by a front cover 405, and the right side of the stack tray 401 is covered by a right side cover 404, both of them covering the range of the movement distance of lifting and lowering of the stack tray 401.

The front cover 405 and the right side cover 404 are severally provided with an ether-based or ester-based rectangular sponge (vibration-preventing member) 402, 403. The thicknesses TO of the sponges 402, 403 satisfy the formula TO>SL, where SL denotes the interval between the front cover 405, and the right side cover 404 and the stack tray 401 (the interval of the gap between the front cover 405 and the stack tray 401 in FIG. 37).

Consequently, the sponges 402, 403 adhere closely to the side surface of the stack tray 401 (the front surface 401a in FIG. 37). The sponges 402, 403 guide the lifting and the lowering of the stack tray 401 by the adhesion force (elastic force) thereof, and further the sponges 402, 403 hold the stack tray 401 lest the stack tray 401 should vibrate at the time of starting, lifting, lowering, and stopping. Furthermore, because the sponges 402, 403 stop the gap S between the stack tray 401 and the front cover 405 that lift/lower and the right side cover 404, it can be prevented that a foreign substance falls in the gap S.

Incidentally, an elastic resin may be used in place of the sponges 402, 403.

Because the sponges 402, 403 are attached to the front cover 405 and the right side cover 404, the elastic force of the sponges 402, 403 sometimes deteriorates, or the coefficients of friction U of the surfaces of the sponges 402, 403 touching the stack tray 401 sometimes become large. There is the possibility that the sponges 402, 403 are rubbed to be turned up or to be torn off owing to the rise and the fall of the stack tray 401 in such a case, and consequently that the sponges 402, 403 do not function as the preventive of the generation of vibration. There is also the possibility that the lifting and the lowering of the stack tray 401 are not performed smoothly.

Figure 39:
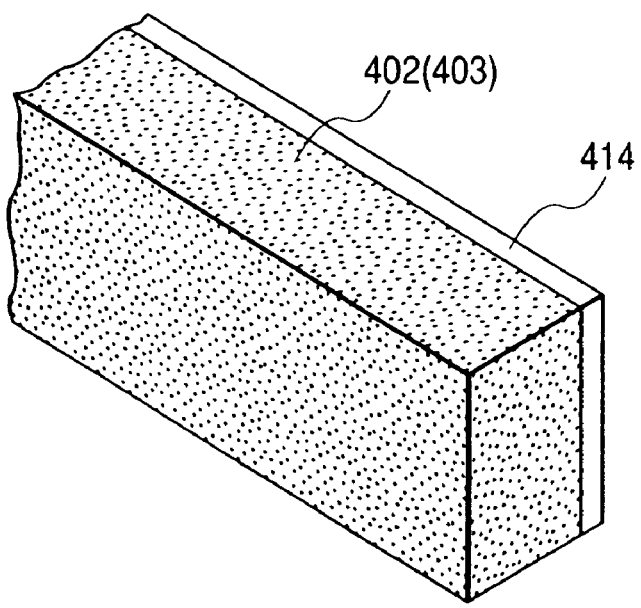
FIG. 39 is a perspective view of the sponge of FIG. 38 with an attached sheet having a small coefficient of friction.
Figure 40A:
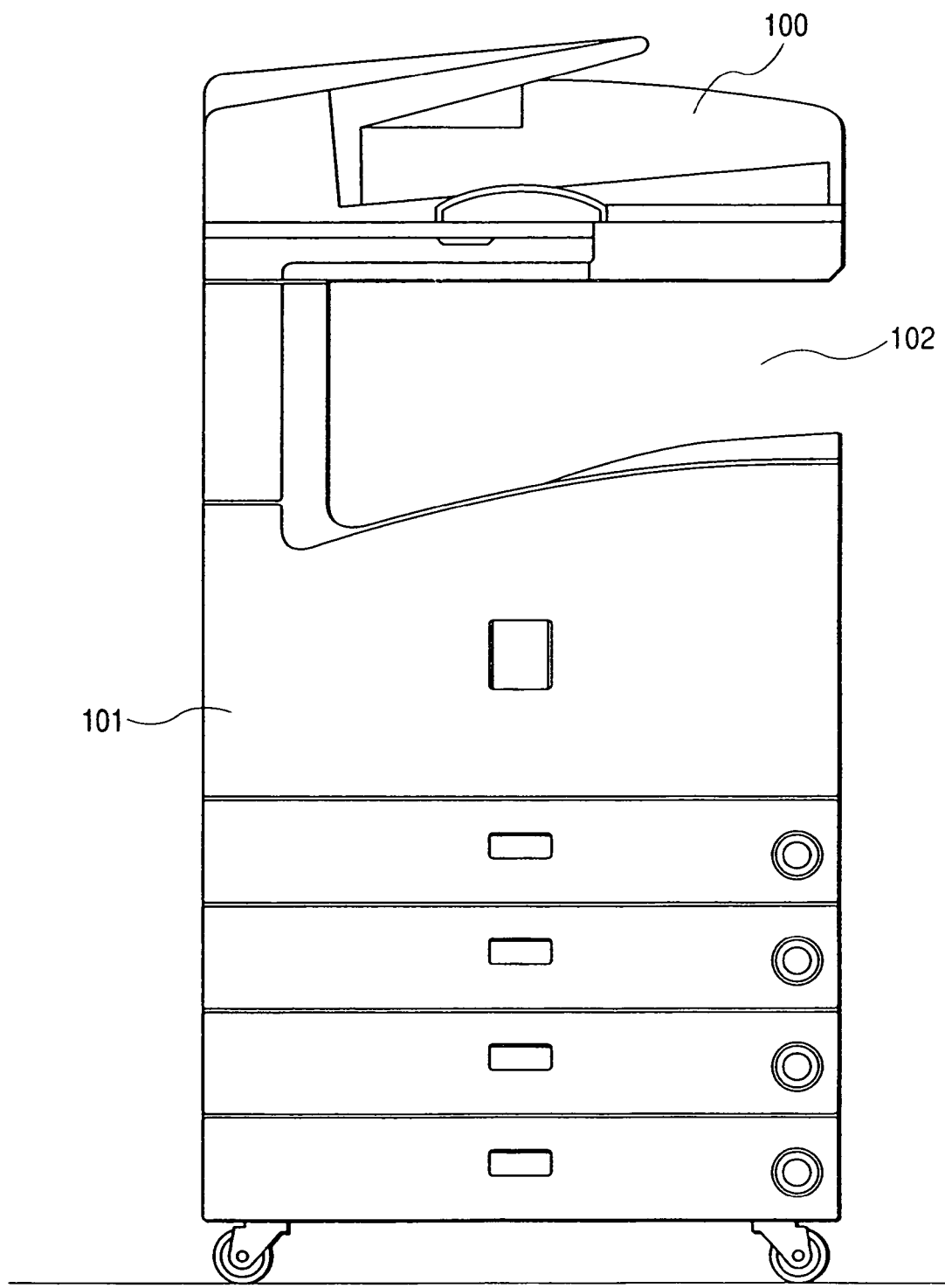
FIGS. 40A and 40B are explanatory drawings of an image forming apparatus concerning the related art.
Figure 40B:
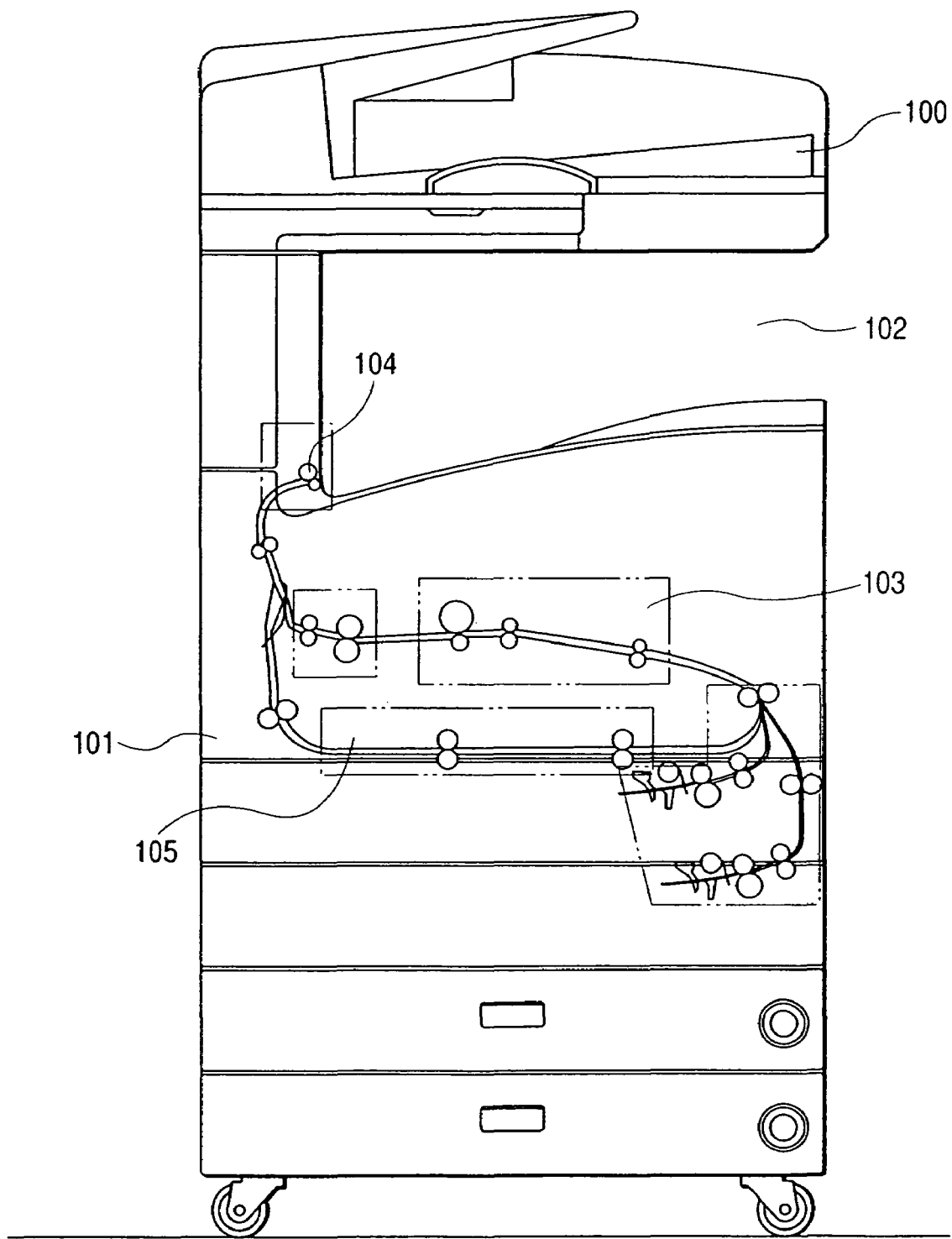
Figure 41:
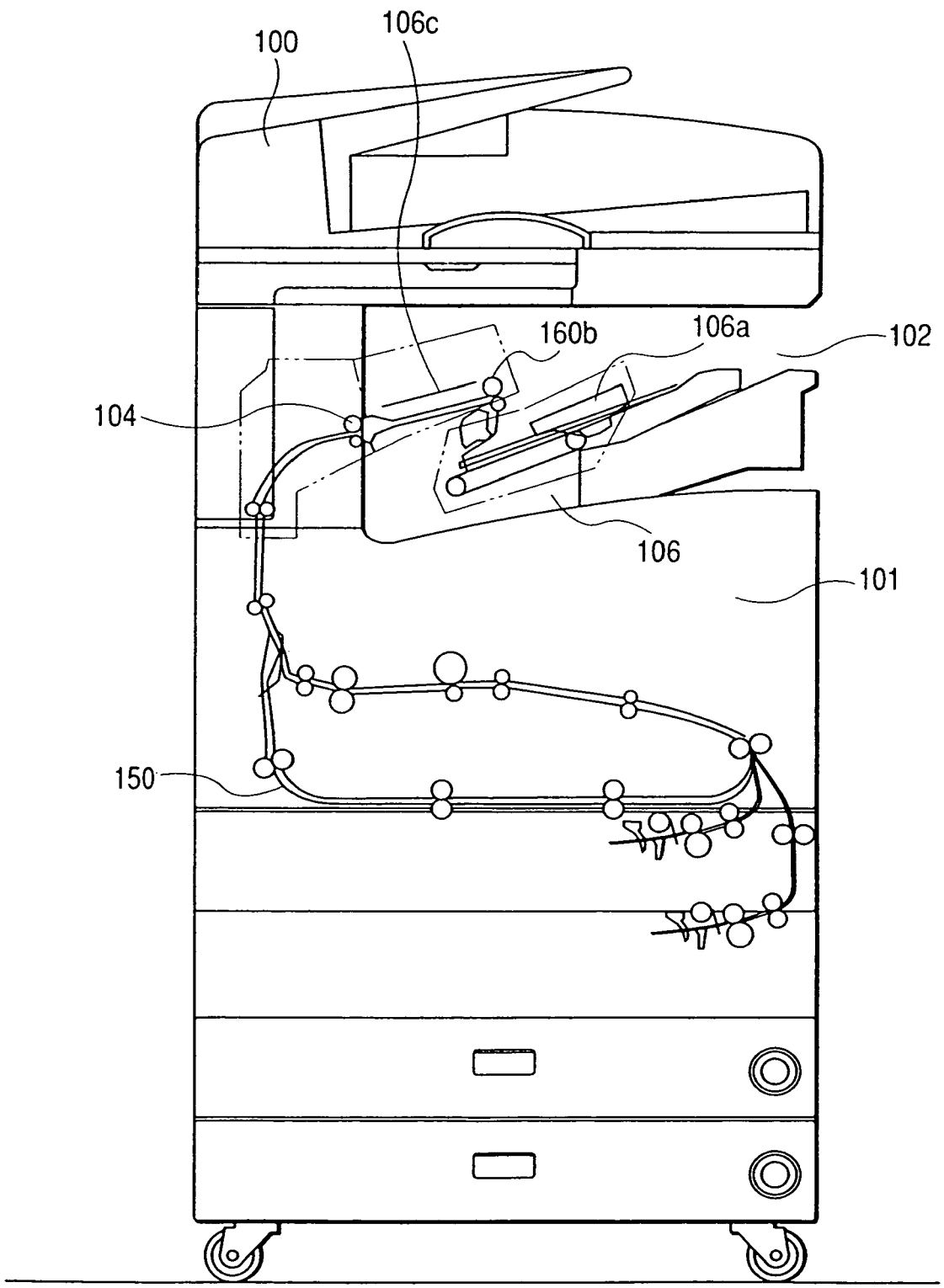
FIG. 41 is an explanatory drawing an image forming apparatus with a sheet treating apparatus concerning the related art.

Accordingly, as shown in FIG. 39, a sliding piece 414 having a coefficient $\mu$ of friction smaller than those of the sponges 402, 403 is stuck on the surfaces of the sponges 402, 403 that touch the stack tray 401. Thereby the rubbing, the turning up, and the tearing off of the sponges 402, 403 can be prevented. Furthermore, the increase of the load of the lifting and the lowering of the stack tray 401 can be prevented. Paper into the surface of which oil has soaked, a piece of resin in a shape of a sheet, and the like can be used as the sliding piece 414.

Incidentally, although the sponges 402, 403 are provided with the sliding piece 414, pieces of rubber may be used in place of the sponges 402, 403. That is the sliding piece 414 may be stuck on the pieces of rubber.

Moreover, although the sponges 402, 403 are set at the right side cover 404 and the front cover 405, the sponges 402, 403 may be adhered to the stack tray 401. In this case, the sliding piece 414 touches the right side cover 404 and the front cover 405.

Because the sheet stacking apparatus 424 of the present embodiment prevents the vibrations of the stack tray 401 that occur at the time of starting, lifting, lowering and stopping operation thereof with the sponges 402, 403, the stackability and the aligning property of a sheet can be improved.

Because the image forming apparatus of the present embodiment is structured such that a part of the delivery sheet stacking means can be sighted when the image forming apparatus is viewed in plan, there occur no cases where the sheets or the stacks of sheets that have been delivered on the delivery sheet stacking means are overlapped with the image reading means and the operation portion and are hidden by them. Consequently, the sheets become easy to sight when being viewed in plan, which makes it possible to take out the sheets easily.

Because the delivery sheet stacking means of the sheet stacking apparatus of the present embodiment scarcely vibrates at the time of the lifting, the lowering, or the stopping operation of the delivery sheet stacking means, the stackability and the alignment property of sheets can be improved.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. An image forming apparatus including a space portion, in which a sheet is delivered, between an image-reading portion and an image-forming portion, said image forming apparatus comprising:
   a treating apparatus for performing a predetermined treatment of the sheet, said treating apparatus being disposed in said space portion; and
   a surface reverse path for reversing surfaces of the sheet, said surface reverse path being disposed above said treating apparatus.

2. An image forming apparatus according to claim 1, wherein said surface reverse path includes a guide portion provided on a sheet-transporting guide of said treating apparatus.

3. An image forming apparatus according to claim 2, wherein said guide portion is movable to release the sheet-transporting guide.

4. An image forming apparatus according to claim 2, wherein said guide portion serves as a grip for moving the sheet-transporting guide.

5. An image forming apparatus including a space portion, in which a sheet is delivered, between an image-reading portion and an image-forming portion, said image forming apparatus comprising:
   a sheet guide member including an upper guide portion for forming a delivery path for delivering the sheet in said space portion, and a lower guide portion for forming a surface reverse path for reversing surfaces of the sheet.

6. An image forming apparatus according to claim 5, wherein said sheet guide member is a flapper for switching sheet transportation.

7. An image forming apparatus according to claim 1 or 5, wherein said surface reverse path can reverse the surfaces of the sheet without exposing the sheet to an outside of said apparatus.

8. An image forming apparatus including a space portion, in which a sheet is delivered, above an image-forming portion, said image forming apparatus comprising:
   a treating apparatus for performing a predetermined treatment of a sheet, said treating apparatus being disposed in said space portion; and
   a surface reverse path for reversing surfaces of the sheet, said surface reverse path being disposed above said treating apparatus.

9. An image forming apparatus according to claim 8, further comprising:

a plate-shaped member covering said treating apparatus, said plate-shaped member being disposed above said surface reverse path.

\* \* \* \* \*

UNITED STATES PATENT AND TRADEMARK OFFICE
CERTIFICATE OF CORRECTION

PATENT NO. : 7,050,752 B2
APPLICATION NO. : 11/260195
DATED : May 23, 2006
INVENTOR(S) : Akihiro Sato et al.

It is certified that error appears in the above-identified patent and that said Letters Patent is hereby corrected as shown below:

ON THE TITLE PAGE, AT ITEM (30):
Foreign Application Priority Data:

"2000/315645" should read --2000-315645--;
"2000/316287" should read --2000-316287--;
"2000/323635" should read --2000-323635--; and
"2000/329547" should read --2000-329572--.

COLUMN 2:
Line 44, "possible to reverse" should read --capable of reversing--.
Line 66, "has-once" should read --has first--.
Line 67 should be deleted.

COLUMN 3:
Lines 1-23 should be deleted.
Line 44, "large. In" should read --large: in--.
Line 48, "protrude" should read --protrudes--.
Line 65, "worried" should read --a matter of concern--.

COLUMN 4:
Line 10, "looks" should read --looks at--.
Line 38, "during" should read --while--.
Line 62, "contact" should read --in contact--.

COLUMN 6:
Line 43, "and" should be deleted.

COLUMN 8:
Line 50, "from delivered from" should read --from--.

COLUMN 10:
Line 37, "an image" should read --of an image--.
Line 46, "while" should read --to while--.

COLUMN 11:
Line 48, "has" should read --has been--.
Line 59, "Sheet" should read --Sheets--.

UNITED STATES PATENT AND TRADEMARK OFFICE
CERTIFICATE OF CORRECTION

| | |
|---|---|
| PATENT NO. | : 7,050,752 B2 |
| APPLICATION NO. | : 11/260195 |
| DATED | : May 23, 2006 |
| INVENTOR(S) | : Akihiro Sato et al. |

It is certified that error appears in the above-identified patent and that said Letters Patent is hereby corrected as shown below:

COLUMN 12:
Line 1, "an" should be deleted.
Line 14, "referred." should read --referred to.--.
Line 30, "as" should read --that--.

COLUMN 13:
Line 7, "referred." should read --referred to.--.

COLUMN 14:
Line 18, "pin 206" should read --pins 206--.
Line 31, "to be possible to be mounted" should read --so as to be mountable--.

COLUMN 15:
Line 36, "divided respectively." should read --respective divided portions.--.

COLUMN 17:
Line 11, "as follows" should read --according to--.
Line 12, "from by" should read --provided by--.
Line 20, "form" should read --formed--.
Line 23, "lead" should read --led--.
Line 27, "an" should read --as an--.

COLUMN 18:
Line 17, "opining" should read --opening--.
Line 52, "while" should read --to while--.

COLUMN 20:
Line 15, "one" should be deleted.

COLUMN 21:
Line 4, "upper than" should read --above--.
Line 10, "sheet" should read --sheets--.
Line 19, "down (looked" should read --down upon (looked at--.
Line 57, "becomes clean state in which" should read --is brought to a state of cleanliness so that--.

COLUMN 22:
Line 39, "moved" should read --are moved--.

UNITED STATES PATENT AND TRADEMARK OFFICE
CERTIFICATE OF CORRECTION

PATENT NO. : 7,050,752 B2
APPLICATION NO. : 11/260195
DATED : May 23, 2006
INVENTOR(S) : Akihiro Sato et al.

It is certified that error appears in the above-identified patent and that said Letters Patent is hereby corrected as shown below:

COLUMN 23:
Line 24, "moves" should read --move--.
Line 55, "user s" should read --user's--.

COLUMN 24:
Line 2, "like" should read --as--.
Line 16, "provide" should read --provided--.
Line 18, "side to" should read --side, amounting to--.
Line 26, "set" should read --set rotatably--.
Line 27, "rotatably" should be deleted--.

COLUMN 25:
Line 49, "µof" should read --µ of--.

COLUMN 26:
Line 27, "than" should read --otherwise than--.

Signed and Sealed this

Tenth Day of April, 2007

JON W. DUDAS
*Director of the United States Patent and Trademark Office*